United States Patent [19]

Edwards et al.

[11] 4,188,611
[45] Feb. 12, 1980

[54] SEISMIC PROSPECTING SYSTEM

[75] Inventors: Charles M. Edwards; William C. Walter, both of Pasadena, Calif.

[73] Assignee: United Geophysical Corporation, Pasadena, Calif.

[21] Appl. No.: 867,967

[22] Filed: Jan. 9, 1978

Related U.S. Application Data

[63] Continuation of Ser. No. 304,476, Nov. 7, 1972, abandoned.

[51] Int. Cl.² ............................................. G01V 1/36
[52] U.S. Cl. ........................................ 367/41; 367/60
[58] Field of Search ............... 340/15.5 DP, 15.5 CC, 340/15.5 CP, 15.5 TA

[56] References Cited

U.S. PATENT DOCUMENTS

| | | | |
|---|---|---|---|
| 2,450,352 | 9/1948 | Piety | 340/15.5 CP |
| 3,292,141 | 12/1966 | Hines et al. | 340/15.5 MC |
| 3,300,754 | 1/1967 | Lee et al. | 340/15.5 TA |
| 3,307,145 | 2/1967 | Dunster et al. | 340/15.5 CP |
| 3,311,874 | 3/1967 | Sheffield | 340/15.5 FC |
| 3,437,989 | 4/1969 | Proffitt | 340/15.5 MC |
| 3,466,596 | 9/1969 | Siems et al. | 340/15.5 DP |
| 3,496,530 | 2/1970 | Brown et al. | 340/15.5 DP |
| 3,529,142 | 9/1970 | Robertson | 324/77 G |
| 3,535,501 | 10/1970 | Porter, Jr. | 340/15.5 DP |
| 3,566,358 | 2/1971 | Hasbrouck | 340/172.5 |
| 3,587,039 | 6/1971 | Backus et al. | 340/15.5 TA |
| 3,697,939 | 10/1972 | Musgrave | 340/15.5 MC |
| 3,731,268 | 5/1973 | Landrum | 340/15.5 DP |
| 3,744,019 | 7/1973 | Schmitt | 340/15.5 DP |
| 3,835,456 | 9/1974 | Angelle | 340/15.5 DP |
| 3,863,058 | 1/1975 | Savit | 340/15.5 DP |
| 3,895,342 | 7/1975 | Mallet et al. | 340/15.5 CP |

Primary Examiner—Howard A. Birmiel
Attorney, Agent, or Firm—Reed C. Lawlor

[57] ABSTRACT

This invention relates to an improved system for employing seismic techniques for surveying the subsurface structures of the earth. The invention relates particularly to an improved system for generating, collecting and processing the data during the course of exploration with a group of trucks that travel over the surface of the earth and intermittently stop to perform the required operations. The processing aides in the performance of the generating and collecting step and in the further processing of the collected data. And the data resulting from processing in this invention are transferred to a computer center for further processing. In this system, use is made of two programmable computers to facilitate concurrent processing of seismic waves received in successive setups in different ways. In this invention, certain processes that have heretofore been performed at a computer center are performed "on-site" in the recording truck so that the results may be employed for monitoring field operations without long delay.

4 Claims, 21 Drawing Figures

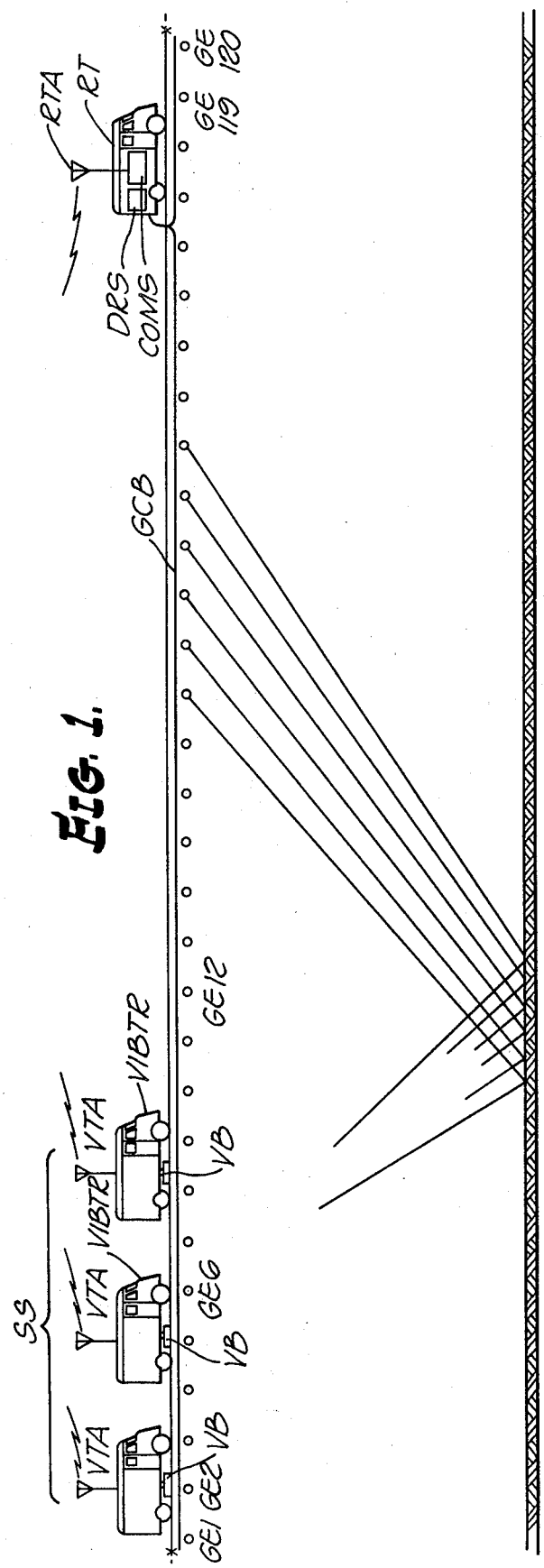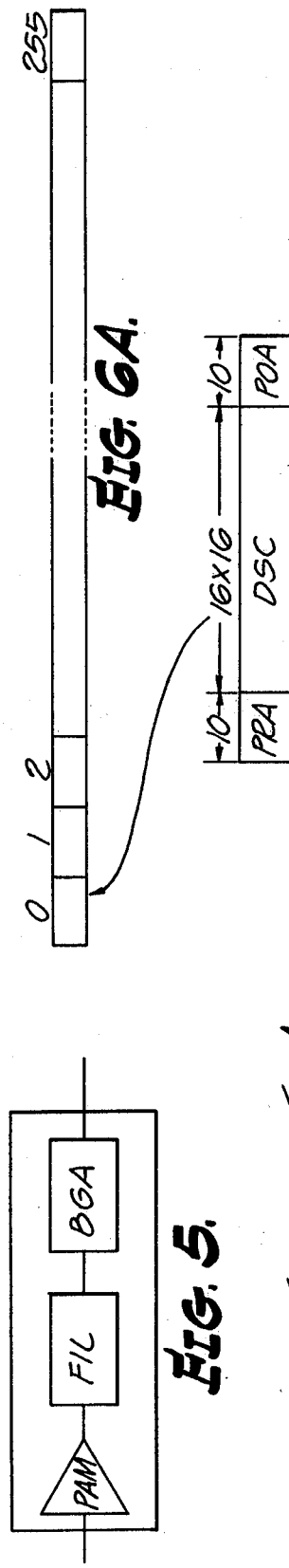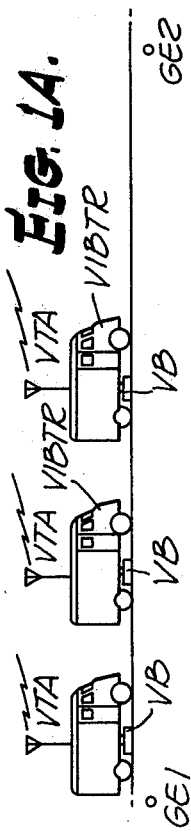

| TRACK | DRB |
|---|---|
| 0 | MONB |
| 1 | BUS B - SYS GNB - SARB |
| 2,3 | PREP - (SECTOR, EXPON) |
| 4,5 | VSWG |
| 6,7 | VTRN |
| 8,9 | DGEN |
| 10,11 | DMUX |
| 12,13 | XCOR |
| 14,15 | FRAN |
| 16,17 | MUX |
| 18 | TPOT |
| ... | |
| 48 | OBSERVER'S REPORT PRE POST LINE |
| 49 | CHIRP EXCITATION SIGNAL |
| 50 | |
| 51,52,53,54 | SWEEP TRANSFORM |
| 55 | EPO |
| 56...79 | SEISMO |
| 80...103 | PRT 1 / PRT 2 |
| 104...127 | PRT 3 / PRT 4 |

| TRACK | DRA |
|---|---|
| 0 | IPLO - MONA |
| 1 | BUSA - SYSGNA - SARA |
| 2,3 | SGEN |
| 4,5 | COMP |
| 6,7 | SWEP |
| 8,9 | DPOT |
| 10,11 | TOUT |
| 12 | DSIM |
| ... | |
| 28 | ←— STR1 —→ |
| 29 | |
| 30 | ←— 3840 —→ |
| ... | |
| 127 | |

CHIRP EXCITATION SIGNAL — STR3
176 —
80 — STR2

FIG. 8.

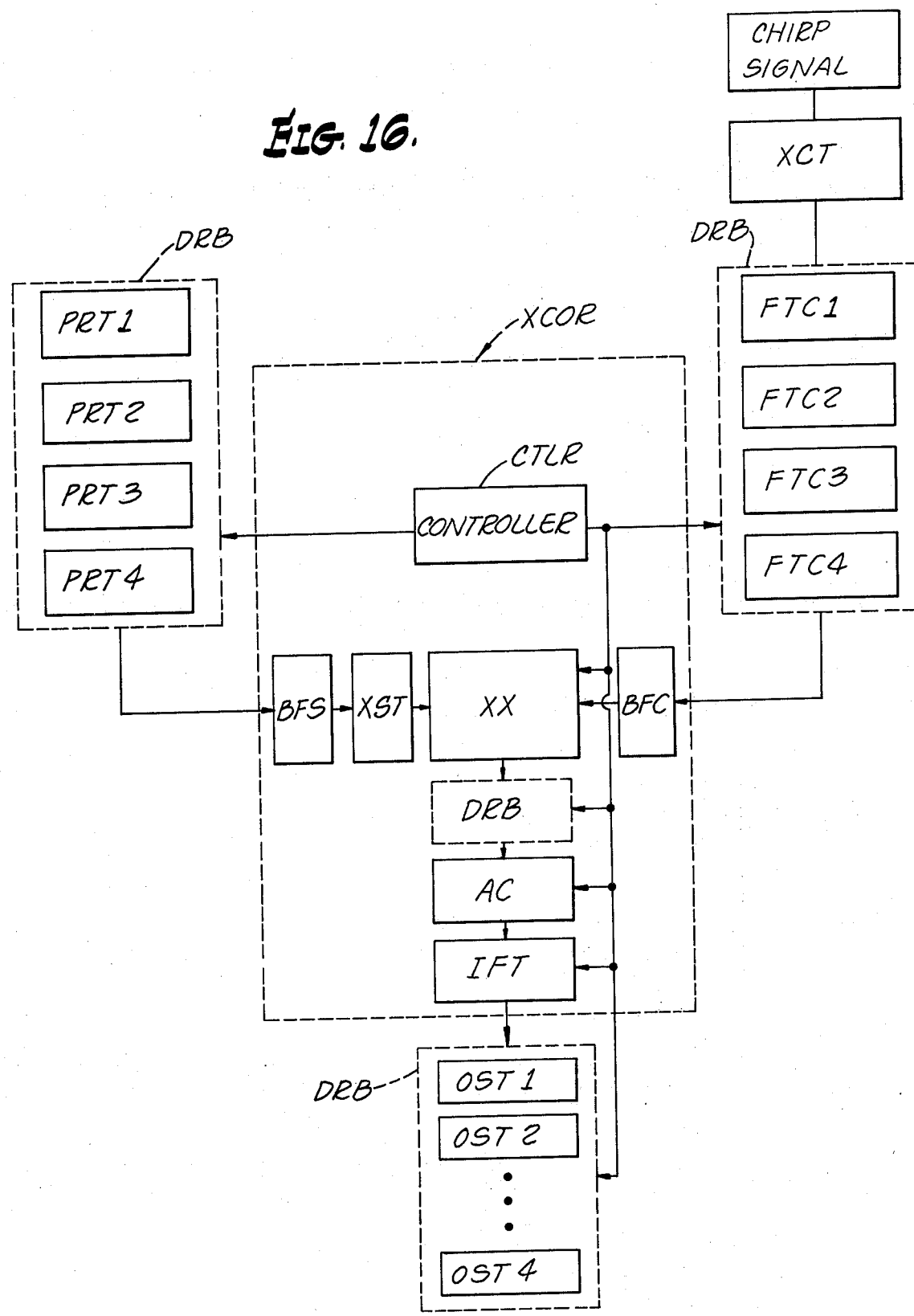

SEISMIC PROSPECTING SYSTEM

This is a continuation of application Ser. No. 304,476, filed Nov. 7, 1972, now abandoned.

This invention relates particularly to the formatting of signals in different ways during various stages of operation of the system.

CROSS REFERENCE TO RELATED APPLICATIONS

Patent Application Ser. No. 740,803, filed Nov. 11, 1976. Patent Application Ser. No. 304,562, filed Nov. 7, 1972. Patent Application Ser. No. 305,731, filed Nov. 13, 1972. Patent Application Ser. No. 764,910, filed Feb. 1, 1977. Patent Application Ser. No. 303,693, filed Nov. 6, 1972.

INTRODUCTION

This invention relates to an improved system for employing seismic techniques for surveying the subsurface structures of the earth. The invention relates particularly to an improved system for generating, collecting and processing the data during the course of exploration with a group of trucks that travel over the surface of the earth and intermittently stop to perform the required operations. The processing aids in the performance of the generating and collecting step and in the further processing of the collected data. And the data resulting from processing in this invention are transferred to a computer center for further processing. In this invention, certain processes are carried out in new ways and certain processes that have heretofore been performed at a computer center are performed "on-site" in the recording truck so that the results may be employed for monitoring field operations without long delay.

BACKGROUND

Many methods are currently in use which involve the generation of seismic waves at the surface of the earth and the recording of seismic waves at the surface after they have traveled downwardly into the earth, encountered subsurface anomalies of various kinds and then have been deflected upwardly to the surface as by reflection, refraction, and diffraction. Numerous methods of generating the seismic waves are in use. So also are numerous methods for recording the seismic waves. When these methods are used to determine the nature of subsurface formations, they are called seismic surveying, and when the object of the survey is to locate mineral deposits, the methods are sometimes referred to as seismic prospecting.

As currently practiced, seismic prospecting generally involves digitizing the received seismic waves and making magnetic tape recordings of digitized seismic waves and transporting or otherwise transmitting the magnetic tape recordings to a computing center where they are processed in an effort to determine the nature and structure of subsurface formations.

In the traditional method of seismic prospecting, seismic waves were generated at the surface of the earth in the form of a sharp pulse. Such waves have commonly been generated by detonation of an explosive at the bottom of a bore hole that has been drilled into the surface layers of the earth as much as several hundred feet or as little as a few feet. Sometimes the pulse has been created by the drop of a weight onto the surface of the earth or by application of an impact to the surface of earth, such as by pounding the earth with a piston or plate driven by a gas explosion.

After deflection by subsurface formations, the waves are detected at receiver points by means of electromechanical transducers, sometimes called geophones or seismometers. Sometimes they are detected by means of an array of interconnected transducers arranged in predetermined relation to a geophone station. The combined waves from these transducers are often said to be received at the geophone station.

Where an explosive in the form of a charge of dynamite has been employed, the received waves have often been sufficiently strong to enable the making of an analog record in which the undulations of the received wave are recorded as a conventional seismogram in which the amplitude of the received wave is recorded as a function of time. In order to accommodate the fact that waves reflected from deeper and deeper anomalies are of gradually decreasing average strength, amplifying systems have been employed that compensate for such gradual reduction in strength. Such systems bring the average amplitude of the wave up to a value within a range which renders the undulations of the recorded wave on the seismogram easily discernible by the eye. In early traditional seismic exploration, the records were made in the form of visible oscillograph traces. In later developments, the waves were recorded in phonographically reproducible form, either as variable density records on photographic film or on magnetic tapes or the like and were then translated into oscillographic traces, with or without prior filtering. It is therefore necessary to distinguish between phonographically reproducible seismograms and oscillographic seismograms. Still later, the received waves were sampled intermittently and the amplitudes of the successive samples were digitized, that is, translated into binary digital signals that represent the amplitudes of the samples. A record of such digital signals constitutes a digitized seismogram. Digitized seismograms are also reproducible as oscillographic seismograms. In a certain sense, therefore, the digitized seismograms are also phonographically reproducible.

It is well known that there is a background of extraneous seismic noise which is received along with the deflected waves that are recorded. This noise has its origin in wind, traffic, and even in animal movements at or beneath the surface of the earth. Often, when earth impact methods and weight dropping methods are employed, the strength of the received reflections compared with the background noise from a single weight-drop or othr impact, is lower than when a large charge of explosive is employed. In other words, such methods generally produce a lower ratio of signal strength compared with the strength of background noise. This is also the case where a small charge of explosive is used in generating the seismic impulse. For this reason, records are often made involving the repeated dropping of a weight or the repeated impacting of the earth at about the same point, thus producing a series of records of waves that have traveled over about the same paths to the geophones each time the siesmic waves are generated. In order to increase the signal-to-noise ratio and hence to make it possible to detect waves deflected from subsurface formations, especially anomalies at great depths, the various trains of waves that have traveled over approximately the same paths are combined, such as by adding, in order to increase the signal-tonoise ratio. Such a method is sometimes called vertical compositing or stacking. In order to distinguish such composing from another type of compositing which will be mentioned, we will sometimes apply the name equal-time composing to this vertical compositing. In some methods, the weight is not dropped at the same point and the earth is not impacted at the same point, so that even though the geophones have remained stationary from one weight-drop or impact to another, the waves travel over slightly different paths from one impact to another. Where the differences in the lengths of the paths are small compared with the wavelengths of the waves, no account needs to be taken of the differences in lengths of the paths in the stacking process.

In still another method of compositing, waves that have been reflected from approximately the same point beneath the surface of the earth but which have been generated at different points and also received at different points, are combined. A method for combining waves that have been so generated and recorded, is described in the Mayne U.S. Pat. No. 2,732,906. In this case, the times of travel from the source to a point of reflection and thence to the receiver are unequal. When such waves are combined, the process is often called common-depth-point stacking or compositing. In such process, account is taken of the differences in travel times over paths of different lengths by involving reflections from the same depth. The result is what we might call unequal-time compositing.

In another method of seismic prospecting as currently conducted, a train of seismic waves in the form of a "chirp" signal is generated in place of a sharp pulse, at the source.

A chirp signal is a frequency modulated wave of substantial duration in which the frequency is varied as a monotonic function of time, usually a linear function, over a substantial period of as much as several seconds. The length of a chirp is to be contrasted with a duration of a single seismic impulse produced by the methods described above, wherein the total duration of the signal emitted from the source is only a small fraction of a second, such as about 0.05 sec. or less. Sometimes a chirp signal is referred to as a sweep since the frequency is swept from one value to another during each action.

As the chirp signal travels downwardly in the earth, various parts of the signal are received simultaneously by the same geophones at the surface after reflection from anomalies that lie at different depths. Thus, at any specific instant, the frequencies of the respective signals received at the same geophone from anomalies at different depths are different.

When a chirp source signal is employed, the resultant recorded waves are cross-correlated with a replica of the original chirp in order to produce a record somewhat similar to that which would be produced if the original seismic wave had been in the form of an impulse. To achieve such a result, the received seismic waves are conventionally recorded on a magnetic tape along with a record of the chirp signal and the recorded seismic waves are correlated with the record of the chirp signal at a computer center. In order to increase the signal-to-noise ratio, a chirp signal may be produced 20 to 100 times at about the same point and received at the same receiver point and the resultant received waves subjected to equaltime compositing. The most commonly used seismic prospecting process involving the use of a chirp signal and the correlation of the chirp signal with the seismic records is known as "Vibroseis" (trademark of Continental Oil Company). For convenience, we will refer to such processes as a Vibroseis-type process.

TERMINOLOGY

A few terms frequently used herein are briefly explained as follows:

Geophone Station

This is a point at which a single geophone is located, or about which an array of geophones is deployed in a predetermined manner. The signals received by all the geophones in the group are usually added together or otherwise combined to form a single signal. This signal is attributed to the geophone station.

Shot

The term shot applies to a single train of seismic waves whether it be generated by explosive, an impact, or a Vibroseis source. Where several shots are initiated simultaneously or in timed sequence to produce a single train of waves as if from a single source without interruption, they are also considered a shot.

Shot Point

This is the point at the surface of the earth at which seismic waves are to be generated. Where a single explosive charge is involved, technically the shot point is at the bottom of the shot hole, but the term is often used to refer to the point on the surface directly above the charge. Where several explosive charges of equal strength are involved and are laid out with uniform spacing, the shot point is at the center of the group of the charges. The term shot point is also applied where the impulse is applied to the earth by one or more impacts or by means of a vibrator. Where, as in the case typically described herein, several vibrators are employed along the same line for applying signals to the earth simultaneously, the shot point is deemed to be on the surface of the earth at the center of the points at which the vibrations are applied.

Recording Unit

A recording unit may be in the form of a cab carried by a land vehicle, usually a truck, within which the recording equipment is installed. Cables lead from the recording equipment in the truck to geophones arrayed at various geohone stations. The recording unit may be in the form of a cab carried on a trailer, or of other land vehicle, which is hauled by a truck or otherwise. The vehicle may move on wheels, tracks, or even sleds.

Shooting Truck

This is the truck which includes the equipment which is used for generating the seismic waves, whether the wave be generated from an explosion of dynamite or from impacting the eath. The term also applies to a land vehicle which carries a vibrator, such as one that applies a vibrating force to the surface of the earth under the control of a chirp excitation signal, thus causing the earth to undulate at the point of application of the force with a frequency and amplitude corresponding to that of the applied excitation signal. Again, a trailer unit may be considered a truck.

Source Area

This is an area such as one along the line of exploration, in which are located a series of shot points that are closely spaced. Usually a source area extends over the distance of only a few, often only two, geophone stations. The received waves are usually capable of being vertically stacked to enhance the signal-to-noise ratio.

Geophone or Receiver Spread

This term is applied to a line of geophone stations at which waves are received from a common shot.

Setup

A setup is a combination of a particular geophone spread with a particular shot point. However, the term can sometimes be applied where the actual succession of shots occur at different points in a source area, especially if the points are so close together that equal-time compositing is applicable. Sometimes a setup is called a profile in the seismic prospecting art.

Numerous other terms will be introduced and defined from time to time. Still others will be used in a manner common in the art without definition. In some cases, because of the nature of language, a term may have more than one meaning. An effort will be made in the following description to use words in context which will render their meaning clear to those skilled in the art, thus avoiding the necessity for defining all terms that are used herein.

PRIOR DIGITAL SYSTEMS

In the past it has been common to ship digitized seismic records to a data processing center where the records are processed in various ways, such as by compositing and correlation. One of the disadvantages of performing the processing of the records only in a computer center, as has been common in the past, resides in the fact that there is a long delay between the time that the records are made in the field and the time that the information obtained from an analysis of the records can be returned to the field. The delay, often called "turn-around time", may be several weeks, or it may be several days. Hardly ever has it been only a few hours. And it has never been just a matter of minutes. As a result, the information is often returned to the field operators long after the shooting and recording trucks have moved from the area in which the records were recorded. This means that if the recording was deficient, it was then necessary to return to the area in question in an attempt to obtain satisfactory records, or else just accept and work with bad data.

Some attempts have been made to overcome the difficulties of the delay inherent in the use of a remote comuter center by installing a computer on a large auxiliary trailer and moving the trailer into the vicinity of the area being explored. Such a trailer can be transported over highways and located in a small community near the area where the exploration is occurring. Such a trailer can carry a large digital computer. But even in such a case, the turn-around time may be hours or even days.

A Vibroseis system for reducing turn-around time has been described by Russo and Nadon (see "An Advanced Digital Vibroseis System" by F. A. Russo and D. J. Nadon in the Summer/Autumn 1970 issue of the *Bendix Technical Journal*, pp. 63–65). This article also describes correlation of one or more of the trains of received signals with the chirp signal within the data acquisition system in order to produce an impulse-type signal which may be displayed visibly to assist the operator in determining whether some modification needs to be made and whether the shot needs to be repeated before proceeding further with the plan of exploration. These authors also suggest correlating several of the many composited records with the chirp signal in order to convert the Vibroseis type records to impulse-type record form for monitoring purposes.

Use has previously been made of digital computers installed on a boat (see, for example, Born U.S. Pat. No. 3,525,072, and a paper titled, "A Computer Controlled Marine VIBROSEIS Operation", by R. A. Broding, and presented at the OECON Exploration Conference, Sept. 1–5, 1969 at Rio de Janeiro, Brazil. See also, a paper titled, "A High Power Computer Controlled Marine VIBROSEIS System", by R. A. Broding, John Hess, and R. W. Wanous, and presented at the Annual International Meeting of the Society of Exploration Geophysicists, Oct. 2, 1968, at Denver, Colorado. The Born system involved stacking of analog data. One system involved stacking of digital data and also actually made use of a single "copperhead" correlator to help in monitoring. However, such systems are entirely different from those to which the major features of the present invention are applied. In those systems, the shooting occurred while the boat was in motion. With such a system, monitoring could aid in making corrections for changing the system of shooting and recording, while the vessel continued down the line of exploration. But in such systems, it is often very difficult and expensive, if not impossible, to reshoot a particular setup. In many of its features, the present invention is not applicable to such moving vessels, but are applicable only to exploration systems that employ shooting trucks and recording trucks that operate on land.

In the conventional method of equal-time compositing employed heretofore, successively recorded trains of seismic waves from successively generated shocks, have been recorded on a continually moving loop of magnetic tape. Such systems have employed synchronous timing arrangements for initiating the seismic waves each time the loop of tape passes a predetermined point in its path to assure proper superposition of equal-time signals. A record of the Vibroseis signal was also made on the tape. The composited signals produced for each of the several setups were transferred to a roll of magnetic tape upon completion of each compositing operation.

The tape with the series of composited signals for different setups are then shipped to a computer center for analysis. At the computer center, the received signals are correlated with the chirp signals in order to produce trains of signals which resemble those that would be received in a traditional seismic prospecting system employing a short impulse.

In a digital system that has been commonly employed in the past, the trains of seismic waves detected at a spread of geophone stations are sampled at regular intervals and the samples are fed to binary gain amplifiers in order to produce a series of signals that lie within a predetermined range, together with a corresponding set of signals that indicate the gain of the amplifier required to bring the amplitudes of the successive samples of the signal into that range. The resultant signals are then digitized and formatted and recorded on a magnetic tape. In the digitizing process the incoming waves are normally sampled at regular intervals, such as about 1 ms to about 4 ms.

In prior art Vibroseis systems, the chirp signal that was employed to operate the vibrator may have any one of a small number of characteristics. The control signal that was employed to generate the chirp signal has often been prerecorded in magnetic tape or the like. In some cases it has been provided by a chirp-signal generator which includes means for establishing the length of the chirp at any one of a small number of time intervals and also means to establish the initial and final frequencies at any one of a small number of pre-established values.

GENERAL STATEMENT OF THE INVENTION

The present invention relates to an improved system for acquiring and processing data in the field to aid in monitoring field operations and to provide records for delivery to a data processing center where they are further processed to produce the desired representations of the subsurface formations. The invention is employed in a land-operated vehicle system, and particularly in a Vibroseis-type system. The invention employs a train of Vibroseis generators carried on separate trucks or other vehicles which are driven from shot point to shot point along the line of exploration, and also employs a recording unit which incorporates the computer system of this invention, together with recording components, and together with suitable electronics for interrelating and coordinating the action of the computing system with the action of the vibrators. As in the prior art, the chirp signal is generated in the recording unit and is transmitted by radio to the vehicles which carry the Vibroseis generators.

In the best mode of practicing this invention, the processing of received signals takes place in the recording truck during the course of conducting a survey.

One of the features of the invention involves the use of certain types of computers on the recording truck which permits the reduction of turn-around time for such processing to a matter of minutes. With this invention the computations needed to enable the operator to monitor the result of his work are usually performed while the recording truck is stationary and before the shooting trucks have moved a great distance. As a result, with this invention, corrections can be made in the method of operation within a matter of minutes and before the field equipment has moved miles away from the point at which the difficulty arose. Thus, this invention avoids the waste otherwise associated with long turn-around time of weeks, days, or hours.

The recording system of this invention is adapted to be employed for recording impulse-type seismic waves or Vibroseis-type seismic waves and it is adapted to provide equal-time compositing of received waves of any kind. It is further adapted to produce at its output a magnetic tape or other reproducible type of recording for later delivery to a data processing center. In normal operation, when employing a Vibroseis-type system, the output records include records of the composited waves. The correlated waves not only aid in monitoring, but also make later correlation at the computer center unnecessary.

From a hardware viewpoint, the system of this invention employs two programmable general purpose minicomputers, each with its own static magnetic-core memory and each with its own rotary memory in the form of a magnetic drum, a typewriter or other simple arrangement for feeding to the system control parameters and information respecting the conditions and location of operation and suitable project identifiers, and interface arrangements are employed for transferring information as required from one computer to the other and to and from other components under the control of the operator.

The system to which this invention is applied also utilizes a roll-along switch arrangement for coordinating records that are to be composited, suitable binary gain amplifiers and filters, a multiplexer and digitizer for converting all of the trains of received analog signals into a single train of binary digital signals. The system also employs demultiplex and cross-correlation units and an oscillographic recorder to enable the local production (at the recorder truck) of a multiple trace impulse-type seismogram of Vibroseis-type recordings. The system includes a means for formatting the composite signals and the correlated signals in the same manner to facilitate recording either with a common multipletrace oscillographic recorder in the truck.

Certain computer programs are stored in the static, that is, stationary, memory units of the two computers. Other computer programs are stored on the drums of the respective computers for use as required upon command of the operator. One of these programs is called into action upon starting of the equipment to interrogate the operator, requiring him to type into the system parameters that are to be employed in subsequent operations and other data respecting the operation. Various operations are performed automatically upon command of the operator in order to cause the required seismic waves to be generated, recorded, and processed in the manner desired at each of a series of setups. Means are also provided for storing information regarding the operations and for automatically generating an observer report. Such a report can be relied upon for accuracy that excels any to be expected from a handwritten report ordinarily prepared by the operator. Identifying information is also stored and some is generated automatically. Such information is automatically applied as a header to the output magnetic tape recording to assure proper identification of the output records and proper coordination of the output produced at the data processing center with the field operations.

The foregoing and various additional features and advantages will be set forth hereinafter in varying degrees of detail as needed, to enable a person skilled in the art to practice the invention. The invention is described in connection with the drawings wherein:

FIG. 1 is a schematic diagram of a seismic exploration system employing the invention;

FIG. 1A shows a modification of the seismic source arrangement;

Figure 2A:
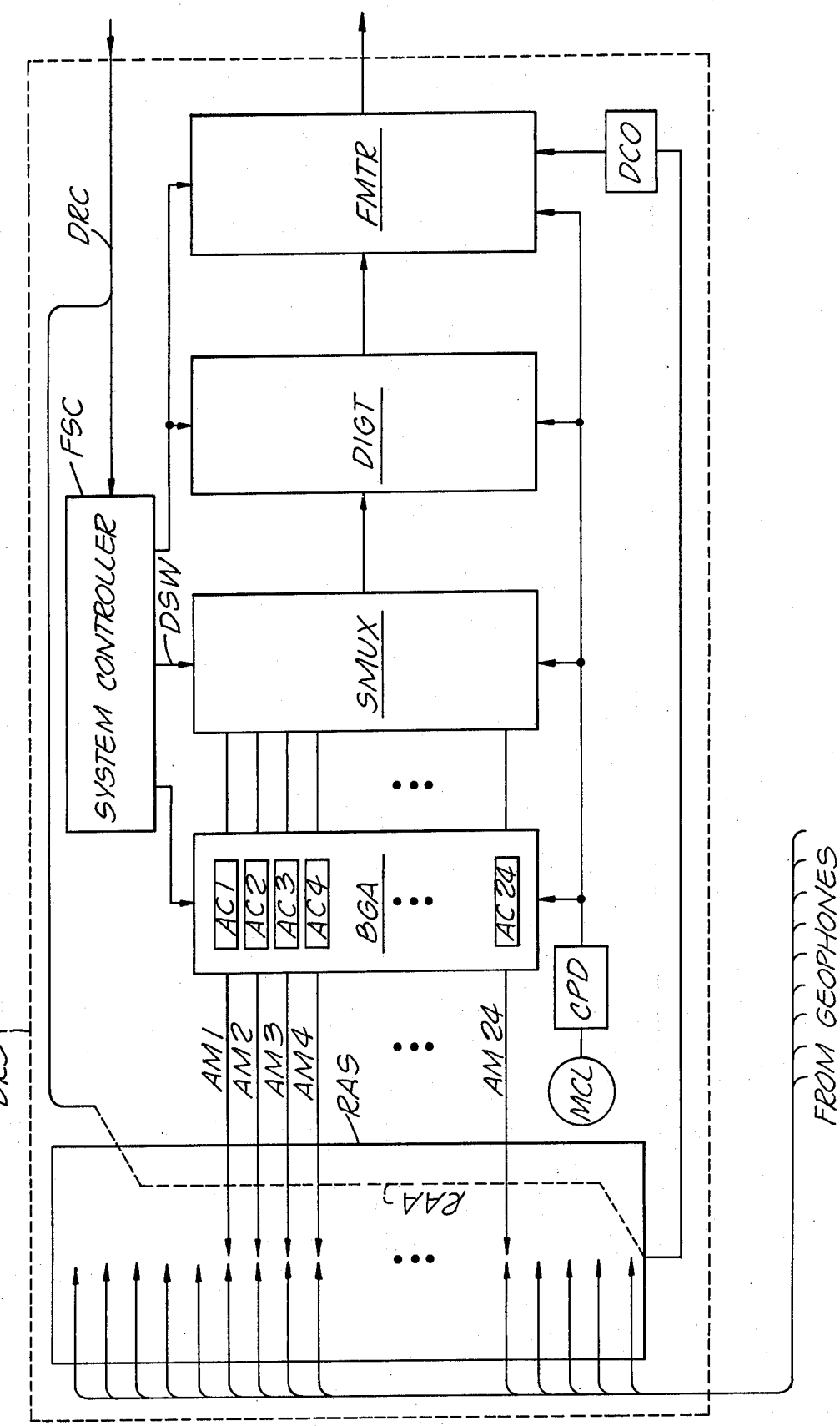
Figure 2B:
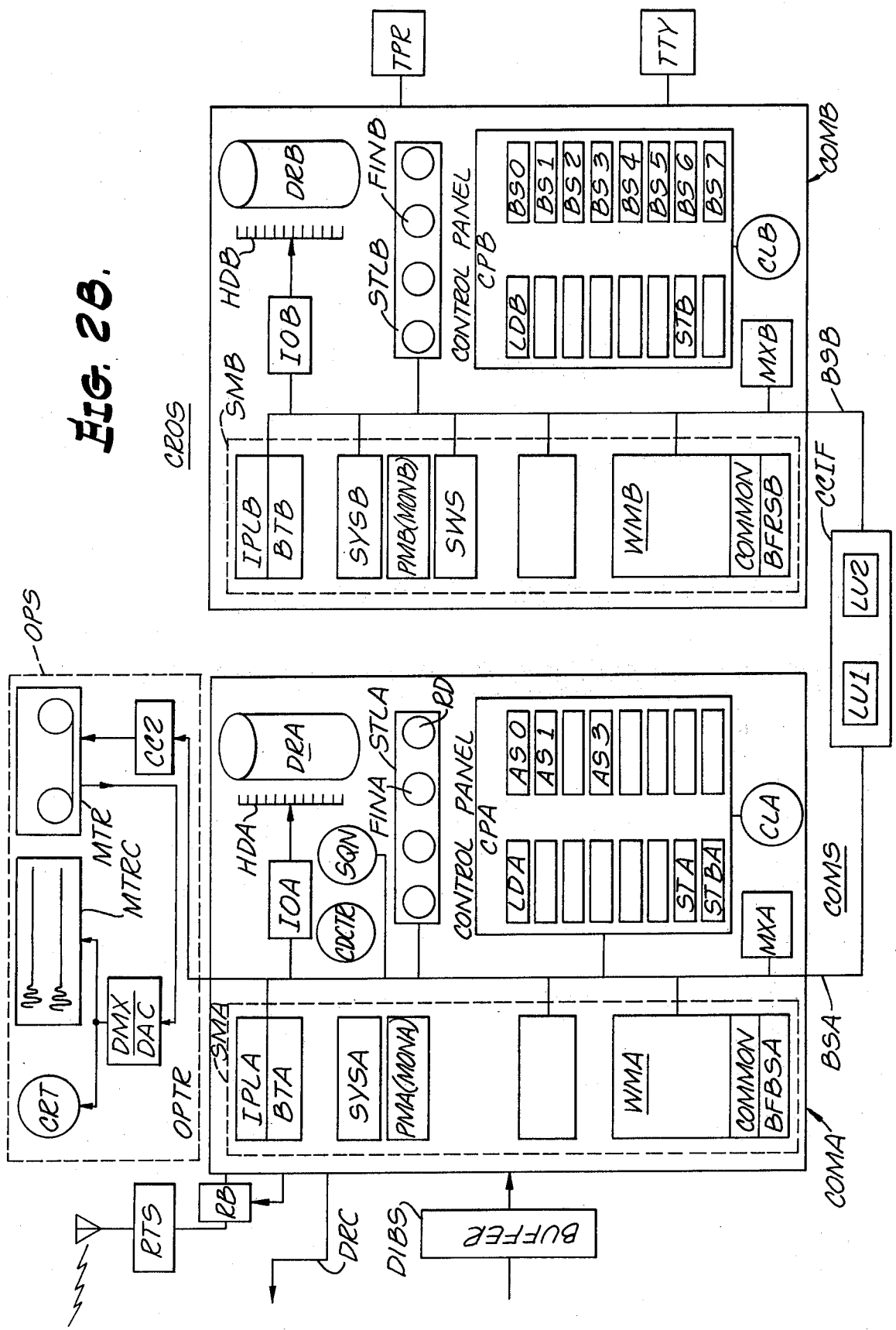
Figure 3:
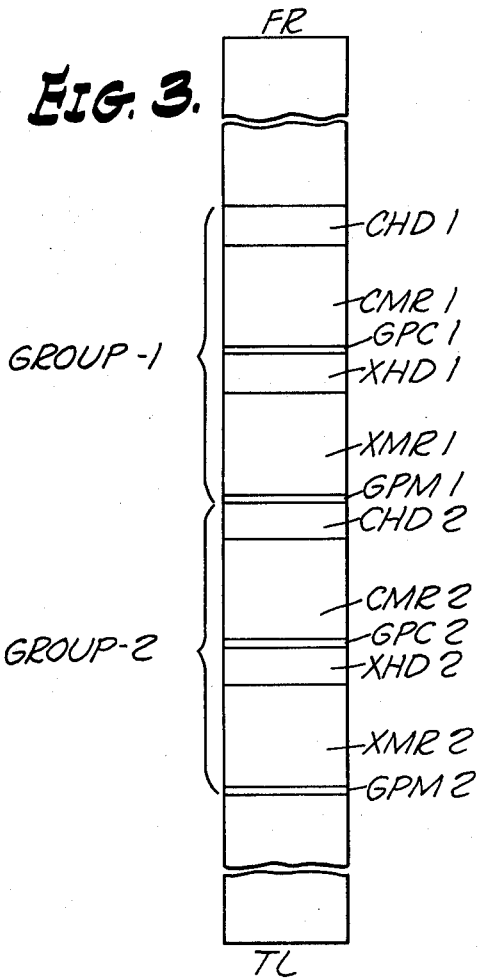
Figure 4:
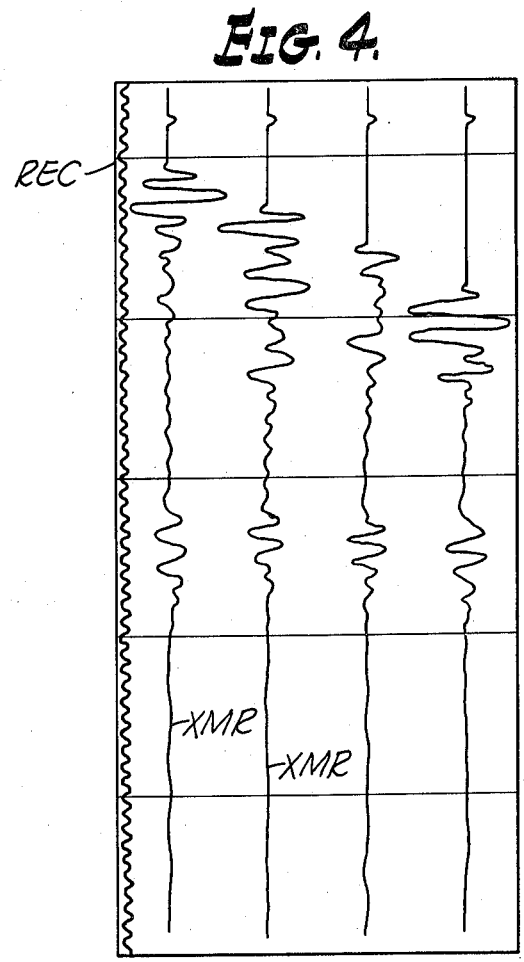
Figure 9:
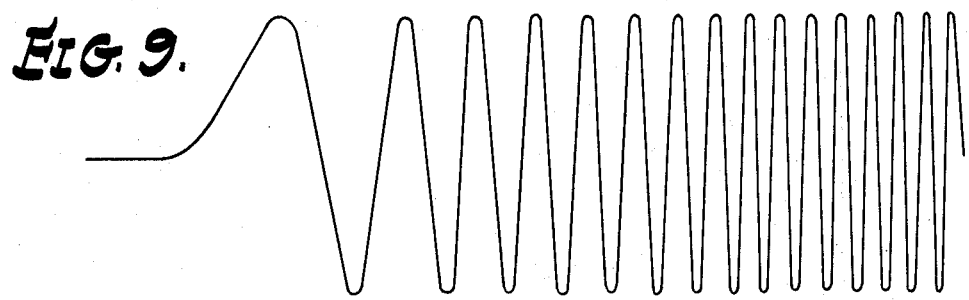
Figure 10:
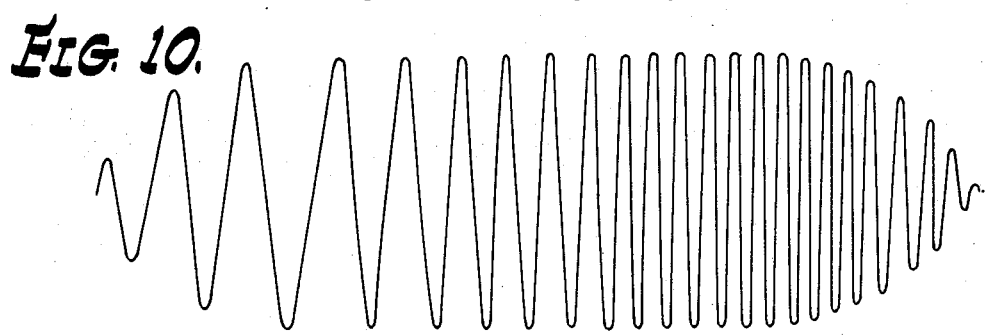
Figure 15:
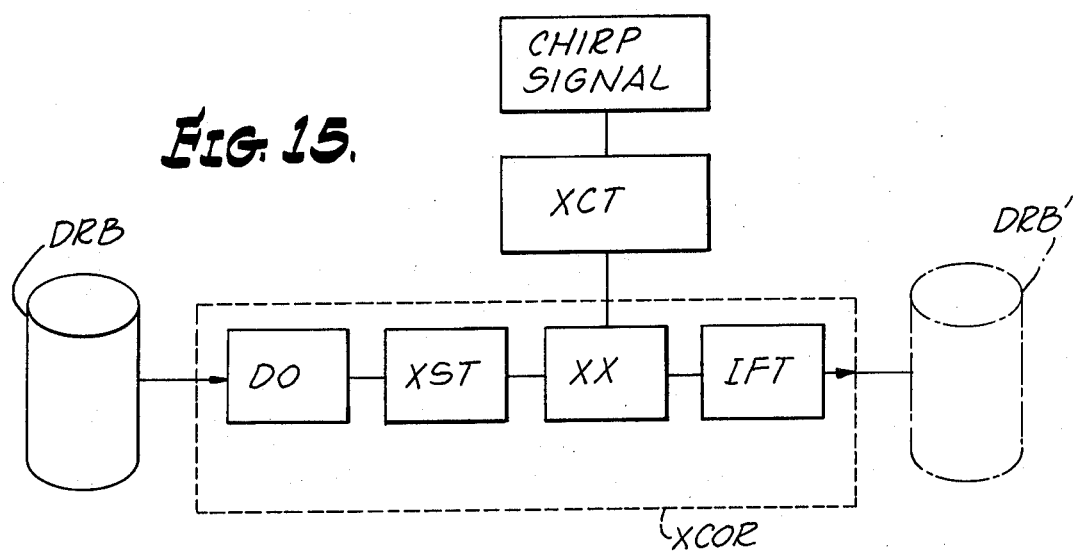
Figures 11, 12, 13:
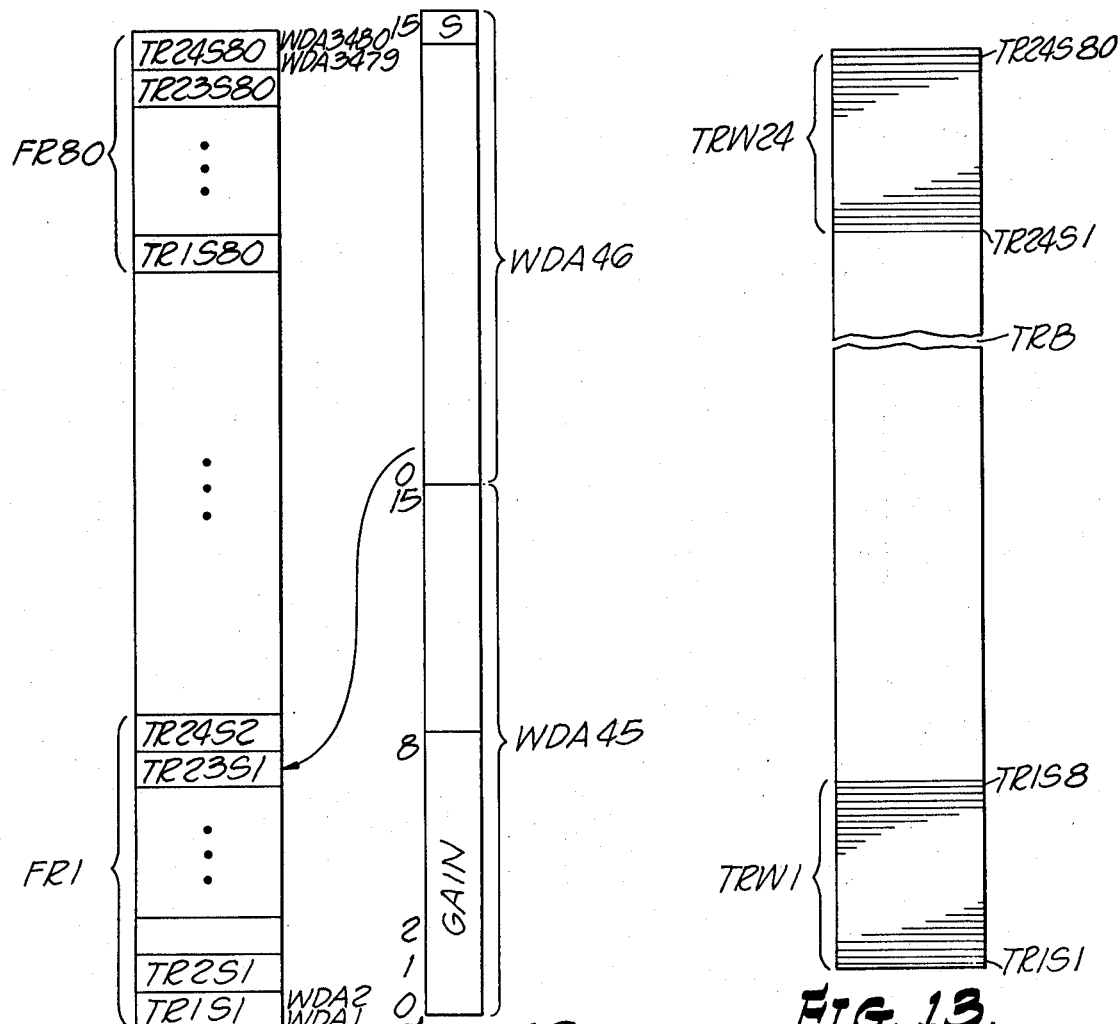
Figure 14:
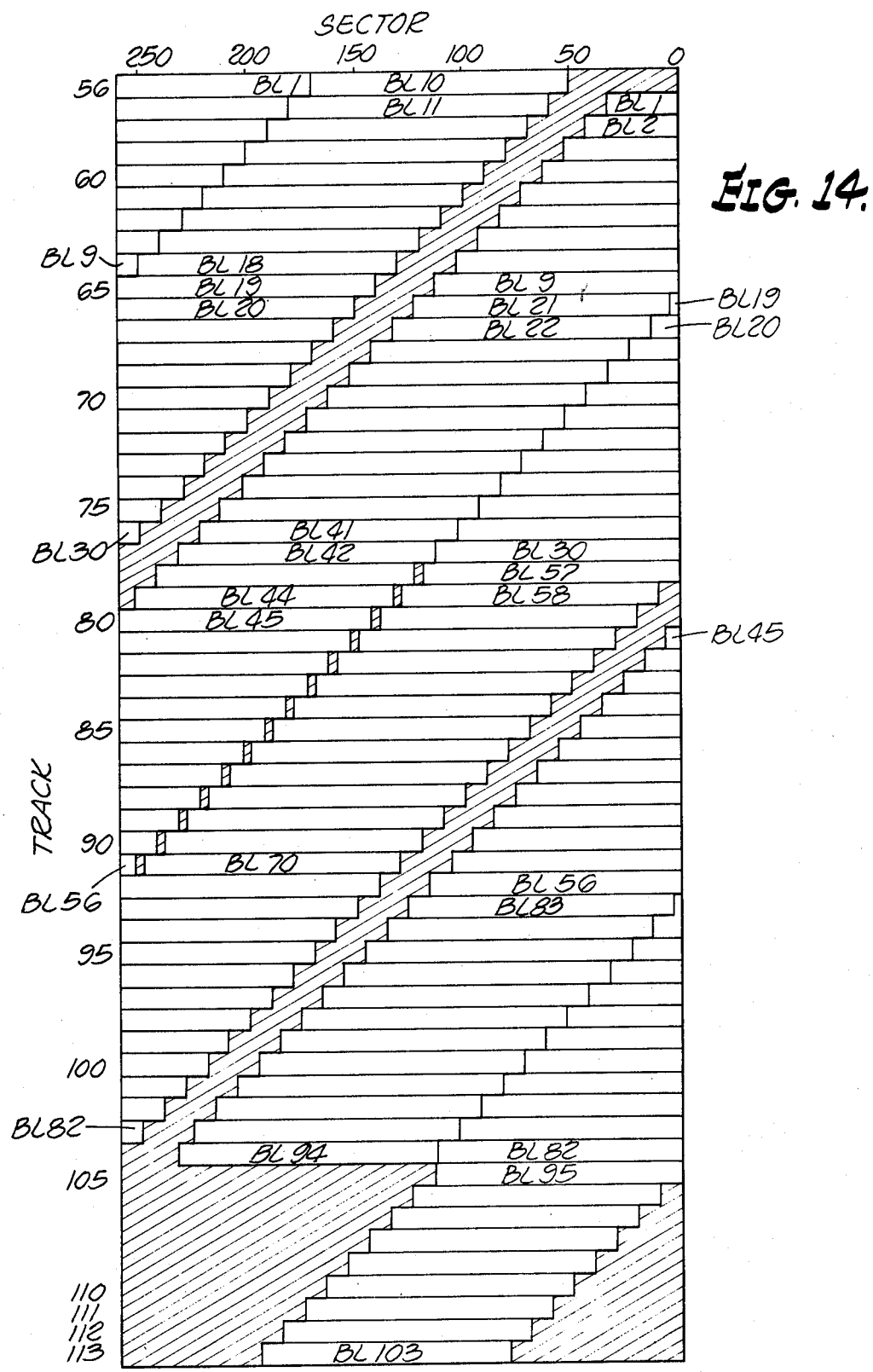
Figure 17:
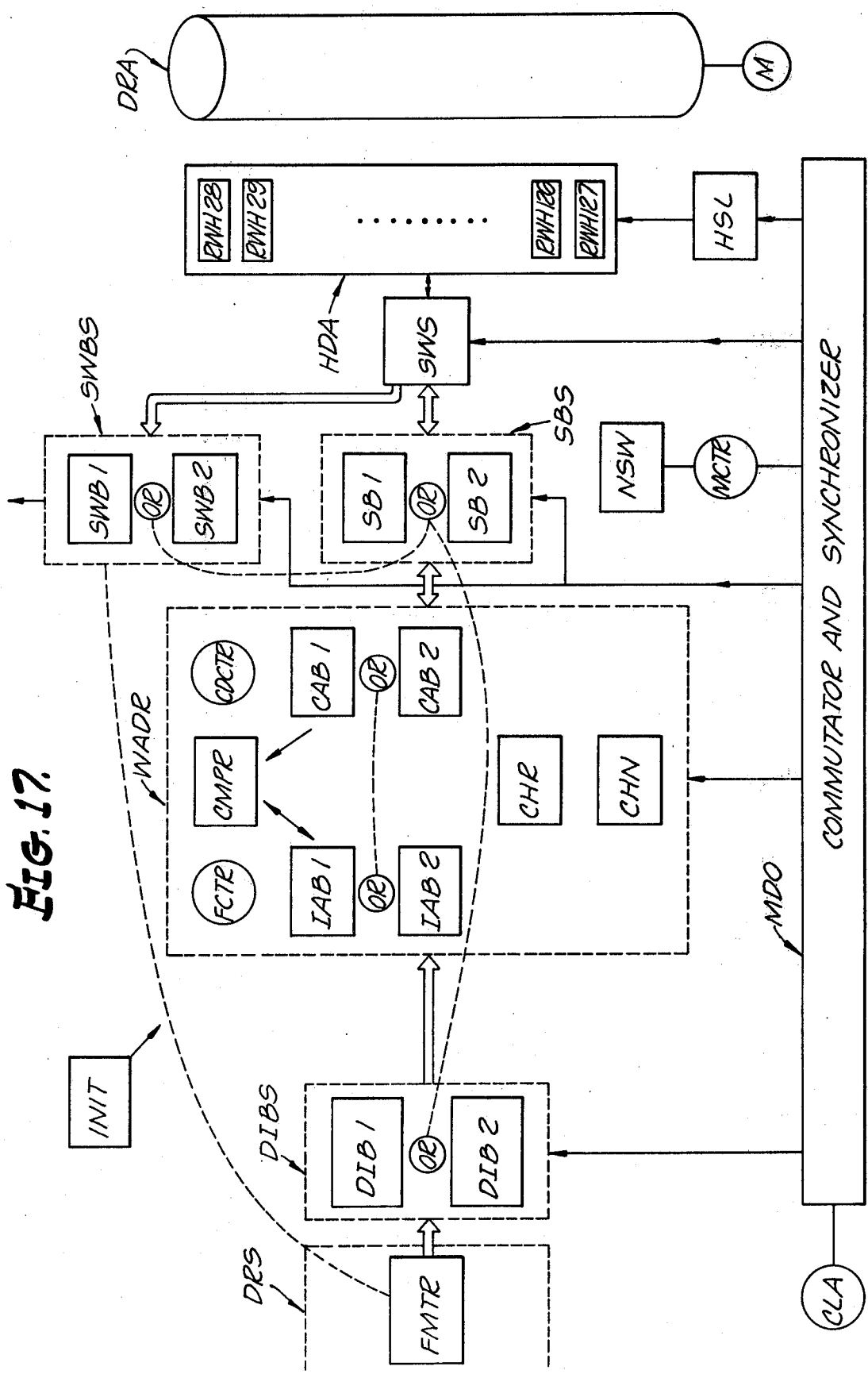
Figure 18:
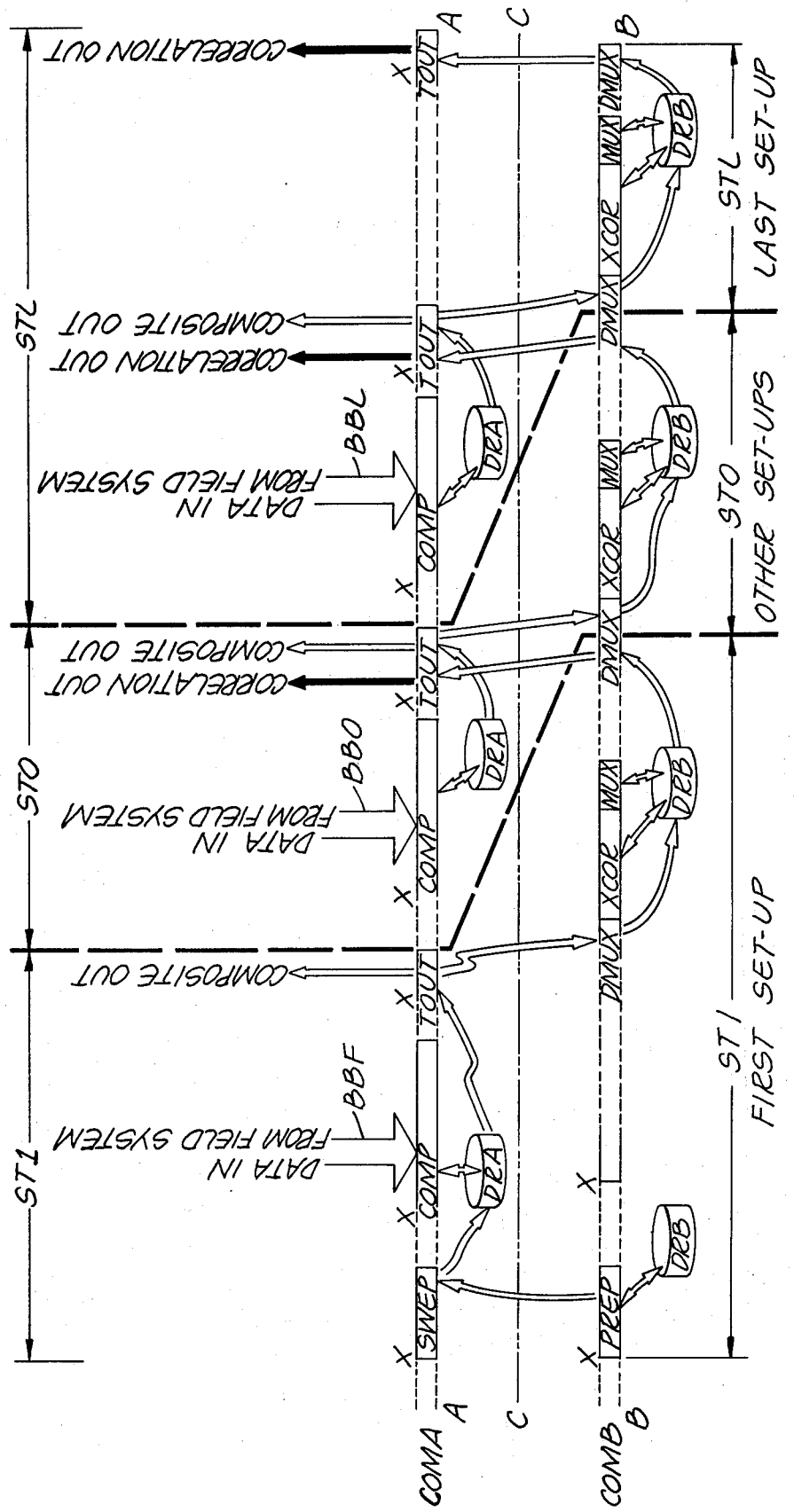

FIG. 2, consisting of FIGS. 2A and 2B, is a schematic diagram of the recording systems;

FIG. 3 is a schematic diagram of a magnetic tape record produced in accordance with the invention;

FIG. 4 is a portion of an eye-readable seismogram produced for monitoring or other purposes;

FIG. 5 is a block diagram of an amplifier channel;

FIG. 6A is a schematic diagram of a block of drum storage;

FIG. 6B is a schematic diagram of a sector of drum storage;

FIG. 7 is a map of the storage on the drum of the correlation computer;

FIG. 8 is a map of the storage on the drum of the compositor computer;

FIG. 9 is a graph of a linear chirp signal;

FIG. 10 is a graph of a cosine-tapered chirp signal;

FIG. 11 is a schematic diagram of a block of data of a multiplexed record;

FIG. 12 is a schematic diagram of a sample of seismic data;

FIG. 13 is a diagram employed to explain a partial demultiplexing process;

FIG. 14 is a map or the storage area of the correlation drum employed to explain the partial demultiplexing process;

FIG. 15 is a block diagram employed to explain the correlation operation;

FIG. 16 is another block diagram employed to explain the correlation operation;

FIG. 17 is a block diagram employed to explain certain double buffering and noise suppression operations that occur during the compositing operation; and FIG. 18 is a diagram employed to explain certain interacting relations in the operation of the two computers.

GENERAL DESCRIPTION OF THE OPERATION OF THE INVENTION

Before describing any of the details of the invention and its computer system, it is desirable to provide a general description of one typical form of operation. For this purpose, reference is made to FIGS. 1, 2, 3, and 4.

Equipment

FIG. 1 shows the general arrangement of the field equipment as it moves along a line of exploration X—X, including the recording truck RT, a conventional geophone cable GCB establishing up to 120 geophone stations GE1 . . . GE120 uniformly spaced along the line of exploration, and a seismic wave source SS in the form of a train of three Vibroseis generator trucks VIBTR. Usually, the cable has a length sufficient to establish only about 120 geophone stations or fewer. The geophone stations are located at points uniformly spaced along the line of exploration by a distance of predetermined amount, such as 220 feet or 350 feet or 440 feet. For convenience, unless otherwise stated, we will assume that a small cluster of geophones is located close to each geophone station and that their outputs are all connected in series or in parallel or in a combination of such connections.

In practice, the three Vibroseis generator trucks span a distance which is smaller than the distance between two successive geophone stations. The trucks themselves may be only about twenty feet long and spaced only thirty feet apart between centers. Thus, typically, they span a distance of only about 60 feet, which is less than the distance between two successive geophone stations, such as indicated in FIG. 1A.

The index numbers of the geophone stations generally increase consecutively from the down-line end to the up-line end of the line of exploration. In the methods of exploration illustrated herein, exploration starts at the down-line end and continues in the direction of the up-line end.

Each of the vibrator trucks VIBRTR has a vibrator VB which may be lifted from the ground to permit easy movement of the truck over the surface of the earth and which may be lowered into intimate contact with the ground when the truck is stationary.

When the vibrators VB are in contact with the ground, they are driven by means of a motor, as is well known in the art, in order to impart vibrations to the earth. The frequency of vibration is changed as a monstonic function of time in order to produce a chirp-like train of seismic waves sometimes referred to simply as a chirp seismic signal, or chirp.

As illustrated in FIG. 1, the three Vibroseis trucks VIBTR employ radio antenna VTA for receiving chirp excitation signals transmitted from the antenna RTA on recording truck RT. These chirp signals are employed to actuate the vibrators VB of the respective vibrator trucks to simultaneously vibrate the earth over the distance spanned by the train of trucks.

The recording truck RT includes a control and recording system briefly called a recording unit or system for controlling the generation of chirp signals by the Vibroseis trucks and for recording and processing seismic waves received at various geophones spreads and performing other operations as described hereinafter. The principal parts of the control and recording system are represented schematically in FIG. 2, which consists of two parts, FIG. 2A and FIG. 2B. The principal part of the data receiving system DRS is shown in FIG. 2A while the principal parts of the computing system COMS is represented schematically in FIG. 2B, together with the radio transmission system RTS and the output system OPS.

The recording system CROS includes a chirp excitation signal generating means which, when properly actuated, operates a radio transmitter RTS to transmit a chirp excitation signal from the transmitter antenna RTA to the receiver antenna VTA on the vibrator trucks VIBTR. Binary digital signals representative of the chirp signal generated in the computer system COMS are applied through a buffer RB to the radio transmission system RTS. The radio transmission system includes an audio frequency subcarrier oscillator and a radio frequency oscillator. The transmission system RTS also includes a digital to analog converter for converting the digital chirp signal into an analog chirp signal. The audio frequency subcarrier is modulated by the analog signal which appears at the output of the digital to analog converter. This audio frequency subcarrier wave in turn modulates the radio frequency signal.

The vibrator trucks VIBTR include suitable means for demodulating the received signals to produce an analog chirp signal which is employed to actuate the vibrators VB in order to apply a chirp-like seismic signal to the earth.

The radio transmitters and receivers, as well as the Vibroseis truck equipment, are of conventional type. Among other things, they include means for the operator of the recording truck RT and the operators of the Vibroseis trucks VIBTR to communicate with each other by radio during the period when the audio frequency subcarrier signal is off, which is during the period while the chirp signal is not being transmitted. Ordinarily, the operators of the Vibroseis trucks VIBTR are aware of the transmission of the chirp signal only by virtue of the fact that the received signal is audibly reproduced in the vibrator trucks VIBTR.

As shown particularly in FIGS. 2A, and 2B the data receiving system DRS also includes a roll-along switch RAS, a bank of amplifier channels AC1 . . . AC24 provided with various inputs AM1 . . . AM24 to which signals are fed by the roll-along switch RAS from a selected spread of geopones. Each of the amplifier channels includes a preamplifier PAM, an alias filter FIL and a binary gain amplifier BGA, as illustrated in FIG. 5.

As shown in FIG. 2B, the computer system COMS includes two computers, a compositing computer COMA and a correlation computer COMB. Each of the computers comprises a control panel CPA and CPB respectively, and a corresponding status light panel STLA and STLB. Each computer COMA and COMB has a static memory SMA and SMB respectively and also continuously moving magnetic drums DRA and DRB associated therewith. The two computers COMA and COMB are interconnected by a computer control interface unit CCIF for transferring information signals and control and program signals from each computer COMA and COMB to the other.

A seismic wave output system OPS is connected to the compositing computer COMA. The output system includes a cathode ray oscilloscope CRT, a multiple trace osillograph recorder, or camera, MTRC and a magnetic tape recorder OPTR. The output system may also be employed for storing or displaying output records and, if desired, copies of the programs of the computer system.

The computer system COMS includes a number of processor units and program storage units for making computations automatically and for performing selected operations in a predetermined sequence and for other purposes as described herein.

A system controller FSC is incorporated in the data receiving system DRS and another control system operated by control panels CPA and CPB is embodied in the computers for establishing operating conditions and for selecting, initiating, and controlling various processing operations.

Normal Operations

For purposes of explanation, we assume that 20 chirp signals are to be transmitted and the corresponding received seismic waves are to be recorded to produce a composite seismic wave recording for each geophone station of each setup.

The setup sequence number is displayed automatically on a special counter SQN and the chirp residue number of the current chirp signal for the current setup is indicated on a count-down counter CDCTR. The setup sequence number counter SQN is usually initialized at the commencement of operations on any one day and the chirp signal sequence number is initialized at 20 or at some other value predetermined by the operator, by manipulation of certain of the controls. The setup sequence number SQN is incremented by +1 automatically upon the completion of each compositing operation for a setup. The chirp residue number is incremented by −1 (or decremented by +1) upon transmission of each chirp signal. Thus, each time a chirp signal is transmitted, the indication of the counter CDCTR is reduced by 1 to enable the operator to know how many chirp signals remain to be composited for the current setup.

The entire compositing for a setup is completed automatically when the chirp sequence number reaches 0. But compositing may be interrupted at any time by manual manipulation of a control switch on control panel CPA if desired.

In the usual method of operation, the chirp signals are transmitted and corresponding received waves are processed, all automatically, once a start switch SSW has been pressed. But if the system has been set for manual operation by operation of a suitable switch, the start switch SSW is pressed to initiate the transmission of each chirp signal and to perfom the processing of the resulting received signals. In either event, the engines of the vibrator trucks remain operating while the chirp signal is being transmitted. Upon termination of the sound reproduction of the audio-frequency subcarrier signals in the trucks, the drivers of the trucks advance to the next vibrator point in the seismic source area, where they then normally remain until they hear that the transmission of a new chirp signal has been completed, that is, until the next time reproduction of the audio-frequency subcarrier signal has terminated.

In the more usual method of prospecting, the Vibroseis trucks advance down the line by small increments of distance between successive shots for the same setup. Thus, for example, if the intergeophone-station spacing is 220 feet and 20 shots are to be fired for each setup, the trucks may advance 11 feet between successive shots. When this is done, at the end of the completion of the firing of shots for one setup, the Vibroseis trucks are in position for the commencement of the next setup.

For the purpose of the present explanation, it will now be assumed that the entire system has been operating satisfactorily and that records have been made for one setup, and that the system is now operating on the second setup.

In the first setup, the three vibrator trucks VIBTR have just been operating in a source area extending from geophone station GE1 to geophone station GE2. We assume that in the first setup the roll-along switch RAS was previously set to connect the geophnes associated with, or at, geophone stations GE21 . . . GE44 to the respective amplifier inputs AM1 . . . AM24. All of the parameters corresponding to the locations of the previously connected geophones GE21 . . . GE44 and the setting of the roll-along switch RAS have previously been entered in the computer and a composite recording has been made for the first setup. We will refer to this as the old or prior or first setup recording. Note that no cross-correlation has yet occurred.

The recording that is to be made for the new, or second, setup involves a change from the prior recording in that the three vibrator trucks have been moved to new positions corresponding to the source area that extends from geophone station GE2 to geophone station GE3. At the same time, the roll-along switch RAS is moved to connect geophones GE22 . . . GE45 respectively to the amplifier channels AC1 . . . AC24 respectively. This new condition of roll-along switch RAS is read into the system parameter bank automatically. The recordings made for such setups provide information for overlapping areas of the subsurface formations.

After the Vibroseis trucks VIBTR and the recording system CROS have been readied for operation at the next or current setup, a ready light RD turns on at the control panel CPA indicating that the system is ready for reoperation by closing a starting switch SSW on control panel CPA. At the time that the start switch SSW is pressed, four principal actions are initiated.

First of all, various processor units in the computer system and the output recorder OTPR are enabled, that is, are prepared for automatic operation. Certain of the units start operation immediately, others operate in timed sequence. At the time that the start switch is operated for a setup, means within the computer automatically increment the setup sequence number displayed by the counter SQN and decrement the chirp sequence number counter CDCTR.

Secondly, any previously correlated signals that have been processed are immediately transferred from the correlation computer COMB to the magnetic tape MTR of the output recorder OPTR. If recordings are being made for only the first setup of a project, there are no such correlated records to be transferred. But correlated records are ready to be transferred upon completion of compositing for each subsequent set.

Thirdly, then the old stacked records are transferred from the compositior computer COMA to the magnetic tape MTR. They are also transferred to correlation computer COMB where they are then correlated with the chirp signal. In normal operations, the correlation proceeds automatically as other operations continue. Usually, the correlation process is completed during the stacking of the new records.

Fourthly, then the transmission of a chirp excitation signal is initiated from the chirp signal generator means within the recording truck RT via radio to the vibrating truck antennas VTA. The program is written so that, when an appropriate selector switch is operated at the option of the operator, the start switch must be reoperated manually prior to performance of the fourth step. In practice, samples of the chirp signal that have been stored on the drum of compositor computer COMA are transferred to the transmitter while signals are being received and sampled by the field data receiver system DRS and the received samples are processed by that computer COMA.

The signals received by the vibrator truck antennas VTA are demodulated by equipment in the vibrator trucks to generate the desired chirp signal. This signal is applied to the surface of the earth by the three vibrators VB at the bottom of the three vibrator trucks. The three vibrators actuate or excite the ground simultaneously thereby causing a seismic wave of changing frequency to be transmitted downwardly into the earth. As the seismic waves encounter strata beneath the surface of the earth, they are partially deflected upwardly to the geophones at the respective geophone stations. The vibrations received at each of the geophone stations is converted into corresponding undulatory electrical waves which are transferred through the roll-along switch into the respective amplifier channels AC1 ... AC24 and from thence to the computer systems COMS where they are processed.

If the system is operating in the manual mode, the start switch SSW is then pressed again causing a new chirp excitation signal to be transmitted and a new set of seismic waves to be received and recorded. The newly received signals are added to those previously received and recorded. Again, the number of chirp signals that remain to be generated is decremented on the counter CDCTR.

While each chirp signal is being transmitted and the resultant seismic waves recorded and composited, the previously composited waves which have been transferred to the correlator, are usually undergoing the appropriate correlation operation.

The signal received as a result of the generation of each chirp signal is stacked with any previously received signals for the same setup in the compositor COMA. After the end of the time interval (input time) preassigned for receiving reflected waves due to one chirp signal, a new chirp signal is transmitted unless the chirp residue number has reached 0. This new transmission may be initiated automatically or under manual control.

A continuously running portion of the received signals is usually displayed in analog form on the cathode ray oscilloscope CRT in order to enable the operator to detect major irregularities in the operation of the system. Under certain conditions described hereinafter, multiple-trace oscillographic records are made intermittently during the recordings for a setup.

When the compositing of all the received signals for one setup has been completed, the processor units of computer COMA are disabled automatically and a recording completion signal is indicated by a signal light FINA on the status panel. Likewise, when the correlating for the composited signals for the previous setup has been completed, the processor units of computer COMB are disabled automatically and a correlation completion signal is indicated by a signal light FINB on the status panel of computer COMB. When both processes have been completed, the ready light RD on the control panel CPA turns on, indicating that the system is ready again for reoperation. The energization of the completion signal lights FINA and FINB and the ready light RD occur automatically in response to the operation of switching units within the computers COMA and COMB.

In one form of the invention, each time the compositing for a setup is completed, the computer transmits a signal through a connecting bus DRC to the roll-along switch RAS to advance it automatically to its next position.

In another form of the invention, the roll-along switch is operated manually.

In either event, upon completion of the second setup, the roll-along switch RAS is advanced one position so that now the geophones at positions GE23 ... GE46 are connected respectively to the inputs AM1 ... AM24 of the bank of amplifiers. The entire process described above is then repeated forming a new group of records on the magnetic tape MTR.

From time to time, as the process of collecting, processing, and recording is repeated, portions of the geophone cable itself are moved along the line of exploration as described below. More particularly, during the progression along the line X—X of exploration, sections of the cable are intermittently removed from the down-line end of the cable and carried to the up-line end of the cable and connected at that end. In due course, the recording truck RT is advanced along the line. Thus, a system is established for continuing operations as described above - recursively, so to speak - for an indefinite distance along a line X—X of exploration. There are many other ways of operating the system to achieve the desired continuous profiling of waves deflected from common points on various subsurface strata.

Thus, the manner in which the source areas are changed and the receiver positions are changed from one setup to another as the work proceeds down the line X—X of exploration, may be summarized in the following table:

TABLE I

| Setup | Source Area | Geophones Connected |
|---|---|---|
| 1 | GE1-GE2 | GE21-GE44 |
| 2 | GE2-GE3 | GE22-GE45 |
| 3 | GE3-GE4 | GE23-GE46 |
| 4 | GE4-GE5 | GE24-GE47 |

There are, of course, other ways of arranging the shot points relative to the geophone stations. The arrangement represented in Table I involves what is known as a single-ender arrangement with an in-line offset. This offset refers to the distance between the source area and the nearest geophone station in the setup for which the recording is made.

In another widely used system, split spreads are employed. In this case, the source area is located between two sets of geophone stations of equal length on opposite sides of the source area. The lengths may be unequal, but this is uncommon.

Upon completion of any set of composite records for a given setup, the computer system may be manipulated in order to generate in the recorder MTRC an eye-readable copy of the cross-correlated records. These records XMR may be in the form of a multiple trace oscillogram REC as shown in FIG. 4. They may also be in the form of variable density phonographically reproducible records. An experienced operator examining these traces can readily determine whether it is desirable to repeat the recording for the setup before proceeding or whether the equipment requires servicing or whether some of the parameters that control various operations and functions should be altered.

Thus, for example, if the composite record is excessively noisy on a particular trace, the equipment may be tested to determine the origin of such noise and steps taken to eliminate the source of the trouble. On the other hand, if all of the traces of the record are defective, special investigations may be initiated to determine whether the difficulty is with the equipment or with the chirp excitation signal. If, for some reason, the difficulty is of a temporary kind, corresponding to the last previous setup, the trucks may be returned to the prior position and a new set of recordings made for that setup.

With this invention, any difficulty that arises because of defective equipment or unusual extraneous noise is discovered before the equipment has advanced more than one or two setups along the line X—X of exploration.

Just prior to the time that the composite traces are transferred to magnetic tape in the recorder, a record of parameter information is transferred to the tape forming a header on the record identifying the project, the spread, the setting of the roll-along switch, and other parameters. The header and the composited signals are stored on the magnetic tape MTR in a conventional format. Typical formats are described in an article by Northwood et al, "Recommended Standards for Digital Tape Formats", (32 SEG 1073–1084). In the specific apparatus disclosed herein, a standard 1010 format of the kind that is well known is used. The header is recorded for both the correlated waves and the composited correlated signals and the composited signals for each setup. The same format is employed for recording the correlated signals as for the composited signals, for reasons explained hereinafter.

As indicated in FIG. 3, the resultant magnetic tape recording for each setup thus contains a succession of groups of four record sections extending from the front or beginning end FR of the tape to the rear or tail end TL of the tape. Each group consists of a composite header section CHD, a composited record section CMR, a gap GPC, a cross-correlation header section XHD, and a cross-correlation record section XMR and another gap GPM. In this description, we assume that each such group of four record sections has a group number corresponding to the setup number. This setup number for setups 1 and 2 are indicated by a suffix digit of 1 and 2 respectively in FIG. 3. For example, in the first group of four records, the records in the composite section CMR1 are in the form of a set of multiplexed digital signals representing the signals received at the various stations GE21 . . . GE44. Likewise, the records in the cross-correlation section XMR1 are in the form of a set of multiplexed digital signals representing the cross-correlated signals corresponding to the signals received at the same stations.

Special Mathematical Aspects

In this system, many different mathematical operations are performed, the most important involve compositing and cross-correlation. Except as specifically mentioned otherwise, all these operations referred to herein occur in the field truck. More particularly, the principal computations for compositing and the computations for correlation are usually both performed in the field truck during the process of exploring along the line of exploration. However, provision is made in the system described herein for performing these and other processes elsewhere under some conditions. The computation processes performed for compositing are very similar to those which have been employed heretofore. The computation processes performed for correlation are believed to be new.

Compositing Computations

The compositing computations involve a process of vector addition. In this particular vector process, the various amplitudes that are detected in the received seismic signal at a given sample number or travel time are added together algebraically. Precautions are taken however, to detect whether the received signals have anomalous amplitudes of a kind that is more likely to be accounted for because of extraneous noise. Samples having excessive amplitudes are disregarded. In effect, the received signals are edited. The exact manner in which this editing operation is accomplished is explained hereinafter.

In the practice of this invention, the received signals are initially formatted in a standard manner associated with the standard data receiving equipment which is employed. However, they are reformatted for purposes of compositing. And then the output of the compositing operation is reformatted to restore the signals to the original standard format prior to recording on an output tape. As will be seen hereinafter, the composited signals are also reformatted for purposes of correlation and the resultant correlated traces are formatted in the standard output format before being recorded on the same tape as the composited wave.

Correlation Computations

The correlation computations are performed in a unique way to take into account the fadt that the drum DRB is capable of storing a larger amount of data than is the working memory WMB of the general purpose minicomputer COMB.

To illustrate the operation, we assume that both the chirp signal and the received seismic signal can be represented by four segments or parts that are of equal length. In practice, the effective chirp signal will never have a duration greater than that of the received seismic signal. In the embodiment of the invention illustrated, both signals are assumed to have a length of 32 sec. In order for the explanation to be consistent with other parts of the description, it is assumed that the signals are sampled at 4 ms intervals and are converted to floating point binary digital values. It is also assumed that, unless otherwise noted, we are dealing with a total of 8192 samples instead of 8000. In certain parts of the operation with the minicomputers actually used, operations are performed with 100 blocks of 80 samples each, but other operations are simplified if it is assumed that they are performed with 8192 samples.

The four parts of the chirp signal are identified by the symbols CH1, CH2, CH3, and CH4. And the four parts of the received seismic signal are SM1, SM2, SM3, and SM4. All segments are of equal length. Each of the parts of the two signals consists of 2048 samples. These samples are in the form of binary digital numbers which are stored magnetically or in the form of corresponding electrical signals occurring during different parts of the operation of the system.

Each of the samples of the chirp signal and the samples of the seismic signal are in the form of real integer numbers that may have + or − signs.

In the computations use is made of a 0 or empty signal. This is a signal that has the same length as one of the segments, but a 0 value for every sample in the segment. We identify this segment by the symbol S0, or C0, or 0.

The computations utilize the function $$FT(Z1,Z2)$$

where Z1 and Z2 are different segments and where one of the segments may be a 0 segment while the other is not. If both segments Z1 and Z2 are 0, the Fourier transform FT is not calculated. This function FT represents the Fourier transform of a total combined segment that consists of the Z1 segment followed by the Z2 segment. We concern ourselves with eight Fourier transforms, namely, the following:

$$FTC(CH1,C0) \quad (1)$$

$$FTC(CH2,C0) \quad (2)$$

$$FTC(CH3,C0) \quad (3)$$

$$FTC(CH4,C0) \quad (4)$$

$$FTS(SM1,SM2) \quad (5)$$

$$FTS(SM2,SM3) \quad (6)$$

$$FTS(SM3,SM4) \quad (7)$$

$$FTS(SM4,S0) \quad (8)$$

These terms represent the Fourier transforms of eight double segments. The suffixes C and S are added to the function symbol FT to remind the reader that the respective functions are Fourier transforms of parts of the chirp signals and the seismic signals respectively.

In the case of seismic surveying for mineral prospecting purposes, as it is now practiced, there is an interest only in waves which have traveled downwardly into the earth to formulation that lie within the upper crust of the earth, that is the solid crust and more particularly, that lie at a depth no greater than about half the thickness of the crust. More particularly, signals that have traveled to reflecting subsurface structures and back to the surface of the earth during a time less than 16 seconds is considered more than adequate at the present time. This travel time corresponds to a depth in excess of 10 miles. In spite of this, a system is provided for recording signals of 32 seconds duration.

It can be shown that the cross-correlation of the seismic wave signal composed of the four parts SM1, SM2, SM3, and SM4 with the chirp signal composed of the four parts CH1, CH2, CH3, and CH4 can be developed by generating the inverse transforms of each of two sums of certain of the following products:

$$P1 = FTS(SM1,SM2)*FTC(CH1,C0) \quad (9)$$

$$P3 = FTS(SM2,SM3)*FTC(CH2,C0) \quad (10)$$

$$P5 = FTS(SM3,SM4)*FTC(CH3,C0) \quad (11)$$

$$P7 = FTS(SM4,S0)*FTC(CH4,C0) \quad (12)$$

$$P2 = FTS(SM2,SM3)*FTC(CH1,C0) \quad (13)$$

$$P4 = FTS(SM3,SM4)*FTC(CH2,C0) \quad (14)$$

$$P6 = FTS(SM4,S0)*FTC(CH3,C0) \quad (15)$$

In this application where two Fourier transforms are multiplied, the multiplication is performed by a complex conjugate multiplication process. In this process, the complex numbers for identical sample frequencies in the two transforms are mutliplied together but one of them, namely, the complex number representing the chirp-signal sample is first conjugated by reversing the sign of the imaginary component. In the case with which we are dealing as here, with a seismic wave signal and a chirp signal that are composed of four parts, we are concerned with two sums, namely:

$$FTP1 = P1 + P3 + P5 + P7$$

and $$FTP2 = P2 + P4 + P6$$

These two equations, it will be noted, can be written in the form $$FTP1 = \sum_{i=1}^{4} P_{2i-1} \text{ and } FTP2 = \sum_{i=1}^{3} P_{2i} \quad (16)$$

Each of the sums may be considered a partial product transform FTP1 and FTP2.

The first sum FTP1 represents the transform corresponding to a travel time of a pulse into the earth and back to the geophones during a time corresponding to a segment extending from 0 sec. to 8.192 sec. This is the first segment of the correlated signal.

The second sum FTP2 represents the transform corresponding to a travel time of a pulse into the earth and back to the geophones during a time corresponding to a segment extending from 8.193 sec. to 16.394 sec. This is the second segment of the correlated signal.

The inverse Fourier transform of the product transform FTP1 consists of a series of samples with twice the number of samples as the respective parts of the seismic wave signal and the chirp signal. The first half of this inverse transform corresponds to the first part of the correlated seismic wave signal and it consists of a number of samples equal to those in one part of that signal.

Similarly, the inverse Fourier transform of the product transform FTP2 consists of a series of samples with twice the number of samples as in the respective parts of the seismic wave signal and the chirp signal. The first half of this inverse transform corresponds to the second part of the correlated seismic wave signal and it consists of a number of samples equal to those in one part of that signal.

The second half of each of these inverse transforms is discarded, that is, not used.

Both the original chirp signal, the original seismic wave signal and the final correlated seismic wave signal consist of a series of samples which have only real components. But each of the samples in the Fourier transform is a complex number having a signed real component and a signed imaginary component. The Fourier transforms involved here are known as discrete Fourier transforms.

In the practice of this invention, each of the Fourier transforms of the segments of the chirp signal represented by the equations (1), (2), (3), and (4) are calculated, one at a time, by the XCOR computer section and stored in the respective tracks 51, 52, 53, and 54 respectively on the drum DRB, as shown in FIG. 7, and retained there for multiplication by the four Fourier transforms represented by the equations (5), (6), (7), and (8) to form the products P1, P2 . . . P7 for each trace, one at a time, in accordance with the process generally described in connection with the description of FIG. 16.

The fact that there are 0's at the ends of tracks does not interfere with the reliability of the calculations.

As a matter of fact, if the chirp signal is so short that all of the samples for a fourth segment have 0 value, or all of those in the third and fourth parts have 0 values, or all of the samples except some in the first part of the chirp signal have 0 values, some of the products represented by equations (9) to (15) are 0 and correct results are still produced. This is because, in such a case, some of the Fourier transforms represented by equations (2), (3), or (4) are 0 and the calculation of certain of the products (9) to (15) can be eliminated. The XCOR computer section is programmed to take this into account without the necessity of performing all of the multiplication steps that would otherwise take place in accordance with equations (9) to (15).

Thus, for example, if the chirp signal is only 4000 samples long, the Fourier transforms represented by equations (3) and (4) are 0, which therefore need not be calculated. This makes it unnecessary to carry out the multiplication operations represented by equations (11), (12), and (15). It is not even necessary to zero the matrices representing the products P5, P6, and P7. It is only necessary to limit the addition operation to the adding of the products P1 and P3 and P2 and P4. This is done by writing the program to skip the steps represented by equations (3), (4), (11), (12), and (15) under such conditions.

If the two signals are of equal length and not subdivided into segments, the product is represented simply by

FTP=P1 =FTS(CS1,SO)*FTC(CH1,SO)

The multiplication and summation processes may be generalized to handle either a lesser number of parts or a greater number of parts. To make use of the algorithms mentioned, the number of samples in each part is a power of 2. The process of carrying out the multiplication where there is only one part described in connection with FIG. 15. The process for performing the multiplication when there are four parts is described in connection with the operations represented in FIG. 16.

The process of cross-correlation of the received seismic signals and the chirp signal may be generalized. Thus, the length of the series of SN sample signals is first extended by a number of zero-valued or 0 samples to make the total number of samples equal to $N*2^m$ where N and m are integers, N being the number of segments. The length of each segment is $2^m$ samples. The number of 0 samples thus added may be zero if the $N*2^m$ criterion is already met. In our particular case, $M=11$, and $2^m=2048$, and $N=4$, and $SN=8192$ and the number of zero signals in the extended portion is 192. Then an additional empty segment of the same length is added, at least virtually, to the end of the series of sample, resulting in an augmented series of signed samples having $N+1$ segments. The empty signal need not actually be created and stored with the other segments. But its presence is simulated in certain operations. We therefore may call the $(N+1)$ th, or empty segment, a virtual segment.

The Fourier transform $FTS_1$ is then formed from each of the respective series of signals composed of pairs of successive segments $S_i$ and $S_{i+1}$ of the augmented series of seismic wave sample signals. There are a total of N such Fourier transforms. Each such transform is represented by a series of transform signals.

At the same time, the chirp signal is divided into a number of segments which all have the same length as the segments into which the seismic wave signal has been divided.

Each segment or the chirp signal is combined with an empty segment of equal length in order to form a combined segment of double length. Each of such combined segments thus comprises a series of signals of double length. A Fourier transform $FTC_j$ of each combined chirp signal is then formed. Each of these Fourier transforms is represented by a second series of transform signals. The number of signals in both series is the same.

The Fourier transforms FTC corresponding to the segments of the chirp signal are then vector multiplied by the Fourier transforms FTS or the seismic wave signals in selected pair to form products that are in the form, $$FTS_{j+m-1} * FTC_j \tag{17}$$

Such products are then added to form M partial product transforms, each of which is in the form $$FTP_m = \sum_{j=1}^{N} FTS_{j+m-1} * FTC_j \tag{18}$$

The value of m is limited by the expression $$0 \leq j+m-1 \leq N$$

to produce products which correspond to the duration of the cross-correlation sought. (This duration is referred to hereinafter as the output time (see PREP Step 8).) In the example given above, this limit is $$1 \leq m \leq M = 2$$

If the number of segments in the chirp signal is less than the number of segments in the received signal, some of the Fourier transforms FTC will be zero. Account may be taken of this fact as explained hereinabove or sometimes simply by letting N in equation (18) equal the number of non-zero segments in the chirp signal. The total number of segments in the resultant signal is M. The signal in the mth segment of the resultant signal is given by the first half of the inverse Fourier transform of the partial product transform, represented by equation (18).

Looked at broadly, in the practice of this invention, N parts of the chirp signal, each combined with an empty signal, are transformed from the time domain to the frequency domain. Likewise, N pairs of successive parts of the augmented received seismic wave in each trace are transformed, as described, from the time domain to the frequency domain. Then the frequency domain data corresponding to the parts of the chirp signal are multiplied by frequency domain data corresponding to the seismic wave signal and are summed in accordance with equation (17). The various products are added together in the frequency domain to form partial product transforms as set forth in equation (18). These partial transforms are then subjected to inverse Fourier transformation to produce a time-domain representation of what the seismic wave signal would look like if a pulse signal had been employed instead of a chirp signal, as a seismic wave source signal.

The forward Fourier transform operations are performed on signal values that have been formatted in simple integer form. The product operations are performed on signals formatted in complex integral form, producing products having integral real components and integral imaginary components. The correlated signal for each trace is real and is in integer form. The final time-domain signal corresponding to each trace is reformatted in output format form prior to recording on the output tape.

Detailed Description of Field Data Recording System

In addition to the roll-along switch RAS and the amplifier channels, the field data receiving system includes a multiplexer SMUX, a digitizer DGT, and a formatter FMTR. The operation of the binary gain amplifiers BGA, the multiplexer SMUX, the digitizer DGT and the formatter FMTR, are controlled by a master clock MCL and counter CPD in conventional manner. A system controller FSC is employed to set parameters of the amplifier channels and to control the operation of the multiplexer SMUX, the digitizer DGT, and the formatter FMTR.

The outputs of the individual amplifier channels AC1, AC2, ... AC24 are fed to the multiplexer SMUX which converts the set of 24 trains of signals emerging from the various amplifier channels into a single train of multiplexed signals in which samples of the individual trains of signals are successively represented in a conventional manner. The multiplexing is timed in conventional manner under the control of a clock MCL and divider. Each channel is sampled once during a preestablished sampling interval such as 2 ms or 4 ms and in each sampling interval, successive channels, that is, channels corresponding to successive geophone stations, are sampled consecutively.

In such a multiplexed signal, the 24 samples of signals received at the 24 geophone stations in any one sample interval occur successively and then the 24 samples of signals received one sample-time-interval later occur successively and so on. In other words, as is well known, in the multiplexed signal a succession of samples from all 24 traces are produced in one sample period after another. The multiplexed signals are created during an interval called the input time. The multiplexer DMUX is enabled only during that time by means of a control signal transmitted into the system controller FCS. This signal is generated by the computer system COMS and is transmitted from the computer system CMOS over the connecting bus DRC.

The successive signals in the train of multiplexed signals are then digitized in the digitizer DGT. The resultant digitized signal includes two components, an amplitude component and a gain component. As is well known, the gain is adjusted automatically throughout a large part of the travel time to maintain the peak or maximum magnitude of the signal represented by the mantissa between about one-fourth to about one-half of a full amplitude of 1.0. The digitized signals are then formatted in a standard 1010 manner in the formatter FMTR (see FIG. 2A). Not counting parity bits, the signals emerge from the formatter FMTR as eight parallel streams of bits. As the formated multiplexed signal is produced, it is transmitted through a buffer BD to the compositing computer COMA. As the signals pass through the buffer BD and into the compositing computer COMA, they are reformatted to convert them to a format, here called a compositing format, that is more suitable for performing compositing operations. In the present embodiment of the invention, the reformatted digitized signals are converted to signals in the form of double-precision words which fill two successive 16-bit words in the compositing format illustrated in FIG. 12. Eight bits are employed for representing gain. One bit is employed to represent the sign of the amplitude, and the amplitude is stored in 23 bits.

The gain signals are supplied to the formatter FMTR for the respective channels or groups of channels in the binary gain amplifier system BGA. In fact, the multiplexed signal is capable of representing not merely 24 channels of seismic signals, but additional signals as well. One of these is a timer signal. The timer signal is fed into the sequence of signals in the multiplexed signal from the master timing system MCL-CPD. The timer signal is a binary digital signal that occurs once in each sampling interval and represents time elapsed since operation was commenced.

The rotary arm RAA of the roll-along switch RAS operates a device DCO which process a binary coded decimal digital signal that represents the position in which the roll-along switch has been set. This signal is fed into the formatter FMTR and by it into a predetermined part of the multiplexed signals. The feeding of information from the device DCO into the formatter and into the train of signals emerging from it are coordinated with the operation of the multiplexer SMUX by the master timing system MCL-CPD.

A slightly modified system controller FSC of conventional type is employed for setting the operating conditions and initiating the operation of the data receiving system DRS. For example, this controller is employed for setting the initial gain of amplifiers, for setting the filters, and the like. The controller applies a switching signal over control line DSW for enabling the multiplexer SMUX only during the interval of time, called input time, established by the operator in the computer system COMS.

It is therefore to be noted that signals from the geophones are transmitted through the roll-along switches RAS, thence through the amplifier channels AC and then through the multiplexer SMUX, the digitizer DIGT and the formatter FMTR and into the computer system and thence to the recorder OPTR in the seismic output section OPS. In this embodiment of the invention, the output recorder is in the form of a magnetic tape recorder OPTR.

The binary gain amplifiers BGA, multiplexer SMUX and output recorder OPTR may be components of a Series 1010 geophysical digital recording system manufactured by XDS, formerly SDS Data Systems, now a division of Xerox Corporation, and widely used in the field of seismic prospecting. Such a unit employs binary gain aplifiers, a multiplexer, a digitizer, a formatter, operating in a standard coordinated manner to produce the digitized multiplexed signal. But in this invention, this signal is supplied to the computer COMA instead of to an endless-loop tape for compositing.

DETAILED DESCRIPTION OF COMPUTER SYSTEM

The computer system of this invention will now be described in greater detail in connection with a consideration of FIG. 2 and other figures.

The computer system COMS comprises a master, or primary, or correlation, computer COMB and a slave, or secondary, or compositing computer COMA. The compositing operations occur in the slave computer COMA. The correlation operations occur in the master computer COMB. The computer system also comprises a typewriter TTY and a tape reader TPR. As previously mentioned, an interface unit CCIF is employed to interconnect the two computers COMA and COMB.

The two computer units COMA and COMB each comprise a programmable minicomputer of relatively low storage capacity and an associated drum of relatively high storage capacity. Except for the action of interlock signals transmitted between them through the interface unit CCIF for the transfer of information signals and control signals from one computer to the other, the two computers COMA and COMB operate independently of each other. That is, calculations and recordings are made within each computer separately from the other except to the extent that they are controlled to perform certain operations in sequence. However, the results of calculations in one computer are regularly transferred to the other where they may be subjected to further calculations or processing. The calculations and recordings, while performed separately in the two computers, are subject to two types of constraints. One type of constraint is established in advance by the computer programs that are stored and utilized in the computers. The other type of restraint is established by the parameters that are set in the computer by the operator and by other parameters established by him at the time that the equipment is prepared for operation. Certain of these preparations have a long time effect that may last for hours or days. Others are established by manipulation of switches on the control panels from time to time as desired.

Each computer COMA and COMB has a separate independently operating clock CLA and CLB for controlling the synchronization of operations of various components within the respective computers. Though these clocks operate independently of each other, suitable means in the nature of counters and interfacing switching programs and sections are provided in a conventional manner to aid in synchronizing operations in the two computers. The timing signals introduced into the output of the field data collecting system aid in the synchronization. In the two computer units employed, the period of the two clocks CPA and CPB is 0.960 $\mu$sec. The period of the timer formed by the master clock MCL and counter CPD is 0.782 $\mu$sec.

The typewriter TTY is of the teletypewriter kind. The typewriter possesses a standard keyboard which can be operated manually to feed information into the computer, or it may be operated automatically by the computer to print out eye-readable information. For this purpose, the teletypewriter employs an electromechanical mechanism for converting mechanical motions of keys into a coded series of electrical pulses that are fed to the computer; and also for converting coded series of electrical pulses fed to the typewriter from the computer into mechanical motion of the typing mechanism. The typewriter carriage is also operated automatically to return to a standard, left-margin, or starting, position in response to actuation of a carriage return key, when that key is actuated manually or in response to electrical pulses from the computer.

In the embodiment of the invention illustrated, each of the computer units COMA and COMB comprises two main parts. One is a magnetic drum DRA or DRB of a recording unit manufactured by Datum Corporation of Anaheim, California, known as Model No. 488. The other main part of each of the computer units may be an SPC-16/50 unit manufactured by General Automation Corporation of Anaheim, California. Each of the computers has a static, or stationary, memory unit SMA or SMB. The drums have a capacity of 9.6 megabits storage capacity. These drums are driven by two induction motors. The capacity of each of the static memory units SMA and SMB of each of the two computers is 12K (12,288) words. Each word consists of 16 storage bits, that is, 16 cells in each of which one bit may be stored. The static memory units in use are of the magnetic core type. The computer interface unit CCIF is a standard unit manufactured by General Automation Corporation for interfacing the two computers for use with its SPC-16/50 computers and for interfacing with other units, such as another computer, a typewriter, a recorder, or the like.

Each of the drums is mounted on a separate shaft driven by a separate induction motor. These motors are driven by an AC power supply operating at a frequency of 60 Hz. The drums themselves are provided with a track upon which timing signals have been stored that are spaced apart a distance corresponding to about 0.5 $\mu$sec at the speed of the rotation of the drum. While the synchronous speed of the drums is 1800 rpm, due to normal slippage the operating speed is slightly less, normally being 1725 rpm. A read-only head SH (see FIG. 17) is associated with the timer track so as to avoid the erasing of the timer track accidentally. Two input-output units IOA and IOB are employed for interfacing the respective drums DRA and DRB with the remainder of the respective computers COMA and COMB. These I/O units include means for buffering the transfer of signals between the drums and the respective computers and, among other things, to make accommodations for variations in speed of the drums DRA and DRB from time to time.

Since the 12K storage units of the two computers are static, they are available for substantially instant access at all times during the operation of the system. The two drums constitute rotatable memory units, which on the average can be accessed after a time corresponding to one-half the period of revolution of each of the two drums. Thus, with this invention, the chirp excitation signal recorded on the drum is available for almost instantaneous transmission by radio. The importance of such substantially instantaneous access to the drum can be appreciated when it is realized that compositing sometimes involves the summing of signals that correspond to 50–100 different chirp signals for a single setup. Furthermore, the formatted multiplexed digitized signal of the field system DRS may be fed through the buffer DIBS into the static memory of the slave computer unit COMA. This may be done at any time without requiring that the drum be stopped.

In this invention, the time that must elapse between the collecting, processing, and recording of composited signals from one setup to another is greatly reduced. The full benefits of this aspect of the invention are obtained by employing drums having periods of rotation that are only a small fraction of the input interval. The rotation period is preferably less than about the order of the maximum sampling time interval. Thus, in the embodiment of the invention described, that rotation period 0.033 sec is less than 10 times the maximum sampling interval.

As previously mentioned, the two computers are general purpose programmable computers. In addition to the respective static memory units SMA,SMB and associated drums DRA and DRB, each computer has a control panel CPA,CPB respectively, a status indicating system STLA,STLB respectively. By appropriate operation of switches on the control panels CPA and CPB, information contained in any memory unit may be transmitted to any other memory unit or to the magnetic tape MTR of the output recorder OPTR and from the magnetic tape MTR to any of those memory storage units SMA, DRA, SMB, and DRB. The computer system also includes means whereby any record stored in the computer may be displayed by the oscilloscope CRT or the multiple trace recorder OPTR. However, the computers are designed and programmed to perform only certain of these operations normally, and to carry out many of these operations automatically upon command, as more fully described hereinafter.

The two control panels CPA and CPB comprise many different switches which cooperate with the registers within the respective computers COMA and COMB to act as switches either for feeding information into the computers or for operation of the computers. One such switch is referred to hereinafter simply as a STEP switch. A STOP switch is also provided on each computer and various sense switches on the panels of the computer may be employed for interrupting various kinds of operations while they are being executed. The term START switch is sometimes employed herein to refer to the combined switch action of several switches including the two STEP switches.

The output system OPS includes an interfacing unit CC2 and a digital-to-analog converter DAC with associated formatter including a demultiplexer DMX with means for connecting them to the computer COMA and to each other for producing various types of records and displays.

The magnetic tape recorder OPTR includes a readafter write head. Whenever multiplexed information is transmitted from the computer COMA to the magnetic tape recorder OPTR, it is recorded there in binary digital form and then is automatically read and is demultiplexed by the DMX section and then transferred through the digital-to-analog converter DAC where it is converted to analog form and is then written in multiple trace form on recording paper RPC in eye-readable form. The operation of the multiple trace recorder MTRC may be disabled in a conventional manner by turning off the drive-motor switch that energizes the motor that ordinarily advances the recording paper RPC past the recording elements. The output of the digital analog converter DAC is also supplied through a suitable switching system to a cathode ray tube CRT where the output may be displayed for the convenience of the operator by switching on the tube CRT. Provision is made so that the cathode ray tube CRT may be connected to the input of the digital-to-analog converter in order to display multiplexed data.

Many programmable computers have a standard list of instructions. While not all "standard" lists of instructions are the same in the art, this term applies to a computer that has an instruction list of approximately 74 of the most commonly used instructions. The use of such a computer makes programming flexible and thereby reduces the number of commands that must be employed in programming, thus speeding up the operation of the computer during execution. The computer unit COMA is provided with a bus BSA which connects with the interface unit CCIF. The computer unit COMB is provided with a bus BSB which connects with the interface unit CCIF. A bus RBO also connects the output system OPS to computer COMA. In addition, a bus DRC interconnects computer COMA to the system controller FSC of the field data collecting system DRS for controlling the period of operation of the multiplexer SMUX.

The interface section CCIF is so operated under the control of the programmed section of the two computers COMA and COMB so that various information sequels are transferred from one computer to another and to one of the output units only when that computer or other unit is in a condition ready to receive those signals.

Certain parts of the static memory units SMA and SMB of the two computer units are dedicated for certain restricted purposes. Each includes a hard-wired programmed section IPLA and IPLB respectively, including suitable boot-strap sections BTA and BTB.

The IPLA and IPLB sections are designed to enable the computers to read in programs as required from the tape reader TPR or the drum or other inputting unit, and to store them in static memory. They also assist in creating new programs or altering old programs within the computers, if desired, by manipulation of switches on the control panels CPA and CPB in accordance with the manufacturer's instructions. Each of the static memory units SMA and SMB also comprises a section SYSA and SYSB respectively into which programs are fed which are employed for controlling the operation of the system. These programs are read in from the paper tape reader TPR or from the drum or from the recorder OPTR.

Each of the static memory units SMA and SMB also comprises a monitor section MONA and MONB respectively into which a main, or monitor, program is read from the tape reader TPR. It is to be noted that the initial reading in of the programs SYSA,SYSB from the tape reader TPR Is aided by virtue of the presence of the hard-wired programs stored in the sections IPLA and IPLB of the static memory units. And the SYSA and SYSB programs aid in reading in other software programs. All software programs are also stored on an appropriate drum to maintain copies in reserve if, for any reason, they are needed.

The slave computer unit COMA also comprises a working storage unit WMA into which various programs may be transferred from the associated drum DRA as required in order to perform the compositing operation or any other required operation. Likewise, the master computer unit COMB comprises a working storage unit WMB into which various programs may be transferred from the associated drum DRB as required in order to perform the correlating operations or any other required operation.

In this description, a section of a computer in which a particular program is stored, is identified by the name of the program. Thus, if any program PRGX is stored on a section of a drum or in part of a memory unit, the section in which the program PRGX is stored is called the PRGX computer section, processor, component, or the like.

Some of the programs that are actually used in the system disclosed herein are originally written in a high level language known as "FORTRAN IV" while others are written in an intermediate level language known as "Assembly Language", and still others are written directly in "Machine Language". Those programs which are not already in machine-readable language, are translated into such language by a suitable compiler or assembler, and written on punched tape in a standard code. In this connection, it is to be borne in mind that the actual machine language utilized varies from one computer to another as specified by the manufacturer. The details of the methods by which programs are stored and utilized are well known in the art and are not described in detail herein. Furthermore, the details of the programs themselves are omitted since there are innumerable ways of preparing such programs as will be obvious to those skilled in the art of programming programmable general purpose minicomputers.

Typically, each of the principal subroutines or groups of related subroutines, is punched on a separate paper-roll tape. Each of the punched tapes bears index signals at its lead end for establishing the part of memory into which the program is to be stored when in operation, and another signal for establishing which parts of the memory that are to be employed for performing calculation, storage, memory, and other functions.

As indicated, a few of the software programs are stored permanently in the working memory units WMA and WMB. However, the majority of the software programs are stored on the drums and are read from the drums and replicated in the respective working memories WMA and WMB under the control of the monitor programs MONA and MONB and otherwise, as required. The manner in which programs may be called to read them from any particular storage area and to replicate them in another storage area are well known in the art and are not described here. Similar remarks apply to methods for transferring information signals from one part of a computing system to another. However, some details respecting the sequence of performing transfer operations and the geometry of storage arrangements are described. The process of reading and replicating a program is sometimes called "transfer" herein even though the program is not erased from the first storage area during the transfer. In transferring a program or data from one part of the system to another, however, any old information signals stored in the area to which the signal is transferred are changed and, in effect, are erased, being replaced by the new program or new information signals that are transferred.

Typically, when a program is to be executed, it is transferred from the drum DRA or DRB to the corresponding working static memory unit WMA or WMB, storing the program in part of the working memory unit and allocating another part of the working memory unit to data to be operated upon, and another part for data that is generated by execution of the program in question. Sometimes, however, one of these data storage areas is not needed since the data can be accessed from the drum and the output data section is somtimes not needed, even for temporary storage, because the output data is transferred directly to a predesignated or other appropriate location in the system. The size of the section of the working memory unit thus assigned to the program, the size of the section assigned to input data, and the size of the section assigned for storage of output data varies from one program to another. Sections BFRSA and BFRSB of the working memories WMA and WMB are allocated for performing buffering operations as required and not otherwise described. Sections of the drums are also sometimes used for buffering.

Hard-wired, high-speed signed multipliers MXA and MXB are added to the computers COMA and COMB for special purposes which will be described hereinafter.

To prepare the computer system for use, program load switches LDA and LDB or the control panels CPA and CPB are closed in the sequence mentioned. A paper-tape roll, or punched paper tape, bearing a program to be loaded is mounted on the paper-tape reader TPR. Upon closure of the second switch LDB, operation of the tape reader TPR is initiated causing the program stored on the tape to be transferred to an appropriate part of the computer. The system programs SYSA and SYSB are first transferred to the dedicated sections of the two memory units SMA and SMB as well as to the drums DRA and DRB. Upon completion of reading in of the system programs they, themselves, cooperate with the tape reader TPR to cause additional programs to be stored on the drums. More particularly, the monitor programs MONA and MONB are stored in dedicated portions PMA and PMB of these static memory units SMA and SMB and also on the drums. Certain parts of the monitor programs are altered during the operation of the computer. For this reason, when any signal is generated by execution of one of the programs that would cause such alteration in monitor program MONA or MONB, that program is transferred to the corresponding drum DRA or DRB so that an updated copy of each of the monitor programs MONA and MONB is available on drum at all times if they ever need to be reconstructed during the course of operations.

Furthermore, programs SGEN, COMP, SWEP, DPOT, TOUT, and DSIM are stored on drum DRA of the slave or compositor computer COMA and programs PREP, VSWG, VTRN, DGEN, DMX, XCOR, FRAN, MUX, and TPOT are stored on the drum DRB of the master of correlation computer COMB.

DRUM FORMATS

Each of the drums DRA and DRB is arranged in relationship to banks of read/write heads HDA and HDB to provide 128 tracks of information storage. The heads HDA and HDB are controlled from the control panel CPA or CPB during the operation of the system, in a programmed manner, to read or write selectively from or onto any selected track as required for the operation in question. As indicated in FIGS. 7 and 8, the tracks are numbered consecutively from 0 to 127.

A timer track, unnumbered, is associated with a read-only head (not shown).

Each of the 128 tracks is divided into 256 sectors of equal length as indicated in FIG. 6A (see Sheet 1). Each of the sectors is divided into three main parts, namely, a preamble or prefix part PRA, and a postamble or suffix part POA, and a data section DSC, as indicated in FIG. 6B. Each of the sectors is divided into equal subsections or cells corresponding to one bit each. The preamble part PRA has a length of 10 bits, the postamble part POA has a length of 10 bits, and the data record part DSC has a length of 272 bits, including 16 sixteen-bit words and also including 16 parity bits, one for each word. Thus, each sector has a length of 292 bits. The data record sections of each of the 256 sectors is thus adapted to record sixteen 16-bit words of information, and 1 parity bit for each word. Hereinafter and in FIG. 6B, the parity bits are disregarded.

Both computers normally operate with 16-bit words in the single-precision mode. However, for some purposes, some of which are described, they are operated by the software in the double-precision, or 32-bit, mode.

One way in which the computer sections and data may be arranged on the drum DRB of the correlation computer COMB is represented in FIG. 7. One way in which computer sections and data may be arranged on the drum DRA of the composite computers COMA is represented in FIG. 8. In these two figures, a track number is designated in the left-hand column and the names of the programs stored on the drum are indicated opposite the track numbers. In most instances, a program occupies two tracks. Thus, the first 18 tracks 0–18 of the drum DRB are sections of a computer dedicated to perform the operations corresponding to the respective designated programs. Similarly, the first 13 tracks 0–12 of the drum DRA are computer sections dedicated to perform the operations corresponding to the designated respective programs. Tracks 20–47 of drum DRB and tracks 14–25 of drum DRA are empty and thus available for storage of additional programs or for other purposes. The remaining tracks on the two drums are used for other purposes, some of which will be described hereinafter.

PROGRAM SECTIONS

Certain of the programs are redundant and are not used in the ordinary operation of the equipment. Redundant programs are introduced in order to permit continued use of the equipment in the field in case one of the computers goes out of order. In that case, the remaining computer is employed as the compositing computer. In that event, which rarely occurs, the records produced do not include correlated records. Instead, the correlation function is then performed at the data processing center to which the output tape, bearing the composited records, is shipped. If, for some reason, one of the computers is out of order, the remaining computer may be programmed by feeding programs into it from the tape reader TPR. In an emergency, the composited records may be transferred to the magnetic tape, the single computer programmed by reading in programs from punched tape to perform the correlation, and the composited information read in from the magnetic tape, and proceeding to perform the correlation operation.

The invention will be described herein primarily in its complete form employing both the computer COMA and COMB.

A general description of each of the programs sufficient to enable a person of ordinary skill in the art to practice the invention, are set forth below. Details of many of the computer programs are discussed in a "Field Manual for CAFDRS III, IV, and V" and in a "Field Manual for CAFDRS II".

CORRELATION COMPUTER

MONB Section

This program is known as monitor program No. 1. The purpose of this program is to control the execution of the programming system to achieve all of the various functions that are desired. Operation of various program switches of the control panel CPB enables the MONB program to start operation at a certain selected point and to perform the desired functions, in a manner well known to those skilled in the art. In the specific embodiment of the invention illustrated, 9 program switches are employed. The following table identifies these switches and the associated programs:

| Program Switch | Program | Callable by Switch | Auto Call |
| --- | --- | --- | --- |
| BS0 | PREP | Yes | No |
| BS1 | VSWG | No | Yes |
| BS2 | VTRN | No | Yes |
| BS3 | DGEN | Yes | * |
| BS4 | DMUX | Yes | Yes |
| BS5 | XCOR | Yes | Yes |
| BS6 | FRAN | Yes | * |
| BS7 | MUX | Yes | Yes |
| BS8 | TPOT | Yes | * |

The table indicates by the symbol yes or no under the heading "Callable by Switch" or "Auto Call" whether the program in question may be called automatically once operation is commenced in the automatic mode or whether operation of the program may also be initiated at the program in question by calling with the program switch. The * means that the DGEN, FRAN, and TPOT programs are called respectively as more fully explained below, whenever the corresponding BS4, BS6, or BS8 program switch on the control panel has been closed.

Initially, the monitor program MONA is reconstructed in the section MONB. This is accomplished by manipulation of switches which activate the bootstrap computer section where the IPLA program is stored to read the monitor program from the drum DRB and to reconstruct it in the section PMB of the memory unit WMB.

Then by manipulation of certain auxiliary switches, the main computer COMB may be set to operate manually in accordance with the legends set forth in column 1. In that case, to call a program, the corresponding program switch BSO is operated and the STEP button STB is pressed. If the switches BSO and STB are pressed, then the PREP program is called and executed.

The VSWG and VTRN programs also operate automatically if required by the responses to the PREP program.

Once the system has been prepared for operation, the DMUX program can be called by operation of switches BS4 and STB provided that computer COMA is in a wait condition with composited data on its drum DRA.

The XCOR program may be called by closing switches BS5 and STEP switch STB provided that the DMUX program has operated previously but subsequent to the last prior operation, if any, of the XCOR program.

The FRAN program may be called by operation of switches BS6 and STB. This program executes only if the XCOR program has completed the correlation processing which it is designed to perform and the MUX program has not yet been called. So long as the switch BS6 remains closed, the FRAN program will execute automatically each time the XCOR program is executed.

The MUX program may be called by operation of switches BS7 and STB. But it will execute only if data resulting from the execution of the XCOR program is stored on the drum DRB.

The TPOT program may be executed at various times by operation of switches BS8 and STB. Any time it operates, then, upon completion of the currently operating program, it will execute to type out the specified information from drum DRB.

The more normal mode of operation involves automatic calling of the programs listed in the table in sequence. But the selection of the programs depends upon whether certain switches have been operated.

In the normal course of operation, after the system has been set up in accordance with the execution of the PREP program, then the DMUX, XCOR and MUX programs operate automatically in sequence. This occurs whenever composited signals are to be transferred from computer COMA to computer COMB for demultiplexing and correlation or when the compositor computer COMA is operated to execute the TOUT program to read correlation information from computer COMB and composited information from computer COMA onto the magnetic tape MTR.

If the computer system has been set up for operation in the automatic mode, it is only necessary to call the DMUX program once after the computers have been set up for operation. This is done by closing switches BS4 and STB.

Even in the automatic operation, if the switch BS6 is closed, the FRAN program will execute automatically each time the execution of the XCOR program is completed and prior to execution of the MUX program, in each cycle of operation of the DMUX, XCOR and MUX programs. If the switch BS8 has been operated, the TPOT program will execute upon completion of each of the programs DMUX, XCOR, FRAN, if it is being called, and the MUX program.

The DGEN program is a special program for generating data which simulates the type of data that ordinarily emerges from the compositor computer COMA for feeding to the correlation computer COMB. If the switches BS3 and STB are operated after the PREP program has executed, the DGEN program is called and executed thereby generating and storing on drum DRB data simulating such composited data. Normally, the BS3 switch remains off. The DGEN program is employed for testing the correlation computer COMB.

Various details of the programs and their interrelationships are described hereinafter.

The program switches BS0, BS3, BS4, BS5, BS6, BS7, and BS8 are also operated at the times that the corresponding programs are read into the computer from the punched tape reader.

In each case, when any one of the 8 programs associated with the program switches BS0 . . . BS8 is to be executed, it is automatically replicated in the working area WMB and executed and the results stored as described below.

The principal programs of interest which are stored in the correlation computer COMB will now be described further.

PREP COMPUTER SECTION

The PREP program is the main preprocessor program. It is stored in tracks 2 and 3 of drum DRB forming the PREP computer section.

This program has already been utilized to carry out all of the operations described herein, except a few. The manner of creating a program for carrying out the various steps and action set forth herein, including those few, are well known to those skilled in the art and may be accomplished in the usual ways known to those skilled in the art once the required steps and actions are described. Computer COMB includes means, when actuated with the PREP program in the working memory WMB, for interrogating the operator of the equipment as to the values of various parameters respecting the setup including the nature of the Vibroseis source, the geophone stations in use, the characteristics of the Vibroseis signal to be employed, and various other operating parameters, such as the sampling interval and the length of the record, in milliseconds, to be analyzed.

For this purpose, abbreviated natural language questions are stored in the computer. When the PREP program is executed, the questions are typed out by the teletypewriter TTY sequentially. But some of them are skipped in accordance with jump controls established by some of the answers received by the computer. The program also includes instructions as to how the operator should reply to each respective question in order to assure that correct answers are received that correspond to the intent of the operator and the needs of the system and to assure that the dimensions of various parameters are correctly stated in terms of the units of measurement to be employed in various computations. These instructions are typed out along with the questions. The replies are stored in a LINE table beginning at sector 250 in track 48 of correlation drum DRB. Some of the data is stored in appropriate selected COMMON areas of the working memories WMA and WMB to assist in control of the system. The data so stored is employed through various interconnections and under the control of various electronic switches and gates and programs to perform many needed functions in accordance with well known principles.

By way of example, typed-in data may be employed to represent the initial gain of amplifiers at which binary gain amplifiers have been set. This data is set in the field data receiving system DRS by manipulation of controls in the system controller DRS. It is also fed into the computer system COMS by the answers supplied to the questions presented by the computer during the execution of the PREP program in order to establish parameters within the computer system COMS that correspond to those established in the field data receiving system DRS. Certain data may also be employed to aid in the creation of the chirp excitation signal which is to be stored in the computer and are then employed to actuate the vibrators VB of the Vibroseis trucks on command.

Certain data is also fed to the headers CHD of the records that are stored in the output tape MTR.

Other data supplied in the operation of the typewriter TTY assists in preparing an observer's report, if desired, even though that data is not supplied to the computer for any other purpose.

Some of the data is also employed to initialize the count-down counter CDCTR of the compositor computer COMA.

During the execution of the PREP program, the computer presents questions or identifies items. In presenting a question or item, the computer issues instructions through the typewriter TTY; and it then actuates the carriage return and prints a question mark to indicate to the observer that it is waiting for a response. The observer then provides an answer to the computer by operation of the keyboard in accordance with the instructions supplied by the computer. The computer stores those answers and uses them as required by programs or as commanded by the operator or retains them for reproduction in the observer's report.

In certain instances, the replies are of such a character that certain types of questions become inapplicable or irrelevant. In that case, the PREP program is designed to skip such questions automatically.

In any event, upon completion of his answer, legal or not, the observer presses the carriage return key of the typewriter, causing the carriage to return and automatically instructing the computer to present the next appropriate question if his answer is legal.

The PREP program is also designed to advise the operator whether his reply is illegal. If the reply given by the observer is illegal in the sense that it is outside the range of values acceptable to the program, the typewriter types ERROR or ILLEGAL and then repeats the same question.

It must be remembered that the carriage return key must be pressed after the reply, if one is required, has been typed in. In some cases, the reply is simply in the form of a 0. In such a case, the 0 may be omitted and only the carriage return key pressed. For this purpose, then, pressing the carriage return key only, automatically includes a 0 reply.

The PREP program is programmed to ask for certain information as more fully described below. Where a statement in the following description is typed in capital letters, it represents material which appears on the output of the typewriter. Where the material is written in lower case letters (except for capital letters at the beginning of titles and the like) the material is merely explanatory of the program or of the action required or its meaning.

It will be understood that the PREP program includes standard provisions for allocation of storage for the information supplied by the observer to various inquiries. The replies to the PREP program questions are stored in track 48 starting at sector 100 of drum DRB. Some of them are transferred to drum DRA.

Step 1. OBSERVER'S REPORT?, 1=YES To this question, the observer replies by typing a 0 or a 1. If the reply is 0, the program automatically skips to Step 5 below. If it is a 1, it proceeds to Step 2 below.

Step 2. LIST?, 1=YES The observer then types in 0 or a 1. If a 1 is typed, the current report that has previously been stored in the computer from prior operations is typed out by the typewriter TTY at this time. If a 0 is typed in, the program proceeds to Step 3.

Step 3. 0=SKIP, 1=REPLACE, 2=DISPLAY No reply from the observer is expected. The computer is merely reminding the operator of the answers that he must give to follow Step 4 in order to accomplish certain results respecting the observer's report. A reply of 0 causes the current item to be skipped. A reply of 1 instructs the computer to prepare itself for receiving new information respecting the item. A reply of 2 causes whatever information is stored in the computer with respect to the item to be typed out by the typewriter. An additional order involves pressing the carriage return key.

STEP 4. OBSERVER'S REPORT Each item of the report set forth in the following list that requires consideration by the observer, is then presented to the observer by the computer in sequence, one at a time. More particularly, whenever the carriage key is pressed the carriage is moved to its left-margin position and the computer presents the next item on the list for consideration.

The items about which inquiry is made are listed in Table II. The responses are stored in track 48 of drum DRB.

TABLE II

* OBSERVER'S REPORT *

(a) DATE
(b) CLIENT
(c) STATE
(d) COUNTY
(e) PROSPECT
(f) LINE NUMBER
(g) LINE DIRECTION
(h) DIRECTION OF TRACE ONE
(i) PARTY NO.
(j) OBSERVER
(k) TRUCK NO.
(l) TYPE OF INSTRUMENTS
   *INSTRUMENT SETTINGS
(m) SAMPLE INTERVAL/ALIAS FILTER
(n) RECORD TIME
(o) LO CUT FILTERS
(p) HI CUT FILTERS
(q) NOTCH FILTERS
   *SPREAD DATA*
(r) PERCENTAGE COVERAGE
(s) TYPE OF SPREAD
(t) DIST TO TR1/TR12/TR13/TR24
(u) TRACE INTERVAL
(v) NO. OF PHONES/TRACE
   *GEOPHONE DATA*
(w) TYPE OF PHONE
(x) TYPE OF PATTERN
(y) GEOPHONE INTERVAL
(z) LENGTH OF PATTERN
(aa) WIDTH OF PATTERN
   *SOURCE DATA*
(bb) VIBRATOR POINT INTERVAL
(cc) NO. OF VIBRATORS
(dd) VIBRATOR INTERVAL
(ee) LENGTH OF PATTERN
(ff) WIDTH OF PATTERN
(gg) SWEEPS/V.P.
(hh) TYPE OF SWEEP (FS1/FE2/TAPER/DURATION)

TABLE II-continued
* OBSERVER'S REPORT *
*END OF OBSERVER'S REPORT*

(Letters in ( ) in the left-hand column of Table II do not appear in the report, but are merely legends used for reference herein.

When a title surrounded by ***'s is typed, the computer prints out the next item and follows it with a question mark on a new line. Whenever a question mark appears, it indicates to the observer that the computer is waiting for an answer. The observer replies 0, 1, or 2 to each item in accordance with the code of Step 3 and then takes certain additional action, if required.

The observer types a 0 if the item is not to be changed. When a 0 is pressed, the previously recorded data is not displayed, resulting in a saving of time in the operation of the system.

But the computer compels the operator not to forget any item, unless it is skipped because one of his prior answers makes that item inapplicable.

The operator types a 1 if new information is to be stored in place of the old information. When this is done, the old information is overridden by the new information and if the new information occupies less storage than the old information, the computer automatically erases the balance of the old information.

The observer then types either a 0 to advance to the next item on the list to be considered, or a 1 to prepare the computer to receive new information which he then types in, or a 2 if he wants whatever is stored in the computer under the item to be displayed.

Four principal types of combined action are possible, which may be briefly characterized as follows:

Action 1. Reply 0. Go to next item.
Action 2. Reply 1 and carriage return. Type in new data. And then type a carriage return signal.
Action 3. Reply 2. The old information is displayed. Then the operator types carriage return to proceed.
Action 4. Reply 2 and press carriage return, reply 1 and press carriage return, type in new data. Then press the carriage return key.

Provisions for carrying out actions 1, 2, and 3 have already been put into use. Action 4 may be similarly embodied in the program in accordance with well known principles.

For example, if the computer has just presented the item DATE, four actions are possible, namely, Action 1. To skip. The observer presses the carriage return button. Thus, the typewriter displays both the question and the 0 instruction as follows:
DATE
? ⓒⓇ

Action 2. To replace or change the date, the observer first types 1 and presses carriage return. The computer returns to its initial position and presents a question mark. The observer then types in the new date and presses the carriage return key, all as indicated by the following display:
DATE
?1 ⓒⓇ
?FEB. 29, 1972 ⓒⓇ

Action 3. Display and then proceed. The observer types a 2 and then presses the carriage return key. In this case, the computer types out the date and then advances to the next line where a question mark is displayed. The observer then presses the carriage return key. The resultant display of the typewriter is represented by the following:
DATE
?2 ⓒⓇ
FEB. 28, 1972
? ⓒⓇ

Action 4. To display old data and then to correct it in the computer. In this case, the observer first types a 2 and presses the carriage return key. This results in display of the information already stored in the computer and advances to the next line where a question mark is typed automatically by the computer. The observer then types in a 1 carriage return and then after the computer types a question mark, the observer types the new date and presses the carriage return. The resultant material typed on the typewriter appears as follows:
DATE
?2 ⓒⓇ
FEB. 29, 1972 ⓒⓇ
?1 ⓒⓇ
? Mar. 1, 1972 ⓒⓇ It is to be noted that if after the presentation of a question mark, the observer merely presses the carriage return key, this results in erasing the information previously stored under DATE.

Certain items of the observer's report deserve some special explanation.

Item f represents the number or other identifier of the exploration line X—X as indicated on some map or written instructions being referred to by the observer.

Item g indicates the direction that the line extends on the earth, that is, the direction of increasing geophone station numbers.

Item h indicates the direction that the geophone station corresponding to trace No. 1 relative to the other geophone stations.

Item m represents the sampling period, that is, the time interval between successive signal samples which are employed in operating the multiplexer SMUX. These intervals are determined by settings in the system controller FSC. The setting of the corresponding alias filters are also recorded. As is well known, there must be a correspondence between the characteristics of the alias filters FIL (see FIG. 5) and the sampling interval to prevent signals of spurious frequencies from appearing in the final records MTR. For example, the alias filter FIL may be a low-pass filter with a cutoff frequency about one-half of the sampling frequency.

Item s refers to the type of spread. For example, this may be a single-ender type spread in which all of the geophone stations lie on one side of the seismic wave source or it may be a split spread in which the seismic wave source lies between the ends or the spread.

Item t indicates the distance from the center of the group of vibrators to the closest of the geophone stations that correspond to the respective traces TR1, TR12, TR13, and TR24, and corresponding amplifier channels AC1, AC12, AC13, and AC24, when a split spread is used.

Item u "trace interval" refers to the spacing between geophone stations, that is, the spacing between the centers of the geophone arrays.

Item v refers to the number of geophones in a geophone array corresponding to a single geophone station.

Item w refers to the type of geophone employed.

Item x refers to the type of array of geophones that is employed.

Item y refers to the spacing between geophones in the array.

Item z refers to the length of the geophone array.

Item aa refers to the width of the geophone array.

The "SOURCE DATA" refers to the seismic wave generators, such as the Vibroseis trucks VIBTR. More particularly, this data describes the arrangement and spacing of the trucks.

Item bb corresponds to the distance between centers of source areas. Typically, this is the same as the intergeophone station distance.

Item cc refers to the number of vibrators, or vibrator trucks, VIBTR.

Item dd refers to the spacing between the vibrator trucks.

Item ee refers to the total overall distance between positions of the vibrators VB in the entire set of chirps for a particular setup, that is, the chirps that contribute to the same set of composited signals.

Item ff refers to the width of the vibrator source. This width is zero if there is only one line of vibrator trucks, but it may be up to several hundred feet if several lines of trucks are employed. The length of the vibrator pattern is measured along the line of exploration and the width of the vibrator pattern is measured in a direction normal to the line of exploration X—X.

Item gg refers to the number of chirp signals that are generated in the source area of a single setup. There may be more than one chirp signal generated each time the Vibroseis trucks are stopped at a particular vibrator position. For example, in a particular source area, there may be only 20 positions, but the chirp signal may be generated twice in each position, thereby making the number of chirps equal to 40.

Item hh is a brief description of the chirp excitation signal.

In another form of the invention, the data typed in respecting Item hh, is employed to set parameters for creation of the chirp excitation signal within the computer. In any event, there must be appropriate correspondence between the information stored with respect to Item hh and other information which is stored in response to Steps 14 to 25 inclusive of the PREP program, as described hereinafter.

In an alternative form of the invention, signals are automatically stored in the computer COMA to represent some of the conditions which have been set in the field equipment DRS. This includes the settings of the filters corresponding to Items o, p, and q. The automatic operation may be achieved simply by means of digital relay units and timed gates.

Since the program is written to present each of the items in Step 4 to the observer consecutively one at a time, he is compelled to record all of such information that is needed for the subsequent interpretation of the data recorded on the tape MTR. This information may be displayed by the typewriter on command at a later time.

Step 5. NEW COMPUTER SYSTEM PROCESSING

PARAMETERS?, 1=YES

The observer replies by typing 1 if it is desired to introduce new processing parameters into the system or a 0 if he does not. If a 0 is typed in, the program skips to Step 16. If a 1 is typed in, the program proceeds to Step 6.

Step 6. INPUT TIME

In this case, the response must be a number no greater than 32,000. (Time is expressed in millisec throughout this application unless otherwise specified.)

On the other hand, in the particular computer system described herein, only 8,000 samples can be processed. Accordingly, the number 32,000 may be typed in only if the sampling interval of the binary gain amplifiers GBA is 4 ms. If the sampling interval is only 2 ms then the maximum number that may be typed in is 16,000. In effect, the amplifiers receive the incoming signals for a period equal to the input time, commencing from the instant of inception of the chirp signal. The part of the INPUT TIME that remains after the chirp signal has terminated, is called the listening period.

Step 7. SWEEP TIME (TS)

Here, the observer types in the length of the chirp signal that is to be employed. This time may not exceed the input time set forth in Step 6. Usually the sweep time is more than 50% but less than 80% of the input time. Thus, the listening time is usually less than 50% but more than 20% of the input time.

Step 8. OUTPUT TIME

This term refers to the total duration of the ultimate output record that may be produced after correlation. In effect, the output time corresponds to the time of travel of a pulse from the source to the receiver over the path of greatest duration as, for example, over path involving reflection from the deepest stratum. Any number between 1 and 16,000 may be typed in provided that other criteria are satisfied. Furthermore, for best results, the output time should be no greater than a. either half the input time;

b. or the input time minus the sweep length; whichever is the lesser. The PREP program is written to warn the operator when any of these criteria have not been met, by typing ERROR or ILLEGAL and repeating the inquiry.

Step 9. SAMPLE INTERVAL

At this point, the observer specifies the interval between samples in the binary gain amplifiers in milliseconds. The system is designed to accept as legal only the answer 2 or the answer 4. If, for any reason, any of the criteria specified above are not satisfied by the reply, an error is indicated and the computer returns the program back to Step 6 for a new try.

Step 10. RECORD ID

Here, the observer types a number between 1 and 999. This will be the number of the first group of records subsequently written on the magnetic tape MTR of the output recorder OTPR. The computer includes provisions for incrementing the record number automatically by 1 thereafter each time a new set of compositing operations is intiated. This number is embodied in the header of the corresponding records.

Step 11. NO. OF SWEEPS/COMPOSITE

In response to this inquiry, the observer types a positive number less than an arbitrary maximum such as 100. This number indicates the total number of times that the chirp signal is to be transmitted to the vibrator truck system VIBTR in order to apply a chirp signal to the earth for each setup. Each of these chirp signals results in a train of seismic waves which is processed by the computer system in order to form the cumulative multiplexed composite record.

Step 12. DISPLAY COMPOSITE AFTER SWEEP X?, 0=NO DISPLAY

If a 0 is typed in, the computer skips to Step 14. But if any number is typed in less than the number typed in the response to Step 11, the computer proceeds to Step 13. If any other number is typed in an ERROR is indicated. The number typed in at this step is referred to as X hereinafter.

Step 13. DISPLAY INCREMENT

In reply to this inquiry, the observer types in any number NN, such as 2 or 3 or 12 or 20, which does not exceed the difference between the numbers typed in in response to Steps 11 and 12.

If an appropriate number X other than 0 is typed in in reply to Step 12, then each time a series of sweeps is generated to produce a composite record, the computer does not wait for the total number of chirps to be generated as specified in Step 11 before it produces a display on the multiple-trace recorder MTRC. Instead, when sweep X+1 is reached, a display is produced in the multiple-trace oscillograph recorder MTRC. The material displayed is a cross-correlation of the composited signals with the chirp signal. The manner for producing these cross-corelated traces is explained hereinafter.

When the start switch is pressed again, operation is resumed until NN additional chirps have been transmitted. The signals received as a result of the transmission of these chirps, are composited with those previously produced. When the X+1+NN chirp has been transmitted, the new correlated records are displayed on the recorder MTRC. This process is repeated over and over for additional increments NN in the number of chirp signals transmitted, until the total number of chirps reaches or exceeds the number specified in response to Step 11. By displaying the results of correlating composites of a smaller number of chirps than the number specified in Step 11, it becomes possible for the observer, by examining the resultant records, to determine whether the number of chirps required to produce good records can be reduced. A test of this type might very well be made when entering a new area of exploration or when resuming operations at a time when there is a noticeable reduction in the background noise, such as a reduction due to movement to an area where there is less traffic or when weather conditions appear to be more quiet.

If the number specified in Step 11 has not been reached at the time of the last display, the computer proceeds to complete the operations specified in Step 11 and then continues in the normal manner.

Step 14. DELAY BETWEEN SWEEPS

In response to this inquiry, the observer types in a positive number no greater than 32,000 to represent the number of milliseconds that must elapse between the termination of the input time and the initiation of the next chirp. This feature is particularly important where the transmission of a series of chirp signals occurs automatically in response to a single operator command instead of only one chirp signal upon command of the operator. When the chirps are occurring automatically, the delay between inception of successive chirps might not otherwise be long enough to permit the Vibroseis trucks VIBTR to be advanced from one position to the next and to be placed in operative condition prior to the initiation of that next chirp signal.

Step 15. DELAY BETWEEN COMPOSITES

In response to this inquiry, the observer types in a positive number no greater than 32,000 to represent the number of milliseconds that must elapse between the termination of compositing for one chirp and the initiation of compositing for the next chirp. This delay also prevents reoperation for the next setup until the specified delay has occurred.

Step 16. GENERATE NEW SWEEP?, 1=YES

In reply to this inquiry, the observer types in 0 to mean no and 1 to mean yes. If this reply is no, the program skips automatically to Step 26. If the reply is yes, the program proceeds automatically to Step 17.

Step 17. STARTING FREQ. (FS)

In response to this inquiry, the starting frequency is specified in Hz (cycles per second) as a decimal, or floating point, number, less than half the sampling frequency. A typical starting frequency is 10 Hz.

Step 18. ENDING FREQ. (FE)

In response to this inquiry, the ending frequency is also specified in Hz as a decimal, or floating point, number, which is also less than one-quarter the sampling frequency. A typical ending frequency would be 40 Hz. A higher frequency is sometimes employed for special tests.

Two types of sweeps (see Step 20) are available, namely, a linear sweep and an exponential sweep. If an exponential sweep is to be generated, the ending frequency is usually greater than the starting frequency.

Step 19. TAPER

In reply to this inquiry, the observer types in a number between 0 and 16,000 to represent the length of the period over which the amplitude of the chirp signal is to be tapered. The tapering is in accordance with a cosine function. The taper length may be any positive number less than half the sweep length.

Step 20. TYPE (1=linear, 2=exponential)

The reply to this inquiry involves typing the digit 1 or the digit 2. If the digit 1 is typed, then the maximum or peak amplitude of the chirp signal is constant from beginning to end except for the tapering. The frequency varies as a function of time, as follows:

$$f_i = FS + \left(\frac{FE - FS}{TS}\right) t$$

where t the travel time and the sweep time TS are in the same units. This type of signal is sometimes referred to as a linear sweep signal.

If the digit 2 is typed in reply to this inquiry, the maximum amplitude increases exponentially, commencing with the starting frequency and ending with the ending frequency, except for the modifications at the beginning and the end due to the cosine tapering. This type of signal is sometimes referred to as an exponential sweep signal.

Step 21. MAX AMP

In reply to this inquiry, the observer types a number between 0 and 32767. If a 0 is typed, the value 32767 is substituted. The number specified represents the maximum amplitude that the chirp excitation signal may have.

If the reply to Step 20 is 1, the program skips to Step 26, if the reply was 2, the program proceeds to Step 22.

Step 22. STARTING AMPLITUDE (AMPS)

In reply, the observer types in a number between 1 and 32767. This number represents the initial amplitude except for the modification produced by the cosine tapering.

Step 23 AMPLITUDE EXP (AMPEX)

In reply, the observer types in any positive decimal or floating point number, either positive or negative, that he wishes to utilize. This number, however, is usually between about −4.0 and 4.0. This number determines the rate of change of maximum amplitude as a function of time.

The computer is programmed to alter the maximum amplitude of successive pulses of sine waves of the untapered chirp excitation signal to satisfy all the requirements of Steps 21, 22, and 23.

Step 24. FREQ. EXP. (FEX)

In reply to this inquiry, the observer types in any positive decimal or floating point positive number that he desires. If this number is set at 1.0 the sweep will be linear. This number determines the rate at which the frequency changes from one end of the chirp signal to the other.

Step 25. DOWNSWEEP?, 1=YES

The observer types in either 0 or 1. If it is 0, the chirp signal generated by the computer is used in the form generated. If a 1 is typed in, then the sweep signal is automatically reversed in time end to end.

Step 26. PRE-XCOR GAIN CURVE?, 1=YES

The observer types in a 0 if no pre-correlation gain corrections are to be made. In that case, the precorrelation gain, in effect, is uniform from beginning to end. If a 1 is typed, then a pre-correlation gain curve is to be generated. The gain change, or correction, is one which is employed to modify the amplitude of composited signals described hereinafter as a function of time prior to correlation. The gain corrections compensate for an assumed average rate of decay of a signal as a function of travel time in db/sec. If the answer is 0, the program skips to Step 34. If the answer is 1, the program proceeds to Step 27.

Step 27. RATE OF DECAY IN DB/SEC

In reply to this inquiry, the observer may type in any positive decimal, or floating point, number. The number designates the anticipated rate of decay of the signal that is to be corrected, in db/sec. The computer applies these corrections automatically.

Step 28. SPLIT (=0) OR SINGLE ENDED (=1)

In reply, the observer types a 0 or a 1. A 0 is typed if the spread is to be split evenly between traces TR12 and TR13 to correspond to a split spread and the source area is located midway between the centers of the two geophone stations connected to amplifier channels AC12 and AC13 for each setup.

If a 1 is typed, this indicates that all the geophones lie on one side of the signal source. In other words, the spread is single-ended.

If the reply is 0, the program skips to Step 30. If it is 1, it proceeds to Step 29.

Step 29. NEAR TRACE

The reply designates the number of the geophone station that is closest to the source. In the case of a 24-trace single-ender spread, the reply must be either 1 or 24. The number typed in represents the number of the geophone station that is closest to the source.

Step 30. NEAR TRACE START TIME

In reply, the observer types a number representing the time in milliseconds that must elapse before the gain of the amplifier channel of the geophone closest to the source to be altered from sample to sample automatically, in accordance with the reply to Step 27. Prior to that time, no gain corrections are made. The near trace start time may be 0.

Step 31. FAR TRACE START TIME

In reply, the observer types a number representing the time in milliseconds that must elapse before the gain of the amplifier channel of the geophone farthest from the source is to be altered from sample to sample automatically in accordance with the reply to Step 27. Prior to that time, the gain of the amplifier corresponding to that trace remains constant in accordance with the setting of the initial amplification of the last-trace amplifier channel itself. The far trace start time may also be 0.

The time of inception of changes of gain automatically for the other channels are determined automatically by interpolation by automatic calculation within the computer.

The signals are stored in the computer in response to Steps 30 and 31 and the interpolated signals that are automatically generated are applied to the data in accordance with instructions pursuant to the replies in Steps 26 and 35 and the related steps.

Step 32. WINDOW END TIME

In reply to this inquiry, the observer types a number between 0 and 32,000. This corresponds to the number of milliseconds that elapse before automatic gain changing is terminated. After that time, the gain is held constant at the value that the gain has at that time even if the value GMAX (see Step 33) has not been reached. The response to Step 32 must be greater than the response to either Step 30 or Step 31.

It is to be noted that the initiation of gain correction may be different from one channel to another at the beginning of the recording, but that the changing of gain is terminated at the same time on all channels. This is done because the strength of the signals are usually very different at the beginning of the recording of different traces, depending upon the distance of the geophone station from the seismic wave source area, whereas at the end of the recording, the signals received at any one time at the respective geophone stations after reflection from deep subsurface formations have traveled about equal distances and are all of about the same amplitude.

Step 33. MAX. GAIN VALUE (GMAX)

In reply to this inquiry, the observer types a number between 0 and 32767. If a 0 is typed, the value 32767 is substituted. A typical value is 16,000. The number specified represents the maximum value of the gain correction to which the received signal may be subjected. After the operator responds, the program advances to Step 34, if Step 34 has not been reached previously, otherwise it skips to Step 35.

Step 34. POST-XCOR GAIN CURVE?, 1=YES

The observer types in a 0 if no post-correlation gain corrections are to be made. In that case, the post-correlation gain is, in effect, uniform from beginning to end. If a 1 is typed, then post-correlation gain corrections are to be made. The gain corrections are employed to modify the amplitude of the signals described hereinafter as a function of time after cross-correlation and synthesis.

If the answer is 0, the program goes to Step 35.

But if the reply in Step 34 is a 1, the program returns to Step 27 and then proceeds to interrogate the observer until it reaches Step 33.

In any event, the replies to Steps 27–33 are employed to program the application of gain change correction to successive samples either prior to cross-correlation or subsequent to cross-correlation according to whether a yes answer was provided in Step 26 or in Step 34. It is to be noted that gain corrections may be applied either before or after correlation or both before and after. If a no answer is provided in both steps, no gain correction is applied.

Step 35. FREQUENCY ANALYSIS?, 1=YES

In reply to this inquiry, the observer types a 0 or a 1. If he types a 0, the computer skips to the end of the PREP program and then executes program VSWG. If the answer is a 1, the program proceeds to Step 36.

The term "frequency analysis" here refers to the determination of the spectrum of a part of a correlated trace. In such an analysis, the power spectrum is generally developed. This is the power per unit frequency at each of several frequencies over a predetermined range. This range extends from 0 Hz to an upper frequency that is one-half the folding, or Nyquist frequency, that is, to one-fourth the sampling frequency. For example, if the sampling interval is 4 ms, the upper frequency is set to 62 Hz. The portion of a recorded signal subjected to frequency analysis is the portion which begins at the window start time and ends at the window end time as specified below.

Step 36. START TRACE

In reply, the observer types a positive integer no greater than the total number of geophone stations, in this case, a positive number no greater than 24. This number designates the first trace which is to be subjected to frequency analysis.

Step 37. TRACE INCR.

In reply, the observer types in a number less than the total number of traces. This number indicates how the trace number is to be incremented after one frequency analysis has been completed before performing the next frequency analysis. Of course, the program terminates if the total number reached in such incrementing process exceeds the total number of traces. This termination occurs for the first trace frequency analyzed if the sum of the replies in Steps 33 and 34 exceeds the total number of traces.

Step 38. NO. OF TRACES

In reply, the observer types in a positive number no greater than the number of geophone stations. In case of a 24-trace unit, this number is no greater than 24. This is the number of traces which are to be subjected to frequency analysis for the setup.

By way of example, if the answers typed in in Steps 36, 37, and 38 are 10, 2, and 4 respectively, frequency analysis will be performed for traces 10, 12, 14, and 16 only.

Step 39. WINDOW START TIME

In reply, the observer types in a number between 0 and the output time (see Step 8). This number specifies the starting time at which to commence the frequency analysis.

Step 40. WINDOW END TIME

In reply, the observer types in a number between 0 and the output length. This number specifies when total time period of the part of the trace which is subjected to frequency analysis of the trace to terminate the frequency analyses. The end time must be greater than the start time (Step 39) and less than the output time (Step 8).

The two times specified in reply to the inquiries in Steps 39 and 40 determine the part of the record which is to be subjected to frequency analysis. Upon completion of Step 40, the execution of the PREP program terminates and automatically writes out "END OF OBSERVER'S REPORT".

An example of the output produced on the typewriter TTY is represented in Table III. In this particular case, it is assumed that the information for the Observer's Report had previously been entered and that it was to be listed but that many, though not all, of the parameters were to be changed.

TABLE III
*UGC CAFDRS III SYSTEM*

OBSERVER'S REPORT?, 1 IF YES
?1,
  LIST?, 1 = YES
?1,
  DATE
OCT 5, 1972
  CLIENT
BLACK GOLD OIL CO
  STATE
CALIF
  COUNTY
LOS ANGELES
  PROSPECT
PASADENA
  LINE NUMBER
1A
  LINE DIRECTION
N
  DIRECTION OF TRACE 1
N
  PARTY NO.
100,
  OBSERVER
CRUMBY
  TRUCK NO.
785
  TYPE OF INSTRUMENTS
SDS 1010
*INSTRUMENT SETTINGS*
  SAMPLE INTERVAL/ALIAS FILTER
4MS
  RECORD TIME
32 SEC
  LO CUT FILTERS
OUT
  HI CUT FILTERS
OUT
  NOTCH FILTERS
60 HZ IN
*SPREAD DATA*
  PERCENTAGE COVERAGE
1200
  TYPE OF SPREAD
SINGLE ENDED
  DIST TO TR1/TR12/TR13/TR24
1320/4950/5280/8910
  TRACE INTERVAL
330 FT
  NO. OF PHONES/TRACE
40
*GEOPHONE DATA*
  TYPE OF PHONE
HSJ
  TYPE OF PATTERN
PETERSON ARRAY
  GEOPHONE INTERVAL
VARIABLE
  LENGTH OF PATTERN
330 FT
  WIDTH OF PATTERN
  NEW COMPUTER SYSTEM PROCESSING PARAMETERS?, 1 = YES
?1,
  INPUT TIME
?32000,
  SWEEP TIME
?20000,
  OUTPUT TIME
?8000,
  SAMPLE INTERVAL
?4,
  RECORD ID
?100,
  NO. OF SWEEPS/COMPOSITE
?20,
  DISPLAY COMPOSITE AFTER SWEEP X?0 = NO DISPLAY
?

TABLE III-continued
*UGC CAFDRS III SYSTEM*

DELAY BETWEEN SWEEPS
?500,
   DELAY BETWEEN COMPOSITES
?1000,
GENERATE NEW SWEEP?, 1 = YES
?1,
   STARTING FREQ. (FS)
?10.
   ENDING FREQ. (FE)
?40.
   TAPER
?250,
   KIND?, 1 = LINEAR, 2 = EXPONENTIAL
?1,
   MAX AMP
?
   PRE-XCOR GAIN CURVE?, 1 = YES
?
   POST-XCOR GAIN CURVE?, 1 = YES
?1,
   RATE OF DECAY (F) IN DB/SEC
?12.
   SPLIT (=0) OR SINGLE (=1)
?0,
   NEAR TRACE START TIME
?300,
   FAR TRACE START TIME
?1500,
   WINDOW END TIME
?4000,
   MAX. GAIN VALUE
?
   FREQUENCY ANALYSIS?, 1 = YES
?1,
   START TRACE
?1
   TRACE INCR.
?6,
   NO. OF TRACES
?4,
   WINDOW START TIME
?500,
   WINDOW END TIME
?2500,
*DGEN*
   MODE
?
FILE NO. = 002 REEL NO. = 062 SW POS = 70 VIBR POS = 1
FILE NO. = 004 REEL NO. = 062 SW POS = 71 VIBR POS = 2
FILE NO. = 006 REEL NO. = 062 SW POS = 73 VIBR POS = 3
FILE NO. = 008 REEL NO. = 062 SW POS = 75 VIBR POS = 4

Immediately upon completion of the PREP program, the computer asks whether the operator desires the system to make use of the DGEN program. If the reply to the mode of use is 0 as in the above illustration in Table III, the DGEN system is not utilized and the operation proceeds. As each operation is completed, a line of data is typed out giving a file number, a reel number, and the position of the roll-along switch. The vibrator position number, that is, the location of the source area in which the seismic chirp signals are applied to the earth for a given setup, is typed in by the operator.

All of the information supplied by the operator to the computer in response to the inquiries in the PREP program are stored on the drum DRB of the master computer in track 48. More particularly, a LINE TABLE is stored which represents certain parameters. The LINE TABLE occupies two sectors of track 48. The relationships of the word numbers to the replies given to various steps are indicated in Table IV.

TABLE IV
LINE TABLE FORMAT

| WORD NUMBER | PREP STEPS | |
|---|---|---|
| 1 | (6,9) | Number of composite data samples per trace |
| 2 | (7,9) | Number of sweep samples per chirp |
| 3 | (8,9) | Number of correlated data samples per trace |
| 4 | (9) | Sample rate |
| 5 | (10) | Record ID |
| 6 | (11) | Number of sweeps per composite |
| 7 | (12) | First sweep to display (X+1) |
| 8 | (13) | Display increment |
| 9 | (14) | Minimum delay between successive sweeps |
| 10 | (15) | Minimum delay between composites |
| 11 | | |
| 12 | | Number of composite data segments |
| 13 | | Number of sweep segments |
| 14 | | N ⎫ |
| 15 | | IWK ⎬ VTRN constants |
| 16 | | LX number of samples per segment |
| 17 | | |
| 18 | (36) | Starting trace number ⎫ |
| 19 | (37) | Trace increment ⎬ Frequency Analysis |
| 20 | (38) | Number of traces ⎬ |
| 21 | (39) | Window start ⎭ |
| 22 | (40) | Window end |
| 23 | (26) | Pre-XCOR gain flag (0 = No, 1 = Defined) |
| 24 | (34) | Post-XCOR gain flag (0 = No, 1 = Defined) |
| 25 | | |

Where a single step number is designated after the word number, the number stored in the word is the actual reply of the observer to the inquiry made in the step. Where two steps are involved, the number stored in the word is calculated automatically by the computer by well-known methods. Thus, in word 1, there is stored the length of the output traces in milliseconds divided by the sample interval in milliseconds. This yields the number of samples per trace. In the case of word 7, the number stored is 1 greater than the reply (X) to Step 12.

In the foregoing table, the words having the numbers 11, 17, and 25–32, are empty or blank, being reserved for future use.

Certain additional data is stored in the locations of word numbers 12, 13, 14, 15, and 16. These numbers are stored in these locations by manipulation of the controls on the control panel CPB of the computer COMB, in accordance with well known methods. Or they may be fed into the computer as part of the monitor programs.

In word 12, there is stored the number of data parts, or segments, into which the composite traces are divided. This number may be any number from 1–4. In this specification, we will assume that it has been set at 4, unless otherwise noted.

In word 13, there is stored the number of data parts, or segments, in which the sweep traces are divided. This number may also be any number from 1–4. In this description, we will assume that it has been set at 2, unless otherwise noted.

The number LX stored in word 16 represents the number of samples per data segment. In the particular system employed, this number is 2048. It is also fed into the computer by manipulation of the switches on control panel or the main computer COMB or as part of the monitor program, in accordance with well-known methods.

The numbers stored in the locations of words 12, 13, 14, 15, and 16 of track 28 may also be fed into the computer from a punched tape by means of the tape reader TPR.

What occurs upon termination of the PREP program depends to some extent upon the replies that have been given to questions presented by the computer in various steps of the program.

One of the important questions involves the reply to the question raised in Step 16. If the answer is no, no new sweep signal is generated and control returns to the monitor MONB and certain signal lamps on the status panels STLA and STLB are illuminated automatically to indicate that the system is ready for operation.

But if the answer to the question raised in Step 16 is yes, control is returned to the monitor and then it proceeds automatically to generate and store a chirp excitation signal. This is done by replicating the VSWG computer section in the working memory unit WMB and causing it to execute to produce and store the chirp excitation signal, transfer this signal to certain parts of the drum DRM and in part of drum DRB and then, upon completion of this operation, to again return the controls to the monitor computer section MONB and to indicate on the status panels STLA and STLB that the computer system is ready for operation. In either event, when the computer section is ready for operation, the START button of computer COMA is pressed causing Vibroseis signals to be generated in the source area, received by the geophones, composited, correlated, and recorded on the output tape MTR as previously described.

VSWG Computer Section

The VSWG computer section is employed to generate the chirp excitation signal on completion of the PREP program if the answer given in Step 16 is 1. When called into operation, the VSWG program is reproduced in the working memory WMB of the correlation computer COMB.

The VSWG program comprises three parts: One for reading a previously calculated chirp signal from drum DRB into the working area if no new chirp signal is to be generated; another for generating a linear chirp signal if this is what is required; and a third for generating an exponential chirp signal if this is what is required.

If the reply in Step 20 of PREP was 1, a linear chirp excitation signal is generated. If the reply was 2, an exponential chirp signal is developed. The program is written to construct a table in which the amplitude of the sweep excitation signal is stored in a series of sample cells, each corresponding to the time t in seconds at which the respective samples are to appear. Each of the sample cells has a length of one word of 16 bits each.

Two of the chirp signals are illustrated in FIGS. 9 and 10 in analog form. A chirp signal that is linear with frequency is shown in FIG. 9 prior to application of a cosine function. FIG. 10 illustrates in analog form how the amplitude of a linear chirp signal varies as a function of time when cosine tapering is employed at the two ends. In the chirp signals illustrated, frequency increases as a function of time. But this direction of frequency change could be reversed by answering 1 in Step 25 of the PREP program.

In the exponential chirp function, either the maximum amplitude or the frequency or both vary exponentially as a function of time.

The numbers of the memory cells in which the data are stored are assigned in accordance with the formula
CNS = T/TINC where
T = sample time in seconds elapsed from the beginning of the chirp.
TINC = sampling interval in milliseconds specified in the reply in Step 9. In case the reply given in Step 20 is 1, the value of the signal (both amplitude and sign) to be stored in the cell in question is given by the formula

SWEEP(T) = AMP * SIN (2π*X2), where

X2 = T*[FS + T*(FE−FS)/2*TS)]

where

TS = SAMP * TINC

The integral part of X2 to the left of the decimal point may be disregarded. Methods of disregarding this part of a number are well known.

In the foregoing equation
FS = starting frequency given in the reply in Step 17.
FE = ending frequency as determined in the reply in Step 18.
AMP = reply provided in Step 21.
SAMP = number of samples in sweep (see word 2 of Table IV).

Where the reply given in Step 20 is 2, an exponential sweep is generated from the following formulas:

SWEEP(T) = AMPL * SIN (2π*X2)

X2 = fractional part of XTL $$XTL = \sum_{T=0}^{T} [(FS*TINC) + (FE - FS)*TINC*(T/(SAMP*TINC))**FEX]$$

AMPL = AMPS*EE**(T*AMPEX)

EE = 2.7183 where
AMPS = starting amplitude established by the reply in Step 22.
AMPEX = amplitude exponent given in reply in Step 23.
FEX = frequency exponent established by the reply given in Step 24.
In this equation
* is the symbol for multiplication, and
** is the symbol for exponentiation.

Where a cosine taper is applied, the magnitudes of the numbers stored are reduced to 0 at both ends of the sweep and are gradually increased in a direction toward the center of the sweep in accordance with well known methods.

After the VSWG program has executed, storing the sweep signal in the static memory, the sweep excitation signal is then automatically transferred to the drum DRB, being stored there in integer form in tracks 49 and 50. The computers are also programmed to store a copy of the sweep signal in designated parts on the tracks 28 to 127 of drum DRA as explained hereinafter (see FIG. 8).

The sweep signal that is stored in tracks 28–127 of drum DRA are utilized from time to time by the system to transmit a sweep excitation signal to the Vibroseis trucks.

SETCOR Computer Section

The SETCOR program is a subroutine program of the VTRN subroutine and is called into operation prior to the time that the Fourier transforms of the sweep signal are calculated. Thus, the SETCOR computer section is part of the VTRN calculator.

The values of the numbers stored in words 12, 13, 14, 15 and 16 of Table IV and certain other data are calculated by means of a subroutine called SETCOR. When transferred to the working memory WMB, the SETCOR calculator calculates the following items:
1. The number of composite data segments.
2. The number of sweep data segments.
3. The logarithm to the base 2 of LX.
4. The index for the exponential table.
5. The number of samples per trace part to transform (LX). The calculation of LX takes into account the fact that each segment is 2048 words long or less.

The minimum number of segments (words 12 and 13) required is related to the constants that have previously been stored in lines 1 and 2 of the LINE TABLE, namely,
1. The number of samples per composite trace (word 1).
2. The number of samples per sweep (word 2). Stated simply, the number of composite trace segments multiplied by 2048 must be less than the number of samples in the entire record.

The SETCOR computer section also is employed to calculate various constants. Certain of these constants, namely, N and IWK are stored in words 14 and 15 of the LINE TABLE. These constants are used in the sweep transformer VTRN. More particularly, word 16 stores the constant LX, the number of samples per trace to be transformed. The number N that is stored in word 14 is the logarithm of LX to the base 2, and the value IWK that is stored in word 15 is the pointer to the beginning of an exponential table that is to be calculated by the EXPON computer section, described hereinafter, for use in performing correlation operations.

The foregoing data and other data that has been supplied in response to the questions presented by the PREP program are also stored in preassigned areas PMA and PMB of the monitor programs MONA and MONB so that immediate access can be had to such information during the operation of the system.

EXPON Calculator

The EXPON calculator is a computer section stored on tracks 4 and 5 of drum DRB. The EXPON program is employed for generating a table of complex exponential numbers that are employed for performing Fourier analysis of either a Vibroseis sweep signal or a composite Vibroseis signal. These numbers are in the form of sine and cosine functions. The values are stored in pairs in track 55 of the main drum DRB.

The exponential (sine and cosine) table that is calculated takes into account the length of the sweep signal and the length of the input and makes it possible to calculate desired values of samples for both the transform of the sweep and the transform of the composite signals which are to be cross-correlated, in accordance with well known methods.

VTRN Calculator

This calculator is stored on the main drum DRB on tracks 6 and 7. This calculator operates to convert the sweep signal into its Fourier transforms.

The VTRN calculator employs two subsidiary parts, namely, the SETCOR calculator which is employed to compute certain LINE TABLE parameters, as mentioned above, and an EXPON calculator which is used to compute an exponential table employed in performing certain operations of the Fourier transform analysis of the composite signals. More particularly, the EXPON calculator calculates a table of sines and cosines in which the values are associated with the sample numbers for use in making the subsequently needed calculations. These values are stored in track 55.

The Fourier transform of the sweep signal is stored on tracks 51–54. This transform may consist of a maximum of four parts. Each of the four parts consists of a complex vector having a real component and an imaginary component. These parts are computed by methods well known in the art from equations (1), . . . , (4) described above. Each component of the vector, that is, the real component and the imaginary component has 2048 words. The four Fourier transforms are stored on tracks 51, 52, 53, and 54 respectively.

If the Cooley-Tukey algorithm is employed, the range of frequencies extends from zero to the sampling frequency. If the Bergland algorithm for real data is employed, the range of frequencies extends from zero to one-half the sampling frequencies. In the latter case, the Fourier transform is in the form of a complex number corresponding to each of 2048 frequencies in the range, thus requiring a storage capacity of 4096 words. The real and imaginary components at each frequency are stored consecutively on the drum DRB, but the pairs of components for different frequencies are not necessarily stored in sequential order.

The calculator normalizes all of these parts to full scale after the calculations have been made. The sweep signal transforms are utilized from time to time in order to cross-correlate the recorded composite signals with the sweep signal.

DSIM Generator

The DSIM generator is a computer section which computes and stores a small library of signals that may be employed to apply one of several different types of signals to the electrical components. It may be employed to apply a ramp signal, a series of square-wave pulses, a sine wave, or a chirp signal. These signals are applied to the input of the computer system for testing purposes. The sweep signal can also be applied through a digital-to-analog converter to the binary gain amplifiers.

CORRELATION Computer Section

The CORRELATION computer section is designed to replicate multiplexed composited data that has previously been stored in computer COMA, to demultiplex the data, and to write the demultiplexed data in single-precision form on the drum DRB of the main computer, to automatically cross-correlate each demultiplexed trace with the sweep signal in accordance with the equations previously described, and then to multiplex the cross-correlated output signals to place them in condition for outputting to the magnetic tape recorder MTRC.

The CORRELATION computer section includes three subsections, namely, the DMX processor, the XCOR calculator, and the MUX processor for performing the principal operations required.

The CORRELATION section reads in the LINE TABLE from track 48 before the three processors just mentioned are operated.

The DMX processor performs the demultiplexing operation and if a yes response was provided in Step 26 of the PREP program, applies gain compensation to the data, and writes the results on drum DRB. The operation of the DMX processor is described hereinafter in a separate section.

The XCOR calculator performs the required cross-correlation calculations and stores the results on drum DRB. The entire cross-correlation process, including forward transform, cross multiplication and inverse transform, is completed for each trace before proceeding to the next. When all the traces have been cross-correlated, each trace appears as a signal having an amplitude that varies as a function of time. In this function, the successive amplitudes correspond somewhat to the values that the received wave would have at each geophone station if the source signal was in the form of a short pulse, all as is well understood in the art, but modified by the gain corrections, if any, that have been made.

The MUX processor then multiplexes all the resultant time-domain signals, and stores the multiplexed data in the standard 1010 format in tracks 56 to 79 and above, but without header information.

The XCOR computer section cross-correlates the chirp signal with each of the trains of received signals. This correlation is performed by means of the Cooley-Tukey algorithm as modified by Bergland. In this type algorithm, each of the original signals to be cross-correlated exists in the time domain with real components only. Each signal is transformed to the frequency domain, the resulting frequency-domain signals consisting of both real and imaginary components are vector complex conjugate multiplied by each other and then the product so formed is inversely Fourier transformed into the time domain, where the signal again exists with the real components only.

Initially, the amplitude of the original composite received signal is represented as a function of time corresponding to the amplitudes of the seismic waves successively received at any one geophone station. Similarly, in the time domain, the amplitude of the chirp signal appears as a function of time in a manner corresponding to that of the actual signal transmitted to the Vibroseis trucks. In the frequency domain, the amplitude and phase of each of the two time-domain signals is represented as a function of frequency. Products of the two sets of frequency domain signals and the sum of those products, are formed in accordance with equations (9) to (16) set forth above. The vector multiplication process is performed by use of the high-speed signed multiplier MXB in conjunction with software.

The resultant sum for each trace is then subjected to inverse Fourier transformation to produce a new signal in which the amplitude is a function of travel time. The process of retransforming to convert the cross-correlated signal to a signal in the time domain, is sometimes called synthesis. The relative amplitudes of various frequency components may be altered to perform a filtering operation before the inverse Fourier transformation takes place.

The resultant time-domain signal corresponds somewhat, as is well known, to the manner in which the amplitude of received seismic waves would vary if a narrow pulse (such as one generated by an impact or explosion), had been transmitted downwardly into the earth and had been deflected by the same structures which deflected the original chirp signals that were received and composited in the manner described above.

The XCOR program is arranged to store the time domain output for each trace on the tracks of drum DRB on which the composited data for that trace was stored prior to the correlation operation. After all cross-correlation signals have been stored on tracks 80-127 for all 24 traces, they are then subjected to the required gain changes if a yes answer was supplied in response to Stage 34 of the PREP program. To perform such post-correlation gain correction, the correlated data is transferred one trace at a time from the drum DRB to the working memory WMB, the values of the samples at various time corrected by the appropriate gain correction coefficient, and then the results are stored on the track of drum DRB for that trace. In the gain correction process, the gain multiplication factor to be applied to each sample in the window is predetermined by the PREP program and is determined by the following equation:

$$GN = GL * GE$$

where
    $GN$ = gain for the Nth sample in the window $GN$ = gain for the (N-1)th sample in the window $GE$ = the exponential constant The exponential constant (GE) is related to the decay rate (DR) set out in db/sec in Step 27 of the PREP program by the following equations:

$$GE = e^{-\alpha}$$

$$\alpha = 0.11513\ DR$$

Initially, GL is 1. After calculating the value of the gain GN to be applied to the Nth sample, the amplitude of the sample is divided by that gain value to shift it correctly and then the quotient is checked to determine whether it is within the permitted limit. If not, the limiting amount is used in place of the quotient. The initial gain GL is used for samples appearing in the signal earlier than the window. For samples appearing in the signal subsequent to the end of the window, the final computed gain value is used.

After all of the traces have been gain-corrected they are then multiplexed. In the process of multiplexing, the multiplexed signals are stored on the drum DRB commencing at track 56. Since the multiplexing process is applied to PRT1, PRT2, PRT3, and PRT4 in sequence, the multiplexed signals are read onto tracks 80-127 only after the data on those tracks has been read off the drum DRB into the working memory WMB for multiplexing.

The cross-correlation of a set of composited signals with the chirp signal for one setup and the multiplexing thereof usually takes place in the main computer section COMB concurrently with (sometimes before) the compositing of waves for a new setup in the auxiliary computer COMA.

DMX Processor

The DMX processor commences execution upon completion of the compositing of signals corresponding to a new setup.

In the best mode of practicing the invention, the DMX processor includes means to operate automatically in two principal phases or stages.

It is assumed here that the number of data segments, that is, the number stored in word 12 of the LINE TABLE is 4.

STAGE 1

In this phase, the cross-correlated signals from the previous setup are first transferred from drum DRB to static memory unit SMB, then to the static memory unit SMA of the auxiliary computer COMA and are then transferred by means of the outputting program TOUT to the magnetic tape recorder MTR. The most recently composited data stored on the drum DRA of auxiliary computer COMA is also transferred by means of the outputting program TOUT to the tape MTR. A gain table constructed in computer COMA is also transferred to computer COMB at this time.

Just prior to the transfer of each of these sets of data, information for the header is transferred to the tape MTR. More particularly, provision is made for transferring to the magnetic tape MTR old header information corresponding to the correlated signals and new header information corresponding to the composited signals.

The composited data, in multiplexed form, is also transferred to the master computer COMB at this time and is there demultiplexed. The demultiplexing operation involves rearranging and assorting the data by a special two-stage process.

In order to understand the demultiplexing operation, it is first necessary to understand how the data is arranged on drum DRA.

Composited Data Format

The manner in which data is transferred from the receiving equipment DRS and composited in compositor computer COMA and stored in the drum DRA is described in detail hereinafter. Here we are concerned only with the arrangement of the composited data on the drum DRA.

The composited information stored on drum DRA consists of up to 8,000 samples for each recorded trace, that is, for each geophone station. Each sample consists of two words of information. Since there are 24 traces and two words per sample, this represents a total record on the auxiliary drum DRA of 192,000 samples, that is, 8,000×24 samples, or 384,000 words. These samples are divided into 100 blocks of information. Each block of information is stored on a different track of drum DRA. The manner in which the composited data is stored on the auxiliary drum DRA is illustrated in FIGS. 8, 11, and 12. In this connection, it will be recalled that parity bits are included as needed but are not taken into account in this explanation.

All of the information respecting the same sample interval forms a frame of information. Thus, there are a total of 8,000 frames of information, each consisting of 24 samples or 48 words, each. There are 80 frames, or 1920 samples, or 3840 words, per block.

As indicated in FIG. 8, the first block BL1 of information is stored in track 28. The second block of information BL2 is stored in track 29, and so on, the hundredth block of information BL100 being stored on track 127. Each track is capable of storing 4,096 words of information. Since there are 3,840 words of information in each block, space remains in the track for storage of additional information.

The arrangement of the data in the respective tracks 28 to 127 of drum DRA is exemplified in FIGS. 11 and 12, where the data in the first block of information which is stored on track 28 is represented. As mentioned, each block of information consists of 80 frames of information, so that a total of 1920 (80×24) samples of information, that is, 3840 words of information, are stored in each block.

As indicated in FIG. 11, the frames of information are stored consecutively on the track with the samples corresponding to the respective geophone stations (GE1, ... GE24, being stored consecutively within each frame. Each of these samples consists of two words of information stored as illustrated in FIG. 12. Each pair of single precision words forms a 32-bit double-precision word as illustrated in FIG. 12. The first 8 bits represent the gain or characteristic that was assigned to the respective samples in the compositing operations. The next 23 bits represent the amplitude of the signal output from the binary gain amplifier BGA for the corresponding sample, and the 32nd bit represents the sign S of that sample. Thus, the 23 bits represents the mantissa and the remaining 8 bits represent the characteristic. In FIG. 12, the left position is at the top and the right position is at the bottom of each of the respective words. Except for the shift in the binary point, the mantissa is the same as the amplitude.

The words of information are numbered consecutively WDA1, WDA2, ... WDA3840 in each block. FIG. 12 represents the arrangement of data for sample 1 in the first frame FR1 of information for track 23. Thus, the words (TR23S1) corresponding to sample 1 for geophone station GE23 for that track are words WDA45 and WDA46.

Sample 1 of all 24 traces are stored consecutively in words WDA1 ... WDA48. The second sample of the 24 traces are stored in the next 48 words and so on. The last word WDA3840 is stored in the 80th frame. The last word in the first frame contains the more significant half of the 80th sample (TR24S80) for geophone station GE24. The last word of the last frame contains the more significant half of the 8000th sample (TR24S8000) for geophone station GE24.

The description presented applies if only 24 channels of information are stored. (Actually, additional channels of information are usually included, such as the channel that represents the sample times. Furthermore, the actual arrangement of bits in the various words may vary considerably from that described, all as is well known in the art.)

Starting with the information stored in drum DRA in the manner described above, the demultiplex processor DMX performs the demultiplexing operation in two stages, as described below.

The first block of data from computer COMA contains header information and a small table of gain values that has been computed in computer COMA. This block is transferred first, being stored in the static memory SMB of computer COMB.

In Stage 1 of the demultiplexing operation, two sets of 3840 words of information per trace on the drum DRA are transferred one set at a time into the static memory unit WMB of the correlation computer COMB. After storage of such a set of information in the memory unit WMB, one block of 80 frames of information at a time is demultiplexed, or unscrambled, and transferred to the correlation drum DRB. This partial demultiplexing process is continued block by block and set by set until the limit of blocks to be transferred, as specified by the LINE TABLE, has been reached. We assume here, for convenience of explanation, that the limit has its maximum value of 100 blocks of 3840 words each.

As each block of words is unscrambled and transferred to the correlation drum DRB, the multiplexed data in each block is demultiplexed so that the first 80 samples of the first trace are stored together, the first 80 samples of the second trace are stored together, and so on, on the drum DRB. By way of example, data is arranged as illustrated in FIG. 13 for the samples from block 1. These samples are stored on

TABLE V

| BLOCK | SAMPLES | START TRK. | START SECT. | FINISH TRK. | FINISH SECT. |
|---|---|---|---|---|---|
| 1 | 1–80 | 56 | 170 | 57 | 33 |
| 2 | 81–160 | 57 | 180 | 58 | 43 |
| 3 | 161–240 | 58 | 190 | 59 | 53 |
| 4 | 241–320 | 59 | 200 | 60 | 63 |
| 5 | 321–400 | 60 | 210 | 61 | 73 |
| 6 | 401–480 | 61 | 220 | 62 | 83 |
| 7 | 481–560 | 62 | 230 | 63 | 93 |
| 8 | 561–640 | 63 | 240 | 64 | 103 |
| 9 | 641–720 | 64 | 250 | 65 | 113 |
| 10 | 721–800 | 56 | 50 | 56 | 169 |
| 11 | 801–880 | 57 | 60 | 57 | 179 |
| 12 | 881–960 | 58 | 70 | 58 | 189 |
| 13 | 961–1040 | 59 | 80 | 59 | 199 |
| 14 | 1041–1120 | 60 | 90 | 60 | 209 |
| 15 | 1121–1200 | 61 | 100 | 61 | 219 |
| 16 | 1201–1280 | 62 | 110 | 62 | 229 |
| 17 | 1281–1360 | 63 | 120 | 63 | 239 |
| 18 | 1361–1440 | 64 | 130 | 64 | 249 |
| 19 | 1441–1520 | 65 | 140 | 66 | 3 |
| 20 | 1521–1600 | 66 | 150 | 67 | 13 |
| 21 | 1601–1680 | 67 | 160 | 68 | 23 |
| 22 | 1681–1760 | 68 | 170 | 69 | 33 |
| 23 | 1761–1840 | 69 | 180 | 70 | 43 |
| 24 | 1841–1920 | 70 | 190 | 71 | 53 |
| 25 | 1921–2000 | 71 | 200 | 72 | 63 |
| 26 | 2001–2080 | 72 | 210 | 73 | 73 |
| 27 | 2081–2160 | 73 | 220 | 74 | 83 |
| 28 | 2161–2240 | 74 | 230 | 75 | 93 |
| 29 | 2241–2320 | 75 | 240 | 76 | 103 |
| 30 | 2321–2400 | 76 | 250 | 77 | 113 |
| 31 | 2401–2480 | 66 | 4 | 66 | 123 |
| 32 | 2481–2560 | 67 | 14 | 67 | 133 |
| 33 | 2561–2640 | 68 | 24 | 68 | 143 |
| 34 | 2641–2720 | 69 | 34 | 69 | 153 |
| 35 | 2721–2800 | 70 | 44 | 70 | 163 |
| 36 | 2801–2880 | 71 | 54 | 71 | 173 |
| 37 | 2881–2960 | 72 | 64 | 72 | 183 |
| 38 | 2961–3040 | 73 | 74 | 73 | 193 |
| 39 | 3041–3120 | 74 | 84 | 74 | 203 |
| 40 | 3121–3200 | 75 | 94 | 75 | 213 |
| 41 | 3201–3280 | 76 | 104 | 76 | 223 |
| 42 | 3281–3360 | 77 | 114 | 77 | 233 |
| 43 | 3361–3440 | 78 | 124 | 78 | 243 |
| 44 | 3441–3520 | 79 | 134 | 79 | 253 |
| 45 | 3521–3600 | 80 | 144 | 81 | 7 |
| 46 | 3601–3680 | 81 | 154 | 82 | 17 |
| 47 | 3681–3760 | 82 | 164 | 83 | 27 |
| 48 | 3761–3840 | 83 | 174 | 84 | 37 |
| 49 | 3841–3920 | 84 | 184 | 85 | 47 |
| 50 | 3921–4000 | 85 | 194 | 86 | 57 |
| 51 | 4001–4080 | 86 | 204 | 87 | 67 |
| 52 | 4081–4160 | 87 | 214 | 88 | 77 |
| 53 | 4161–4240 | 88 | 224 | 89 | 87 |
| 54 | 4241–4320 | 89 | 234 | 90 | 97 |
| 55 | 4321–4400 | 90 | 244 | 91 | 107 |
| 56 | 4401–4480 | 91 | 254 | 92 | 117 |
| 57 | 4481–4560 | 78 | 0 | 78 | 119 |
| 58 | 4561–4640 | 79 | 10 | 79 | 129 |
| 59 | 4641–4720 | 80 | 20 | 80 | 139 |
| 60 | 4721–4800 | 81 | 30 | 81 | 149 |
| 61 | 4801–4880 | 82 | 40 | 82 | 159 |
| 62 | 4881–4960 | 83 | 50 | 83 | 169 |
| 63 | 4961–5040 | 84 | 60 | 84 | 179 |
| 64 | 5041–5120 | 85 | 70 | 85 | 189 |
| 65 | 5121–5200 | 86 | 80 | 86 | 199 |
| 66 | 5201–5280 | 87 | 90 | 87 | 209 |
| 67 | 5281–5360 | 88 | 100 | 88 | 219 |
| 68 | 5361–5440 | 89 | 110 | 89 | 229 |
| 69 | 5441–5520 | 90 | 120 | 90 | 239 |
| 70 | 5521–5600 | 91 | 130 | 91 | 249 |
| 71 | 5601–5680 | 92 | 140 | 93 | 3 |
| 72 | 5681–5760 | 93 | 150 | 94 | 13 |
| 73 | 5761–5840 | 94 | 160 | 95 | 23 |
| 74 | 5841–5920 | 95 | 170 | 96 | 33 |
| 75 | 5921–6000 | 96 | 180 | 97 | 43 |
| 76 | 6001–6080 | 97 | 190 | 98 | 53 |
| 77 | 6081–6160 | 98 | 200 | 99 | 63 |
| 78 | 6161–6240 | 99 | 210 | 100 | 73 |
| 79 | 6241–6320 | 100 | 220 | 101 | 83 |
| 80 | 6321–6400 | 101 | 230 | 102 | 93 |
| 81 | 6401–6480 | 102 | 240 | 103 | 103 |
| 82 | 6481–6560 | 103 | 250 | 104 | 113 |
| 83 | 6561–6640 | 93 | 4 | 93 | 123 |
| 84 | 6641–6720 | 94 | 14 | 94 | 133 |
| 85 | 6721–6800 | 95 | 24 | 95 | 143 |
| 86 | 6801–6880 | 96 | 34 | 96 | 153 |
| 87 | 6881–6960 | 97 | 44 | 97 | 163 |
| 88 | 6961–7040 | 98 | 54 | 98 | 173 |
| 89 | 7041–7120 | 99 | 64 | 99 | 183 |
| 90 | 7121–7200 | 100 | 74 | 100 | 193 |
| 91 | 7201–7280 | 101 | 84 | 101 | 203 |
| 92 | 7281–7360 | 102 | 94 | 102 | 213 |
| 93 | 7361–7440 | 103 | 104 | 103 | 223 |
| 94 | 7441–7520 | 104 | 114 | 104 | 233 |
| 95 | 7521–7600 | 105 | 0 | 105 | 115 |
| 96 | 7601–7680 | 106 | 10 | 106 | 125 |
| 97 | 7681–7760 | 107 | 20 | 107 | 135 |
| 98 | 7761–7840 | 108 | 30 | 108 | 145 |
| 99 | 7841–7920 | 109 | 40 | 109 | 155 |
| 100 | 7921–8000 | 110 | 50 | 110 | 165 |
| 101 | 8001–8080 | 111 | 60 | 111 | 175 |
| 102 | 8081–8160 | 112 | 70 | 112 | 185 |
| 103 | 8161–8240 | 113 | 80 | 113 | 195 | tracks 56 and 57 of the correlation drum DRB. Referring to FIG. 13, it is to be noted that data TR1SA1, ... TR1SA80, ... are stored in 80 sequential positions and so on, trace by trace, until the data TR24SA1 and TR24SA80 are stored. The symbol TRB is indicated in FIG. 13 to designate a section where there is a break in the recording of data between track 56 and track 57.

Thus, the first 80 samples for trace 1 appear in order. And they are followed by the first 80 samples of trace 2, etc.

But samples 81–160 for traces 1–24 are recorded for consecutive traces beginning at track 57, sector 180 up to track 58, sector 43. The second 80 samples for trace 1 appear in order. They are followed by the second 80 samples of trace 2, etc. Thus, samples 1–80 and samples 81–160 of each trace are not recorded consecutively but are spaced apart. Similar remarks apply to other successive sets of 80 samples. In fact, successive groups of 80 samples of each trace are stored on different tracks.

The manner in which the data for the various tracks of drum DRA are interlaced on the tracks of drum DRB after partial demultiplexing, as illustrated in Table V as described above, is represented in FIG. 14.

More particularly, the multiplexed data previously stored on the auxiliary drum DRA in tracks 28-52 are copied into the working memory WMB of the main computer and from there the values of the samples 1-2000 are transferred to the main drum DRB. Similarly, the multiplexed data previously stored on the auxiliary drum DRA in tracks 63-77 are copied into the working memory WMB of the main computer and from there the values of the samples 2001 to 4000 are transferred to the main drum DRB. Likewise, the multiplexed data previously stored on the auxiliary drum DRA in tracks 78-103 are copied into the working memory WMB of the main computer and from there the values of the samples 4001-6000 are transferred to the main drum DRB. And similarly, the multiplexed data previously stored on the auxiliary drum DRA in tracks 104-127 are copied into the working memory WMB of the main computer and from there the values of the samples 6001-8000 are transferred to the main drum DRB. As previously explained, the data are stored on the main drum DRB in signed integer form in groups of 80 consecutive samples per trace in each block.

More particularly, in the process of transferring the data from the memory unit WMB to the drum DRB, the samples are converted from double-precision floating point form to single-precision signed integer form. At the same time, if a yes answer was supplied in response to Step 26 of PREP the data are manipulated in accordance with the decay compensation factor to increase the magnitudes of successive samples by the compensation factor in question in the course of transfer to drum DRB.

In converting the amplitudes of samples from double-precision floating point form to single-precision integer form, the gain code is extracted from each sample, subtracted from the maximum gain GMAX established for the corresponding trace and the corresponding integer value is calculated. This integer number, together with the sign S, is stored in an appropriate word location in the drum DRB.

It is to be noted that there is an excess of three blocks in Table V and in FIG. 14. In the subsequent description, it will be assumed that data has been stored in these three blocks, though, in fact, they will be empty, or filled with data corresponding to signals of 0 amplitude, if the seismic signals have been recorded as described with a maximum of 8000 samples.

The diagram in FIG. 14 constitutes a developed view of the circular cylindrical surface of the drum DRB showing how the data sectors from 0 to 225 are distributed along the circumference of each track. The various parts of the track pass beneath the corresponding head in a direction such that the sectors pass the head in numerical order from 0 to 255. About half the blocks of data are divided between two tracks of drum DRB. Thus, the data from track 28 of drum DRA is divided between tracks 56 and 57 being designated by the symbol BL1. On the other hand, about half the blocks of information are stored on a single track. Thus, for example, the entire block of data BL22 is stored on track 67. Where a block of data is divided between two tracks, the first part of the data is stored on the track of lower number and the remainder is stored on the track of higher number.

It is to be noted that almost all the sectors of all the tracks from track 56 to track 104 inclusive are almost completely filled with data, whereas the sectors of tracks 105 to 113 are only about half filled. It is also to be noted that at the end of Stage 1 the data are stored on a limited number of tracks, namely, tracks 56-113 inclusive. This is a total of 58 tracks. 14 tracks of drum DRB are empty at the end of Stage 1.

STAGE 2

The samples that have been stored in a partially demultiplexed, still somewhat scrambled, form as described hereinabove by the partial demultiplexing process of Stage 1, are now further unscrambled by the DMX computer section.

In Stage 1, the data were divided into 100 different blocks on drum DRB. In Stage 2, the data are rearranged into four segments of parts. In the second stage of demultiplexing, the data are treated as if there were a total of 8192 samples per trace, that is, 8192 groups of 80 words each, plus a small residue or excess. The last 192 samples have a 0 value. For this reason, the program operates to store 0's in all bits of the words above 8,000. This is done solely to simplify the cross-correlation process. The process could be carried out by storing only 2,000 samples in each part and the cross-correlation process carried out on the basis of 2,000 samples instead of 2048 samples per segment, if desired. The unscrambling process of Stage 2 is conducted in descending sequence, beginning with the last of the traces, and the data are stored on the main drum DRB beginning with the track of highest number. In this connection it is to be noted first that the samples in the four parts are to possess the sample numbers and block numbers indicated in Table VI.

TABLE VI

| Part | Samples | Blocks |
|------|---------|--------|
| 1 | 1-2048 | 1 to 30+ |
| 2 | 2049-4096 | 30+ to 51+ |
| 3 | 4097-6144 | 51+ to 76+ |
| 4 | 6145-8192 | 76+ to 103 |

The DMX computer section is programmed to pick up the four parts or the samples in reverse order and then to store the samples of each part on the drum in reverse sequence in demultiplexed form.

At this point, it will be recalled that the data are stored on the drum in the form of 8,000 groups of information in 100 blocks with 80 words in each group. The 100 blocks of data have been partially demultiplexed forming groups of 80 words representing 80 successive samples of the same trace. Each group of 80 words represents data frome the same trace but the groups of 80 words for the same trace are not contiguous but are scattered systematically over the drum.

The second stage of demultiplexing is carried out in four steps corresponding to the four parts, in reverse order.

STEP 1

More particularly, part 4 of the data is copied into the working memory WMB trace by trace in accordance with the following series of programmed instructions:
Read 6 tracks starting at sector 59 of track 99
Read 12 tracks starting at sector 119 of track 93
Read 9 tracks starting at sector 115 of track 105

In reading the data for trace 24 from part 1, reading is started at sector 49 of track 99. As soon as 80 words of trace 24 have been transferred to the working memory WMB reading is transferred to track 100 commencing with sector 69. The next 80 words of trace 24 are read from this track starting at sector 79. The process of moving from track to track and incrementing the sector number by 10 is continued for six tracks. Then the reading operation is transferred to track 93, sector 119, and the process of reading 80 words corresponding to trace 24 is continued, advancing from track to track and to appropriate sectors until 2048 words corresponding to trace 24 have been transferred to the working memory. As each group of 80 words is read, it is stored in the working memory WMB in sample number or time sequence. These data are then transferred to the part of the drum allocated for storage of trace 24 data of part 4. This area is in track 127 as illustrated in FIG. 7.

The reading process for trace 23 is then performed. This is accomplished by returning to track 99 and reading the first 80 words commencing at sector 54. The same sequence of changing track numbers and sector numbers are described above is continued. Each time a new trace number is initiated, the starting sector number is decreased by 5. At any time that a sector number calculated by decrementing by 5 becomes negative, the track number from which the reading is commenced is reduced by 1 and the sector number is increased to the highest sector number of the last to be read block of the preceding starting track. For example, after reading sector 4 from track 90, the program starts next at sector 255 of track 88.

Thus, the data for the fourth part of all traces are stored in the second half of tracks 104–127 in reverse sequence. Stated differently, the fourth part of the data for the traces 24-1 are stored in reverse sequence in the second halves of respective tracks 127–104. By the time that the storage of this information is completed, data previously stored in the last of the required locations for this step will already have been subjected to the unscrambling process of Stage 2.

It is to be noted that in the foregoing reading process, a total of 2048 words were read. This results in splitting the 76th block of the original data. Account is taken of this end-effect fact and facts of this same kind represented in Table VI and in the programmed instructions to provide that the first half of the data for trace 1 is recorded on track 80 in sequence, and the second half is recorded on track 104 in sequence, leaving 192 words with 0's stored in them at the end of track 104. Similarly, the data for trace 2 are stored in tracks 81 and 105 with 192 words with 0's stored in them in the last 192 words of track 105, and so on.

The 0's at the end are indicated by the 00 at the end of part 4 in FIG. 7.

STEP 2

Part 3 of the partially demultiplexed data is then copied into the working memory WMB trace by trace in accordance with the following series of programmed instructions:

Read 5 tracks starting at sector 73 of track 88
Read 20 tracks starting at sector 105 of track 78

The data for the third track are stored trace by trace in the first half of tracks 104–127 in reverse sequence. Thus, the third part of the data for the traces 24-1 are stored in reverse sequence in the first half of the respective tracks 127–104. Again, by the time that the storage of this information is completed, data previously stored in those locations will already have been subjected to the unscrambling process. These data form the third part PRT3 of the data.

STEP 3

Part 2 of the partially demultiplexed data are then copied into the working memory WMB in accordance with the following series of programmed instructions:

Read 5 tracks starting at sector 69 of track 73
Read 21 tracks starting at sector 119 of track 66

Thus, a total of 26 tracks are copied into the working memory WMB.

The data for the second part are then stored trace by trace in the second half of tracks 80–103 in reverse sequence. Thus, the second part of the data for the traces 24-1 are stored in reverse sequence in the second halves of the respective tracks 103-80. Again, by the time that the storage of this information occurs, data previously stored in those locations will already have been subjected to the unscrambling process. These data form the second part PRT2 of the data.

STEP 4

Finally, part 1 of the partially demultiplexed data is copied into the working memory WMB in accordance with the following series of programmed instructions:

Read 9 tracks starting at sector 29 of track 57
Read 16 tracks starting at sector 165 of track 56

The data for the first part are then stored trace by trace in the first half of tracks 80–103 in reverse sequence. Thus, the first part of the data for the traces 24-1 are stored in reverse sequence in the first halves of the respective tracks 103-80. Again, by the time that the storage of this information occurs, data previously stored in those locations will already have been subjected to the unscrambling process. These data form the first part PRT1 of the data.

It is to be noted that because of the arrangement of the data on the drum at the end of Stage 1, very little time is lost between the completion of the reading of data on one track to the commencement of the reading of data on the next track. This is because of the echelon or interlaced arrangement of the data on the tracks.

It will be understood, of course, that the tracks need not be arranged in the numerical sequence in which they appear in Table V and in FIG. 14. When the numbers that identify the tracks are rearranged, the echelon appearance will no longer apply. But the new arrangement is equivalent to the former. Both may be called echelon-like or interlaced. The main feature of this type of programming involves the fact that when a group of data is read from one track, the drum usually need rotate through only a small angle before the next group of data is read from another track.

It is to be noted in Table V that the number of blocks is not an exact multiple of 4 and hence, the overlap relation between the block numbers and the part numbers must be taken into account. This has been done by reading into memory more than 2048 samples of data in the first three steps and reading the balance in the fourth step. In transferring data back to the drum in each step to form a completely deformatted record, excess material that has been stored in memory in the first three steps are transferred to drum in the latter three steps.

In the demultiplexing operation, account is also taken of the fact that there are only 1920 samples per track on drum DRA whereas there are 2048 samples in each part of a track on drum DRB. The program is written in accordance with principles well known to those skilled in the art for accommodating such differences.

As a result of this operation, the data are arranged on the drum DRB in four parts, as indicated in FIG. 7. Each part has a length of 2048 words. Parts 1 and 2, namely PRT1 and PRT2, of the data follow each other on the same tracks, with data for traces 1-24 being recorded in tracks 80-103 respectively. And parts 3 and 4, namely PRT3 and PRT4, of the data also follow each other on the same tracks, with data for traces 1-24 being recorded in tracks 104-127 respectively. Parts 1 and 3 appear on the first halves of the respective tracks and parts 2 and 4 appear on the second halves of the tracks. Thus, for example, the samples of the fours parts of the data for trace 1 are recorded consecutively on the parts PRT1, PRT2 of track 80 and on parts PRT3 and PRT4 of track 104 of the drum DRB. Similar remarks apply to the data for other traces on their respective pairs of tracks.

The reason for demultiplexing the multiplexed composited data in two stages and in four parts and for utilizing interlacing in the partial demultiplexing operation, is to make it possible to utilize a relatively small static memory for manipulation for a large number of samples within the large storage capacity of the drums DRA and DRB without, however, introducing unnecessary loss of time between the completion of the compositing process for one setup and the initiation of the transmission of chirp signals for the next setup. Use is also made of the division of the data into four parts in the cross-correlation process described.

XCOR Computer Section

The XCOR computer section includes a program stored in tracks 12 and 13 of the main drum DRB for performing the operation of cross-correlation of the sweep signal with each of the composite traces that have been separately stored on respective pairs of tracks on master drum DRB.

The XCOR computer section carries out the augmentation of the signals, the conversion of sections of the signals to their Fourier transforms, the vector multiplication of the Fourier transforms, the summing of the products, and the inverse transformation steps described hereinabove. This process is carried out, trace by trace, thereby producing a set of sample signals representing an impulse-type trace corresponding to each geophone station.

For purposes of explanation, we will assume first that the composite traces are not divided into sections and that the chirp excitation signal is also not divided into sections. This would easily be the case with the apparatus described if the duration of each of these signals was 8 seconds with four ms intervals between successive samples.

In such a case, the Fourier transform of the augmented chirp excitation signal will have been computed in the computer section VTRN and stored on track 51 of the master drum DRB. Also, in such a case, the composite signals representing the traces corresponding to the respective geophone stations will have been stored in the first part PRT1 of tracks 80 . . . 103. The second part PRT2 of tracks 80 . . . 103, and all of tracks 104 . . . 127 will be empty or just not used in the computations.

As illustrated in FIG. 15, the XCOR computer section includes four (4) subsections, namely, first, a trace commutator DO that selects one trace at a time for processing; second, a transformer section XST that converts a composite trace into its Fourier transform; third, a multiplier subsection XX which vector multiplies the transform of the composite trace with the complex conjugate of the transform of the sweep signal; and fourth, an inverse transformer IFT that converts the product into an impulse-type trace.

A Fourier transformer XCT that is part of the VTRN computer section is employed to convert the sweep signal into its Fourier transform and stores the complex conjugate thereof for future use in performing the correlation process with each of the traces. In fact, the Fourier transformer XCT is the same as Fourier transformer XST. It is first used as part of the computer section VTRN to transform the chirp signal. It is then later used as part of the XCOR computer section to convert a trace signal into its Fourier transform and to store it temporarily.

The commutator DO is employed to transfer the samples of data of each trace from the drum DRB into the cross-correlator XCOR one at a time. When this occurs, the Fourier transform of the trace is formed. The two Fourier transforms of the trace signal and the chirp signal are then multiplied together in the multiplier section XX and the complex product is stored. The product is then retransformed by the inverse Fourier transformer IFT so as to produce an impulse-type correlated wave of the trace. After such processing is completed for each trace, the resultant impulse-type record is stored on the same track of the drum DRB whence the corresponding composite trace data came. For convenience, the drum DRB has been shown in solid lines on the left to represent the drum in its pre-correlation state, and in dotted lines on the right to represent the drum in its post-correlation state, in FIG. 15. This process is repeated trace by trace so as to produce a multiple trace impulse-type record of the received signal on the drum. The impulse-type data for the 24 traces are thus stored in the first half of the 24 tracks 80 . . . 103 as a series of samples in single-precision integer mode.

The resultant data is then multiplexed and stored on the drum DRB in tracks beginning at tracks 56.

Where, as is often the case, the demultiplexed data is divided into four parts corresponding to four successive time segments of the received signals and the chirp signal is also divided into four successive parts corresponding to those time segments, the XCOR computer section is constructed to take this fact into account in a manner such as that illustrated in FIG. 16. In the particular example being considered, it is assumed that both the chirp signal and the received signals have a duration of 32 sections and that the signals are in the form of sample signals occurring at intervals of four milliseconds.

In this case, the XCOR computer section includes five main subsections, namely, first, a controller CTLR; second, a transformer subsection XST; third, a complex multiplier XX; fourth, an accumulator AC; and fifth, an inverse Fourier transformer IFT. The XCOR computer section also comprises buffer sections BFS and BFC of the double buffer type for transferring chirp signal information and composite signal information from the drum for temporary storage in the cross-correlation section XCOR for cross-correlation processing.

In addition, in the cross-correlation process, extensive use is made of the drum DRB shown in dotted lines for storage of data before, during, and after cross-correlation.

In this case, the controller CTLR proceeds to process all 24 traces, one at a time. In this process, the controller selects paired parts of the composite record of each trace for processing. The controller also selects sections of the Fourier transform of augmented segments of the chirp signal for cross-correlating with various pairs of composite traces. In addition, the controller transfers the products for temporary storage on the drum DRB and then returns them to the accumulator AC for summing of appropriate products and then inversely Fourier transforms such sums and then stores the results as output segments for various traces on the drum.

In this particular illustration, the controller CTLR is employed for processing the samples of the data, one trace at a time, to produce appropriate Fourier transforms and to vector multiply them with the conjugates of the Fourier transforms related to parts of the sweep signal, and to perform the appropriate summing operations in accordance with equations (9) to (16), as set forth above, and then to construct and store the impulse-type traces by inverse Fourier transform and the needed summing operations.

Preliminarily, it is to be pointed out that all segments of the chirp signal are of equal length and that each of the chirp-signal segments has been augmented by an empty signal of equal length and the Fourier transform of each such augmented segment of the sweep signal has been calculated and stored on tracks 51, 52, 53, and 54 respectively. The Fourier transforms of the augmented segments of the chirp signal FTC1, FTC2, FTC3, and FTC4 are shown in FIG. 16. The controller CTLR operates to transfer each of these Fourier transforms to the buffer unit BFC for processing as needed.

The controller also operates to transfer composite trace signals to the cross-correlator section XCOR one trace at a time. In the operation, data representing a pair of successive sections of the composite signals are transferred one pair at a time to the buffer unit BFS. In this operation, account is taken of the fact that the signal to be processed is a composite signal that has been augmented by a zero or empty signal having the same length as each of the segments.

Consider first the operation for the first trace TR1.

When the data for each pair of composite-signal segments has been transferred to the buffer unit BFS, they are then fed to the Fourier transformer XST to produce a corresponding Fourier transform FTS thereof. This Fourier transform FTS is then vector multiplied in the multiplier XX by the Fourier transforms FTC of the chirp signal as required by equations (9) to (15). The vector product so formed is stored temporarily on the drum DRB. The process is then repeated for the next pair of segments of the composite signal for the same trace over and over until all of the multiplications have been performed for all the pairs of segments of the augmented composite signal.

While the multiplication process is being performed for one pair of segments of a trace, the data representing the next pair of segments is transferred into the buffer unit BFS. Similar remarks apply to the Fourier transforms FTC of the chirp signal and the buffer BFC.

It is not necessary to create a separate empty signal the length of a segment and store it on the drum prior to transfer, since it is such an easy matter to program the computer to create the empty signal in the buffer BFS at the time that the fourth part PRT4 of the composited trace is transferred to the buffer storage BFS.

At the completion of the process, data is stored on the drum corresponding to the seven respective products represented by equations (9) to (15) for one trace.

The complex odd-number products, P1, P3, P5, and P7, are then transferred one at a time into the accumulator AC where they are all added together to produce a complex subproduct transform $$FTP1 = P1 + P3 + P5 + P7$$

In this addition process, the real parts of each sample are added together and so also are the imaginary parts, thus producing a complex value for each sampled frequency.

This sub-product transform is then subjected to inverse Fourier transformation in the inverse transformer IFT. The result of this inverse Fourier transformation is in the form of a signal having two parts. The first part represents the first segment of the pulse-type signal. The second part contains unusable information. Both parts are of the same length. The first part, which corresponds to the first segment of the pulse-type segment, is then stored on the drum in a corresponding position for the trace in question.

This process is then repeated for the even number products, P2, P4, and P6. When they are added in the accumulator AC they produce a second sub-product transform $$FTP2 = P2 + P4 + P6$$

This sub-product transform is likewise subjected to inverse Fourier transformation in the inverse transformer IFT. The result of this inverse Fourier transformation is also in the form of a signal having two parts. The first part represents the second segment of the pulse-type signal. The second part contains unusable information. Both parts are of the same length. The first part, which corresponds to the second segment of the pulse-type segment, is then stored on the drum in the corresponding position for the trace in question.

The two segments of the pulse-type trace for the first trace TR1 are stored consecutively as an output segment OST1 which is stored on the drum DRB on a track corresponding to trace 1.

The process is then repeated for trace 2 and then for trace 3 and so on, until all the output pulse-type records OST1, OST2, . . . OST24 have been calculated and then stored on tracks corresponding to the respective traces TR1, TR2, . . . TR24.

The time domain cross-correlation results are thus calculated for each of the 24 traces, TR1, TR2, . . . TR24, one at a time, and stored on the drum DRB.

In this process, precautions are taken not to destroy information on the drum until after that information has been used in the cross-correlation process.

It will be recalled that the inverse transforms of the sub-product transforms correspond to a time interval of 8 sec each and that two of these are produced. When the appropriate inverse transform has been completed, the result is accordingly stored in parts 1 and 2 of the corresponding trace on the drum DRB. Thus, the output cross-correlated trace OST1 corresponding to trace 1 is stored on track 80, then the controller operates to process the composite data trace TR2 and the resultant output OST2 is stored on track 81 and so on. Thus, the time domain cross-correlated outputs OST1, OST2, . . . OST24, that are generated by the XCOR computer section are stored on tracks 80, 81, . . . 103 of the drum DRB.

The number of samples representing each trace is equal to the output time specified in Step 8 divided by the sample interval time. Thus, if the output time is 16,000 and the sample interval is 4 ms, the number of samples in each of the correlated output traces is 4,000.

The cross-correlation operation proceeds each time a set of composited signals has been subjected to the demultiplexing operation of the demultiplexing computer section DMX as previously described. Thus, the cross-correlation operation is performed automatically under three different sets of conditions, namely, 1. When the number of chirps performing a complete composited set of signals for a setup have been transmitted and the resultant seismic waves that are to be recorded have been received and processed by computer COMA, in accordance with Step 11 of the PREP program, and
2. Whenever a set of composited signals have been completed in accordance with the instructions in Step 13 of the PREP program, and
3. Whenever compositing has been deliberately interrupted by the operator to complete recording for a setup prior to the normally expected time determined by Steps 11 or 13 of the PREP program. In any of these cases, the system proceeds automatically, unless interrupted by operation of an appropriate sense switch on the control panels CPA or CPB, to display the cross-correlated signals on the multiple trace recorder MTRC. This display is achieved through the operation of the TOUT processor computer section.

FRAN Computer Section

The FRAN computer section is employed to calculate the power spectrum of the received signal. The program employed in this section is of a conventional type for determining the distribution of energy in the signal as a function of frequency. This program may be employed, for example, to analyze the correlated signals to determine the spectrum of the received waves in order to be certain that the parameters that have been employed in creating the sweep excitation signal are suitable for producing relatively strong reflections from subsurface structures over a particular depth range. In this case, program switch SWB6 on the control panel CPB are manipulated to activate the FRAN program upon completion of the XCOR program, and to automatically print out the results on the typewriter TTY. These results are typed in tabular form with frequency in the left column and amplitude in the right column. Alternatively, a graphical display may be employed to represent the spectrum. In the table or display, the amplitude of the various frequency components of the received signals is "plotted" as a function frequency.

In this multiplexing operation, sample 1 of all the traces are stored on the drum DRB consecutively, then sample 2 from all the traces are so stored, etc. In the multiplexing operation, the data are stored in a single-precision format on the drum DRB beginning at track 56, as previously mentioned.

The multiplexing operation proceeds immediately upon completion of the cross-correlation and gain correction operation for a setup, and thus, if not completed before a chirp signal is transmitted for the next setup, proceeds while the seismic signals corresponding to the new chirp are being received and composited by the system.

TPOT Computer Section

The TPOT computer section is programmed to display on the teletypewriter material that is stored on the drum DRB. Data representing any part of the traces may be displayed as they existed prior to correlation or after correlation. The display may be limited to any selected travel time interval.

Alternatively, the display may be by a specific number of words, commencing at any sector on any track.

When the TPOT program is called by manipulation of switch SWB on the main control panel CPB, the TPOT computer section immediately interrogates the operator through the typewriter TTY in order to obtain information to perform the required functions.

Such interrogation proceeds as follows:

Step 1. MODE?, 1=BEFORE CORRELATION, 2=AFTER CORRELATION, 3=TRACK AND SECTOR

If a 1 is typed in, the selected parts of the multiplexed traces will be reproduced as they appear on compositor drum DRA.

If a 2 is typed in, the selected parts of the traces will be reproduced as they appear on correlator drum DRB.

If a 1 or 2 has been typed in, the program proceeds to Step 2.

But if a 3 is typed in, the program skips to Step 6.

Step 2. FIRST TRACE

In reply, the number of the first trace to be displayed is typed.

The program then proceeds to Step 3.

Step 3. NUMBER OF TRACES

In reply, a number between 1–24 inclusive is typed in. The program then proceeds to Step 4.

Step 4. START TIME

In reply, the operator types in any number less the number of milliseconds less than the input time, if a 1 was typed in response to Step 1, but less than the output time if a 2 was typed in response to Step 1.

The program proceeds to Step 5.

Step 5. END TIME

In this case, the operator supplies an end time which is within either the input length if a 1 was typed in response to Step 1, or is within output time if a 2 was typed in response to Step 1.

The program then proceeds to type the required output on the typewriter and then skips to Step 10.

If the number of traces specified in Step 3 carries the typing beyond trace 26, then when Step 3 is completed, the process wraps around as if traces 1, 2, etc. occurred consecutively after trace 24.

Step 6. HEXADECIMAL?, 1, IF YES

If a 1 is typed in, the printout is in hexadecimal numbers. If a 0 is typed in, the printout is in decimal numbers.

Conversion of the binary signals previously stored on the drum into decimal or hexadecimal numbers are accomplished by appropriate subsections of the TPOT computer section at the time the output is typed.

The program then proceeds to Step 7.

Step 7. STARTING TRACK

In response to this inquiry, the observer types in a digit from 0 to 127. If it is a trace track that is to be printed out, he types in a number greater than or equal to 28, but less than or equal to 127.

The program then proceeds to Step 8.

Step 8. STARTING SECTOR

In response to this inquiry, the observer types in a number from 0 to 255. This designates the sector on the starting track from which information is to be typed.

The program then proceeds to Step 9.

Step 9. NUM. WORDS

In response to this inquiry, the observer types in any integer from 1 to 1024 if the display is not to be in the timed mode.

Upon completion of Step 9, the typewriter then proceeds to display the required material on the typewriter. After the display is completed, the computer proceeds to the next step.

In all cases, in order to save time, the program includes means for reading one frame of information at a time into the working memory WMB while information in a frame previously read in is being demultiplexed and displayed on the typewriter.

Step 10. MORE?, 1=YES

The purpose of this inquiry is to ascertain whether another printout is desired. If so, the observer types in 1, otherwise a 0.

If a 0 has been typed in in Step 10, the operation of the TPOT program terminates, readying the computer for the next operation. But if a 1 was typed in, the TPOT computer section restarts a set of inquiries at Step 1.

The operation of this program may be repeated as many times as desired for different parameters set in the observer's response to the foregoing inquiries.

COMPOSITOR COMPUTER

The general construction of the auxiliary or compositor computer has been described above. Consideration will now be given to the manner in which it is arranged and operated to generate seismic wave signals and to composite the received seismic wave signals and to feed the composited signals to the main computer COMB and to the output system, including the magnetic tape MTR of the output recorder OPTR.

IPLA Computer Section

The IPLA computer section is located in the stationary memory unit SMA of the auxiliary or compositor computer. It is also stored in track 0 of the drum DRA. This particular program is the first to be fed into the system. It is used to aid in routing of programs from the tape reader TPR or from the control panel CPA to various parts of the two computers COMA and COMB. To accomplish these functions, the IPLA computer section responds to various switches on the control panels CPA and to signals at the header end of each of the programs being fed in.

MONA Computer Section

The MONA computer secton is programmed to control the execution of the remaining sections of the compositor computer COMA. This computer section is stored in the memory unit SMA. It is also stored on track 0 of drum DRA.

SYSA Computer Section

The SYSA computer section is similar to the SYSB computer section of the computer COMB. It is employed for controlling some of the operations of the compositor computer COMA. The program of the SYSA computer section is also duplicated on track 1 of drum DRA.

SWEP Computer Section

A program, SWEP, is stored in tracks 6 and 7 in order to perform the operations of the PREP program whenever only computer COMA is available. The SWEP program is similar to that of the PREP program, but takes into account the fact that only one computer is available. This involves storing all of the needed information on the auxiliary drum DRA other than that which will be used for cross-correlation purposes if the main computer were available. Thus, the SWEP computer section is programmed to present all of the same questions as that described hereinabove in connection with the operation of the PREP computer section except for Steps 26, 27, 33, and 34.

SGEN Computer Section

Tracks 2 and 3 are programmed to generate a chirp excitation signal in accordance with parameters supplied by the SWEP program in the event that only the auxiliary computer COMA is available. In that case, this computer section is programmed to generate and store the sweep excitation signal directly in certain parts of tracks 28–127 of drum DRA as hereinafter described. These are the same sections to which the sweep excitation signal generated in the main computer COMB are transferred when a second computer COMB is available. The SGEN computer section includes a subsection that operates automatically to perform this transfer operation of the chirp signal from the main computer COMB when that computer is available.

Thus, the SGEN computer section is programmed either to generate the sweep excitation signal and to transfer it to the required part of the auxiliary drum DRA if a main computer COMB is not available, or to transfer to the same portion of the drum DRA the sweep excitation signal generated in the main computer COMB if one is available. A main computer COMB is deemed available for this purpose only if connected into the system for operation.

AUXILIARY RECORD STORAGE

To facilitate the description of the construction and operation of the auxiliary computer, it is convenient to describe the auxiliary record area which is located on the auxiliary drum DRA. The sweep signal is stored on certain zones of this drum. So also are the composited records at various stages of compositing, as previously described.

For convenience of explanation, assume that the drum DRA is cut on one side along its length and is laid out flat as represented in FIG. 8.

The map of the storage area has an axial length on the drum extending from track 28 to track 127 and has a peripheral, or circumferential, dimension, as previously explained, of 4096 words. The storage area is divided into three axial zones STR1, STR2, and STR3. The first zone STR1 has a peripheral length of 3840 words. One block of data respecting the composite records is stored in the first zone of each track. The next zone STR2, in which segments of sweep excitation signals are stored, has a peripheral length of 80 words. The remaining zone STR3, which is empty and may be employed for storing other data, if desired, has a peripheral length of 176 words. In practice, some of this storage is reduced when parity data are stored.

Each block of 3840 words consists of 80 frames of information consisting of 48 single-precision words, that is, 24 double-precision words. Each of these frames corresponds on a one-to-one basis successively, with the respective 80 words of the sweep signal, if any, recorded on the same track. In this connection, it will be recalled that the sweep signal is of shorter duration than the recorded signal so that sweep signals will be recorded on a series of the lower numbered tracks and some of the higher numbered tracks will be blank in this sweep signal record zone STR2.

The arrangement of information on the first track 28 of the composite-record section is indicated in FIG. 11. Frame FR1 consists of a two-word sample from the first trace TR1 and a two-word sample from trace TR2 and so on up to a two-word sample from trace TR24. The first sample from all of the 24 traces are arranged consecutively in the first frame FR1. Similarly, the ith samples of the 24 traces constitute the ith frame FRi. The successive eighty frames of samples are arranged in succession on the track 28, forming a block of information. Similarly, frames of information for samples 81–160 are arranged on the next track 29 and so on, with 80 frames per track, to the end of the record. Under some circumstances, the record will end before track 127 has been filled with information signals. To the extent that samples of sweep signals are stored on any track, frames of receives seismic signals having the same sample numbers as the sample numbers of the sweep signal are stored on the same track. Thus, the first eighty samples of the sweep signal and the first eighty frames of samples of received signals are stored on track 28. The second group of eighty samples of the sweep signal and the next eighty frames of samples of the received seismic signals are stored on track 29 and so on. Even though the total number of sweep signals has been exhausted, successive blocks of received seismic wave signals are recorded in successive tracks of the auxiliary record storage area.

It will be understood that there is usually some delay in the transmission of a seismic signal from the Vibroseis trucks to the geophone stations. The delay increases with the distance of the geophone station from the trucks. For this reason, some of the signals recorded in some of the lower numbered frames is 0. At most, the data in such frames are usually small numbers representing the background noise due to microseismic waves, atmospheric and other environmental disturbances, and electrical noise arising in the seismic wave receiving equipment.

COMP Computer Section

The COMP computer section, which is used for compositing incoming records, is stored on tracks 4 and 5. The construction and operation of this computer section is explained herein with reference to a block diagram represented in FIG. 17.

The block diagram, FIG. 17, shows the relation between the field equipment DRS, the auxiliary drum DRA, the commutator-synchronizer MDO and various buffer units.

When the compositor computer section is replicated in the working memory WMA it creates a number of pairs of buffer sections or buffers, to facilitate speeding up the compositing operation. The compositor comprises a commutator and synchronizer MDO for synchronizing and sequentially processing the data and for also synchronizing the transmission of sweep signals from the recording truck to the Vibroseis signal source SS. For this purpose, the commutator and synchronizer MDO may be controlled by the local clock CLA. Alternatively, it may be controlled by framing signals derived from the output of the formatter FMTR.

The compositor processes data in blocks of 80 frames at a time, one for each track of the drum DRA. While it is processing one block of 80 frames, another block of data is being fed from the formatter FMTR into the input buffer section so that the later block of data will be available in the working memory WMA as soon as the block of data last previously fed in has been processed and stored. Thus, one block of data is processed in the auxiliary memory WMA and transferred to the drum DRA while a second block of data is being fed into the buffer DIBS from the formatter FMTR. Actually, the blocks of 80 frames are fed into the computer system CMOS in smaller subdivisions, such as subdivisions of five frames. The number of frames in such subdivision is an integral submultiple of the number of frames in a block.

While each block of data is being processed in the working memory WMA, a new sequence of 80 words of chirp-signal samples are transferred from the drum DRA into a sweep buffer unit SWBS that feeds the radio transmitter RTS.

Stated differently, the drum DRA rotates continuously during the operation of the system. When a start signal is applied to the computer COMA, a block of 80 samples of the chirp signal is transferred one at a time from each track on the drum. If the sample interval is 4 ms, a period of approximately 0.320 sec elapses between the transfers of successive blocks of 80 chirp signal samples from the drum. This interval corresponds to about 9 revolutions of the drum. In the intervals between the times that the blocks of 80 chirp signal samples are transferred to the transmitter, the drum DRA is in condition to receive data processed by the COMP computer section. In this connection, it is to be noted that the total time required to transfer the 80 chirp signal samples from the drum is only about 1/30 sec or about 0.033 sec. Thus long intervals of almost 0.29 sec remain between such transfers during which the system is in condition for transferring processed data to the drum.

In each cycle of operation of 0.320 sec, a block of 80 samples of the chirp signal is transferred to the transmitter from a track on the drum and a block of 80 samples of signals corresponding to the 24 geophone stations are processed by the computer COMA and again stored, after processing, on that same track.

In starting the operation, the chirp data samples from the first two tracks 28 and 29 are transferred to the sweep buffer SWBS before the first block of 80 samples of the chirp signal are fed to the transmitter. When the first 80 samples are applied to the transmitter, the data receiving system DRS is actuated to receive incoming seismic waves and to multiplex, digitize, and format the incoming seismic waves. The processing of blocks of data respecting the incoming waves and the transfer of the processed data to the drum is alternated with the transfer of blocks of chirp signal samples, until the entire set of samples for the chirp signal has been transferred from the drum DRA to the transmitter. The processing and storage of received signals continues for the entire input time specified in Step 6 of PREP.

In a typical compositing operation, a predetermined number of sweep excitation signals, such as 20 to 100 are transmitted to the Vibroseis source one at a time and the seismic signals received at the spreads of geophone stations as a result of each excitation of the Vibroseis source, are added together and stored on the drum DRA. Except for slight differences due to end effects that occur when the first chirp excitation signal and the last chirp excitation signal are received, the processing for each pair of consecutive chirp excitation signals follows the same sequential pattern.

In the processing of data for each new chirp, a block of data from the formatter FMTR and a block of data previously stored on the drum DRA are fed into the working storage unit WMA simultaneously. Then, while the new block of data is being processed and tested and composited with the old data, previously processed and tested data are transferred out of the working memory WMA to the drum DRA.

Each sample of the new data is compared with a sample for a corresponding travel time of previously stored or composited data to determine whether the new data is real or spurious. This determination is made by comparing the characteristic or gain of the new sample with the characteristic or gain of the previously calculated average for old samples for the same setup on a trace by trace basis. If the gain of the new sample is less than the gain of the prior average by more than 12 db or some other pre-established value, the new sample is considered to be spurious and not satisfactory. If it is not satisfactory, it is rejected and replaced by an average of data previously found to be satisfactory for that trace and sample time. If it is satisfactory, it is averaged with the old average, taking due account of the number of samples that entered into the calculation of the old average. As soon as such a block of processed and tested data has been transferred to the drum, it is replaced in the buffer by the next block of data from the drum. Such rejection is referred to herein as noise suppression or noise editing.

Stated differently, the computer comprises a summing unit SBS including two summing buffers SB1 and SB2. While data from the formatter FMTR is being summed with data in one of the summing buffers SB1 or SB2, the information in the other summing buffer SB2 or SB1 is transferred to the drum DRA and is replaced in the summing buffer SB2 or SB1 respectively, by corresponding data from the next track on the drum DRA. A read-write head RWH is located opposite each track on the drum DRA. A head selector HSL operated by the commutator-synchronizer MDO, sequentially operates the heads to transfer blocks of information to and from the drum DRA and the summing buffers SB1 and SB2 are required.

At the same time, a switching device SWS operates to feed trace information to the summing unit SWS and then to route 80 words of the sweep excitation signal to the sweep buffer unit SWBS. The operation of the summing buffers SB1 and SB2 and the sweep buffers SWB1 and SWB2 are synchronized so that information from any one track is transferred to a corresponding pair of summing buffer SB1 and sweep buffer SWB1 or summing buffer SB2 and sweep buffer SWB2.

A pair of main input buffers DIB1 and DIB2 are arranged in the input buffer system DIBS to receive alternate blocks of information from the formatter FMTR and to reformat the signals in compositing format. A weighting adder WADR is interfaced between the input buffers DIB1 and DIB2 and the summing buffers SB1 and SB2 in order to add each new sample of any trace in properly weighted fashion to the previously accumulated sum of the samples of the same trace.

Means are provided for feeding to the adder WADR the parameter (see PREP Step 11) that represents the number of chirp signals to be composited. This number is stored in a first, or count-down, counter CDCTR. This counter responds to the completion of the recording of the set of received signals corresponding to each sweep signal to indicate how may more sweep signals must be initiated to complete the required compositing operation.

The action of the two data input buffers DIB1 and DIB2 and the two summing buffers SB1 and SB2 are also synchronized. Each employs the same number of memory cells, namely, the number of cells corresponding to 3840 words which represents one block of data. Each cell has a length of one single-precision word, or 16 bits. One sample for each trace is stored in two consecutive cells as previously explained in connection with FIG. 12.

A dashed line joining the input buffers DIB1 and DIB2 and summing buffers SB1 and SB2 indicates that information is transferred from these two pairs of buffers into the weighted adder WADR synchronously. Similarly, this dashed line joins the input buffer DIB2 and summing buffer SB2, indicating that information is transferred from these two buffers into the weighting adder WADR synchronously. Thus, the sweep buffers, the input buffers, and summing buffers operate synchronously and they alternate at the same frequency.

The weighting adder WADR includes a pair of adder input buffers IAB1 and IAB2 and a pair of adder output buffers CAB1 and CAB2 each having a length of one sample for all 24 traces, that is, 48 words or one frame.

A block of information previously stored in one of the data input buffers DIB1 or DIB2 and a block of information stored in the summing buffer SB1 or SB2 are synchronously fed into the buffers of the adder one frame at a time. A dashed line joining adder input buffers IAB1 and IAB2 with adder output buffers CAB1 and CAB2 indicates that these two pairs of buffers are synchronized to receive information simultaneously in pairs from one or other of the input buffers DIB1 and DIB2 and from one or the other of the summing buffers SB1 and SB2.

Since each of the input buffers IAB1 and IAB2 of the adder WADR has a length of one frame and a length of each of the data input buffers DIB1 and DIB2 has a length of 80 frames, the operation of the two adder input buffers IAB1 and IAB2 are alternated 40 times for each block of information supplied to one of the data input buffers DIB1 or DIB2. Similar remarks apply to the output buffers CAB1 and CAB2 of the adder WADR. The alternation is controlled in a well known manner by commutator and synchronizer MDO.

When two frames of informaton have been transferred from data input buffer DIB1 or DIB2 and summing buffer SB1 or SB2 into a synchronously operating pair of buffers IAB1 and CAB1 or IAB2 and CAB2, the two frames of information are processed and the result is fed back to the same part of the summing buffer SB1 or SB2 from which information had just previously been extracted for such processing. Thus, the values of the sample signals stored in any frame of the working summing buffer SB1 or SB2 is modified by the adder WADR in accordance with the values of information of the corresponding frame of the input information, trace by trace, and this process is repeated for the signals received in the respective sample intervals.

It is to be noted that it is important to provide buffers SB1 and SB2 that are capable of storing a complete block of informaion that has been stored on a track of the drum DRA. This makes it unnecessary to obtain access to the drum more than once to make use of the information on any one track in averaging with the current incoming signals. On the other hand, information is being supplied from the formatter FMTR substantially continuously. In practice, the buffers DIB1 and DIB2 may be made smaller than the buffers SB1 and SB2 in order to reduce the size of the working memory WMA required for processing the information. For example, the buffers DIB1 and DIB2 have been made with a length of five frames each. In such a case, the buffers DIB1 and DIB2 are alternated 14 times as rapidly as the buffers SB1 and SB2 in order to be able to feed information from the formatter FMTR and the drum DRA into the averager WADR at the same rate.

The adder or averager WADR comprises the necessary components of a conventional adder, including shift registers and accumulators and, in addition, suitable selectors or maskers, and calculators for detecting the characteristic, or gain, associated with each of the samples to be included in the average in order to assure that signals are added to the same scale without overloading the adder output buffers CAB1 or CAB2.

The actual averaging is accomplished by controlled shifting in accordance with the chirp sequence number. More particularly, the chirp number m is stored in a register CHN and fed to a register controller CHR. This register controller CHR includes a small computer which determines the value of NC that satisfies the following equation:

$$2^{n-1} < m \leq 2^n$$

where
m is the current chirp number
n is the shift constant applied to the input data
NC=n Thus, the value of the data existing at the time in the active input buffer IAB1 is shifted to the right by NC bits by the controller CHR. The shifting and summing of data is aided by the fact that the number of bits available to represent the value of a sample in the compositor COMA is greater than those used to represent the characteristic in the field data system.

The controller CHR also detects whether the chirp number stored in the register CHN is even or odd. If the chirp number exceeds any power of 2 by 2, the value stored in the active output buffer CAB1 or CAB2 is shifted to the right by one bit. Otherwise, no such shift occurs. The power may be any non-negative integer, that is, any positive integer including 0.

The two resultant numbers existing in the two buffers IAB1 and CAB1 or IAB2 and CAB2 are added and the sum is stored in the corresponding part of the active summing register SB1 or SB2, as the case may be. Upon completion of a summing operation for one frame, the commutator-synchronizer switches to the other pair of input and output buffers IAB1 and CAB1 or IAB2 and CAB2 and the process is repeated for the next sample. While the adding process is taking place in one pair of input and output buffers IAB1 and CAB1 or IAB2 and CAB2, information from the next frame in the working input buffer DIB1 or DIB2 and the working output buffer SB1 or SB2 is fed into the two buffers of the adder WADR in which processing has just previously been completed.

Compositing

Each time a chirp signal is initiated, an initializing device INIT is actuated to clear the composite-record part of the drum DRA and to set zeroes in all of the buffers DIB1, DIB2, IAB1, IAB2, CAB1, CAB2, SB1, and SB2. A zero is also in the chirp number register CHN when the first chirp signal is initiated for a setup. Upon initiation of each chirp signals, two tracks of information are fed into the working memory WMA from the drum DRA. Actually, all that occurs initially is that two blocks of 80 words each of the sweep excitation signal are stoed in the sweep buffers SWB1 and SWB2 and a 1 is fed into the register CHN and the commutator-synchronizer MDO is enabled. The commutator proceeds to operate to control the execution of the compositor computer COMA that is stored in the working space WMA. The commutator then repeats the process beginning with the first track 28, but this time successive words of information from the sweep buffer SWB1 are supplied one at a time to the radio transmitter in analog form at a rate of one word for each chirp-sample interval. The timing of this transmission is controlled by the local clock CLA through the commutator MDO and the switching circuit SWS.

Alternately, the two data input buffers DIB1 and DIB2 are operated to place one of them in the active or working mode and the other in the passive or receiving mode. It is the data input buffer DIB1 or DIB2 that is in the active mode from which data is transferred into the adder WADR while the passive data input buffer DIB2 or DIB1 receives data from the data receiving DRS. Thus, while the data in the working data input buffer is being processed in the adder WADR, a block of information is fed from the formatter FMTR to the other data input buffer.

Initially, no signals are actually being received by the geophones but as the operation progresses, seismic waves that are generated by the Vibroseis source are received at the geophones and passed through the roll-along switches RAS, the binary gain amplifiers BGA, the multiplexer SMUX, digitizer DGT and the formatter FMTR. The processing of the received signals is synchronized with the generation of the sweep signals. More particularly, sweep samples are applied to the radio transmitter system RTS at the same rate that the frames of received seismic wave signals are generated in the data receiving system DRS. Thus, in normal operation for each time a sweep sample that is transferred out of one of the sweep buffers SWB1 or SWB2 to the transmitter, a frame of information representing the seismic waves received at all 24 geophone stations is fed into the data input buffer system DIBS. In effect, samples of the sweep signal are transmitted alternately with the formatting and storage of received signals. A dashed line interconnecting the formatter and the sweep buffer unit SWBS indicates this synchronous alternation.

Each time a block of input signals has been received and multiplexed, it is then averaged in the adder WADR with the corresponding block of signals previously stored on the drum DRA.

During the processing of the first chirp, the input signals are fed directly to the drum from the data input buffers, bypassing the adder WADR and summer SBS. In effect, the incoming signals are simply reproduced block by block on successive tracks of the composite-record storage area of the drum DRA. Thus, the commutator-synchronizer MDO includes means for preventing any averaging while the first set of signals is being received that corresponds to the first chirp signal, but averaging is caused while seismic signals corresponding to later chirp signals are being received. It will also be clear from the foregoing description that, in effect, when the second chirp signal is received, the received signals are added to those first recorded directly without any averaging shift constant being calculated.

Noise Suppression

It sometimes occurs that the incoming signal includes excessive noise. The noise may extend throughout the entire length of the particular trace or only over part of its length. It is desirable, therefore, to discard such noisy records or parts or records without, however, upsetting the averaging method excessively. To this end, a comparing and correcting unit CMPR is included in the adder WADR.

With the comparing unit CMPR, each sample for a particular trace is compared with the average sample previously stored for that trace in the adder output buffer. This comparison is made simply by subtracting the gain value for the new signal from the gain value of the old signal. If the value of new gain is less than the value of the gain for previously calculated average by more than some predetermined amount, such as that represented by 12 db, the new sample is rejected and the average remains unchanged. It has been found that the simplest way to achieve this result is to substitute the old average for the new sample in the adder WADR and then to perform the averaging just as if the new sample were being used. A special counter FCTR measures the frequency of rejection so as to warn the operator when the proportion of new samples fed in through the input buffers becomes excessively large.

As previously mentioned, the number of chirp signals generated are counted automatically one at a time in a counter, such as the count-down counter CDCTR (see FIG. 2B). If there is still at least one chirp to be transmitted, a signal light indicating this fact is energized on the status panel STLA and then after an elasped time established by the response to Step 15, a second light turns on to indicate that the equipment is ready for reoperation. This indication is provided both when the system operates in the manual mode and when it operates in the automatic mode. When the equipment has been made ready, the operation of the system is reinitiated automatically if the system has been set in the automatic mode or manually by pressing the START button if the system has been set in the manual mode. Upon reoperation a new chirp signal is transmitted and the operation of the COMP computer section is reinitiated. This process is repeated until all the signals to be composited have been received and processed. If a correlation computer COMB is included in the system, the composited data is correlated as previously described.

DPOT Computer Section

The DPOT computer section is programmed to type out any material that is stored on the drum DRA on the typewriter TTY, upon command. Such command is issued only when the system is otherwise inactive. The operation of the DPOT computer section is commanded by manipulation of appropriate switches on the auxiliary control panel CPA to call the DPOT program. When the DPOT program is called, it is transferred to the auxiliary working memory WMA and it immediately interrogates the operator through the typewriter TTY in order to obtain information required to command the computer to interrogate the operator.

Such interrogation proceeds as follows:

Step 1. MODE?, 0=TIMED, 1=CONTINUOUS

If a 0 is typed in, the time of occurrence of each group of 24 samples is typed out, one for each trace, along with other data. This time is the travel time for each sample.

If a 1 is typed in, a continuous display will be typed out or otherwise displayed, but without timing.

The program then proceeds to the next step.

Step 2. HEXADECIMAL?, 1 IF YES

If a 1 is typed in, the print-out is in hexadecimal numbers. If a 0 is typed in, the print-out is in decimal numbers.

Conversion of the binary signals previously stored on the drum into decimal and hexadecimal numbers, as the case may be, is accomplished by appropriate subsections of the DPOT computer section at the time the output is typed.

The program then proceeds to the next step.

Step 3. STARTING TRACK

In response to this inquiry, the observer types in a digit from 0 to 127. If it is a trace track that is to be printed out, he types in a number greater than or equal to 28, but less than or equal to 127.

The program then proceeds to the next step.

Step 4. STARTING SECTOR

In response to this inquiry, the observer types in a number from 0 to 255. This designates the sector on the starting track from which information is to be typed out. But if the operation is in the timed mode, the sector number must be divisible by 3 so that the display commences at the start of a group of 24 samples.

The program then proceeds to the next step.

Step 5. NUM. WORDS

In response to this inquiry, the observer types in any integer from 1 to 1024 if the display is not to be in the timed mode. But if the display is to be in the timed mode, the number to be typed in must be a multiple of 24.

Upon completion of the response to Step 5, the DPOT computer section executes the DPOT program and types out the desired information on the typewriter TTY.

The program then proceeds to the next step.

Step 6. MORE?, 1=YES

The purpose of this inquiry is to inquire whether it is anticipated that another printout will be desired. If so, the observer types in 1.

Upon completion of its operation, if a 0 has been typed in in Step 6, the operation of the DPOT program terminates, readying the computer for the next operation. But if a 1 was typed in, then, after the requisite printout has been completed, the DPOT computer section restarts a set of inquiries at Step 1.

The operation of this program may be repeated as many times as desired for different parameters set in the observer's response to the foregoing inquiries.

TOUT Computer Section

The TOUT computer section is employed for transferring information to the magnetic tape MTR of the output recorder OPTR or to the oscillographic recorder MTRC automatically or, upon command, upon the completion of the operation of the compositing operations performed by the compositor. Such operation of the TOUT computer section is controlled by the setting of various switches on the control panel CPA.

The TOUT program includes means for converting multiplexed composited data residing in the compositor computer COMA and multiplexed correlated data residing in the correlation computer COMB into signals that are recorded on the magnetic tape MTR in the same standard output format. To this effect, the TOUT computer section includes two reformatting subsections. One formatter subsection converts the multiplexed composited data that resides in the computer in a compositor format into signals that are recorded on the magnetic tape MTR in a standard output format. The other formatter subsection converts the multiplexed output of the MUX program from a single integer mode format into multiplexed signals in the same standard output format. The output format chosen corresponds to the format that is handled by the deformatter that forms part of the multiple trace recorder MTRC. In this regard, it is to be noted that the XDS 1010 field data collecting system previously referred to includes not only various components of the data handling system which form part of the data receiving DRS, but also the multiple trace recorder and this recorder includes a deformatter for converting the output of the formatter FMTR into analog signals producing a multiple trace oscillogram in analog form.

To produce a multiple trace oscillogram, the signals produced by the TOUT computer section are first recorded on the magnetic tape MTR, then they are read off the tape to the digital-to-analog converter unit DAC where they are demultiplexed and converted to analog form. The resultant analog signals are reproduced by the recorder MTRC in a conventional manner to produce a multiple trace seismogram.

By manipulation of various switches in the system, it is also possible to rewind the magnetic tape and to feed either composited records or correlated records that exist on the magnetic tape to the multiple trace recorder MTRC in order to reproduce the data as a demultiplexed mutliple-trace oscillographic analog form.

At the time of formatting the signals for recording on the magnetic tape MTR, the samples are counted sequentially and a timer signal indicating the sample numbers or travel times corresponding to the various sample intervals are also incorporated in multiplexed fashion in the output signal. Appropriate gain signals are also developed and stored in the standard format. The magnetic tape records so produced are also in a standard format suitable for further processing in a computer center.

One switch on the control panel, if open, automatically suspends operation upon completion of the compositing operation performed by the compositor so as to permit the observer to make various tests by means of the DPOT computer section. Usually, however, this switch is closed, so as to cause the TOUT computer section to operate automatically. In this case, the TOUT computer section is replicated in the working memory unit WMA and it then proceeds to operate in one of three modes, depending upon the setting of various switches of the control panel CPA.

The TOUT program operates with two double buffers. One pair is used for inputting data from the drum DRA or DRB from which information is to be received and the other pair of buffers is employed for continuously outputting data to the magnetic tape MTR. The two double buffers are formed in the working memory WMA of the auxiliary computer COMA when the TOUT program is called.

The TOUT computer section is adapted to be operated in any one of several modes, depending upon how switches on the control panel CPA are set.

MODE 1

Mode 1 is used when only computer COMA is in operation with the teletypewriter TTY connected to it. In Mode 1 only composited data is reproduced. When switches on the control panel CPA have been set for the TOUT program to operate in Mode 1, header information describing the setup and the compositing parameters are recorded on the magnetic tape MTR of the output recorder OPTR. Automatically the composited data that has been stored on the auxiliary drum DRA is then transferred to the magnetic tape MTR.

Frames of information respecting the sum of the signals on all 24 traces are recorded in multiplexed form on the magnetic tape MTR for successive sample times. If the TOUT computer section continues to operate in Mode 1, such information is written automatically on the magnetic tape MTR upon the completion of the compositing operation for each setup. This mode of operation is employed when only one computer is available.

MODE 2

Mode 2 is used only when correlation computer COMB is in use. In Mode 2, both composited and correlated records are reproduced on the oscillographic recorder MTRC upon completion of recording for each setup. If switches of the control panel CPA have been set for operation of the TOUT computer section in Mode 2, the following operations occur:

1. Sections of the composite record that have been stored on auxiliary drum DRA are reproduced by the multiple trace recorder MTRC provided that a number different from 0 but no greater than the number of composites was typed in by the observer in response to Step 12 of the PREP program.
2. After that information has been transferred to the recorder MTRC it is then transferred to drum DRB of the correlation computer COMB where the information is subsequently correlated with the sweep excitation signal as previously described.
3. If the PREP program has been set to display cumulative composited data, then each time the composited material is accumulated on drum DRA, the computer system CMOS transfers this composited material to the correlation computer for correlation and multiplexing and then transfers the multiplexed correlated data to computer COMA for outputting by the TOUT program in multiple trace oscillographic form in the recorder MTRC. Both the correlated information and composited information are thus reproduced. This is normally done unless switches on the control panel CPA are set to skip such recording of the composited signals.
4. When all the compositing for a setup has been completed, the composited data and the correlated data are transferred to the magnetic tape MTR as previously described.

Thus, when operating in Mode 2, the system operates in a special fashion which reproduces composited records and correlated records on the recorder MTRC as specified by the operator during the operation of the PREP program and also stores the final composite records and correlated records with headers on the magnetic tape MTR.

MODE 3

Normal operation occurs in Mode 3. If suitable switches of the auxiliary control panel CPA have been set for the TOUT computer section to operate in Mode 3, the TOUT program transfers the most recently correlated set of data from drum DRB to the magnetic tape MTR of the output recorder OPTR. It then operates automatically to transfer the newly composited data from drum DRA both to the output tape MTR and to the correlation computer COMB.

The TOUT computer section is also designed to be operated in certain other auxiliary modes when control switches on the control panel CPA are suitably set.

MODE 4

When the auxiliary computer COMB is set to operate in Mode 4, only the most recently correlated data appearing on the correlation drum DRB is transferred to the magnetic tape MTR.

It is convenient to operate the computer in Mode 4 at the end of the day or at the end of an output reel after the last setup has been shot. If this is not done, the most recently correlated data remains on drum DRB until the TOUT program is operated again in Mode 2 or 3, such as on the following day. By operating in Mode 4, the last of the days' work is transferred to tape. The tape is then ready to be sent to a computer center for further processing.

GENERAL DESCRIPTION OF SYSTEM OPERATION

The operating system includes two monitors, monitor MONB that is stored on the drum DRB of the master computer COMB and monitor MONA that is stored on the drum DRA of the auxiliary computer COMA. These monitors are also stored in preselected parts of the static memory of the two computers COMA and COMB. These programs and other programs provide for communication between the two computers and the output systems. The monitor programs also call other programs in a predetermined sequence in order to perform the various operations that have been described herein. The monitor MONA includes means for instigating the performance of all of the required steps for transferring information from the data receiving system DRS to the compositor computer COMA, for processing that data to produce the composited records, for copying those composited records in correlation computer COMA and for reproducing the composited records in the output system and for transferring samples of the chirp excitation signal to the radio transmitter.

The monitor MONB in the correlation computer COMB is provided with means for receiving in the correlation computer COMB data from the compositing computer COMA, storing that data in demultiplexed form on the drum DRB, processing the data to cross-correlate the signals received at the respective geophone stations with the chirp signal and to transfer the cross-correlated data to the output system OPS, where it is recorded or displayed as commanded by the setting of switches on the control panel CPA.

The monitor systems are programmed so that errors that are detected are listed automatically on the teletypewriter after each composite is formed. The diagnostic system is designed to indicate the trace composite numbers or drum tracks on which any error observed is associated.

Now let us assume, for purposes of discussion, that 24 traces are to be recorded, that the roll-along switch has 24 output connectors on it to which 24 groups of geophones are respectively connected, and that the computing system is set to be operated in its normal manner by setting the switches of the control panels CPA and CPB. Under these conditions, the TOUT program will operate in the normal mode (Mode 3).

Assuming that all the programs have been loaded into the computer systems as previously described, a day's operation is commenced.

First, a number of standard tests are made to determine whether the computer is in working order.

Preliminarily, the system may be exercised with a view to isolating sections of the system that might produce erroneous results. To operate the system in the exercise mode, the computers are disconnected from the data receiving system DRS and switches on the control panel CPA are manipulated to cause one of the signals that has been stored in the DSIM computer sector to be fed into the input of the computer system COMS for processing just as if it were a received signal. These signals are fed into the data input system DIBS in place of data from the data receiving system DRS. The DSIM computer section is designed to produce duplicates of the signal, such as a Vibroseis sweep signal, in a redundant manner as frames of virtual incoming information.

If, for some reason, cross-correlation is impossible to obtain, because one of the computers is out of order, the out-of-order computer is disconnected, the remaining computer is used as the compositor computer COMA, and the typewriter TTY is connected to the compositor computer COMA. In that case, after the necessary programs have been loaded into the auxiliary computer COMA, the operation of SWEP program is initiated. This program interrogates the operator to ascertain what parameters are needed in order to operate computer COMA alone. These parameters include those required for creating sweep excitation signal data. This data is stored on the auxiliary drum DRA in zone STR2. Other parameters control the various operations required for generating and receiving signals, compositing records, and transferring the composited records to the output tape MTR as described.

When the system in is good working condition, including both computers, switches on the panels of the two computers CPA and CPB are set to initiate the operation of the PREP and SWEP programs. Interlock switches are provided in the computer system in order to prevent the operation of the compositor or the correlator until after all the questions presented by the PREP computer section have been answered.

Preliminarily, a geophone cable having a length corresponding to, say, 48 geophone stations evenly spaced apart, say 220 feet apart, are laid out along the line of exploration, with the recorder truck located intermediate the ends thereof. For purposes of simplicity, we assume that recordings are to be made for a series of setups of the single-ender type as previously described. For the first setup the Vibroseis source, consisting of the three Vibroseis trucks VIBTR, is positioned at a point in the source area located beyond the end of the line. The source area has a length along the line equal to the spacing between two successive geophone stations. The roll-along switch RAS is then set to connect geophones 1–24 to the input of the data receiving system DRS. For the second setup, the Vibroseis source is operated in a source area intermediate geophone stations 1 and 2. For that setup, the Vibroseis source is operated in a source area between geophone stations 1 and 2. For the third setup, the roll-along switch RAS is set to connect geophone stations 3–26 to the input of the data receiving system DRS and Vibroseis source is operated in a source area between geophone stations 2 and 3. And so on.

There are many other ways of operating the equipment than those described. For example, the source may be operated with an in-line offset of many geophone intervals. Furthermore, the setups may be arranged in split-spread fashion. Where split-spreads are employed, the geophone stations may be arranged in such a way that there is a gap between geophone stations at the center of the spread. For example, on one side of the Vibroseis source, 12 geophone stations may be located at regular intervals, then there may be a gap corresponding to, say, 4 geophone station intervals and then 12 more geophone stations may be arranged on the other side of the source at the same intervals as those just previously mentioned.

Once operation is commenced, certain operations occur automatically without further action on the part of the operator. Other operations occur, such as execution of the FRAN program provided that the switches on the control panel have been set to require such operation.

In the first mode of starting, after the questions of the PREP program have been answered, the VSWG program and the VTRN program are operated automatically, causing the sweep excitation signals to be stored on both drums DRB and DRA, as previously explained.

If a new sweep excitation signal is generated, then at the option of the operator the system automatically records the samples of the sweep signal on the magnetic tape record MTRC as previously described, together with an appropriate header.

The START switch on auxiliary panel CPA is then pressed, causing a sweep signal to be transmitted via radio to the Vibroseis source.

On closing the START switch, the to computers COMA and COMB go into operation as previously described. If the system is operating for the first setup, no data is transferred at this time from the correlation drum to the magnetic tape recorder. However, if the system is being operated for a second or later setup, data is transferred from the correlation drum DRB to the magnetic tape recorder OPTR and the signals composited for the preceding setup are also transferred. In either event, the sweep signal is transferred to the radio transmitter and signals are concurrently received at the geophone stations and fed into the computer system for compositing in the compositor computer COMA and then for correlating them in the correlation computer COMB. The compositing operations and correlating operations are both performed in the recorder truck while the recorder truck is operating along the line of exploration X—X. Each time a set of composited waves has been recorded in compositor computer COMA for a setup, they are transferred to the correlation computer COMB where correlation usually proceeds immediately, and usually concurrently with the recording and compositing for the next setup.

For each chirp excitation signal transmitted for each setup, seismic signals are received for an input time interval established by the response to Step 6 of the PREP program.

Upon completion of operations for the first setup, previously correlated signals, if any are present, are transferred to the magnetic tape MTR and then the composited records just formed in the compositor COMA are transferred to the magnetic tape MTR. This assumes that the TOUT program has been set to operate in Mode 3. During this process, the composited data is also transferred to the correlation computer COMB where it is then processed by correlating the composited signals with the sweep signal. While the correlation process is continuing, records are usually made for a new setup. This process is repeated for a series of setups along the line of exploration in accordance with a predetermined plan. Each time a set of recordings is to be made for a new setup, the roll-along switch RAS is advanced accordingly.

If the oscillograph records show that a particular shot gave poor results, it may be reshot. On the other hand, if all of the records being produced are poor, then parameters may be changed in PREP in order to obtain good results. The decisions for making such changes are generally not made by the equipment operator, but by a geologist or geophysicist representing the "client" or "customer" for whom the geophysical survey is being made. Thus, for example, if the noise level is excessively high, the number of sweeps per composite may be increased. In this connection, it will be remembered that (if noise is random) the signal-to-noise ratio of a Vibroseis system increases as the square root of the number of sweeps employed to form the composite signal. The signal level may also be increased by placing a larger number of Vibroseis units into operation.

The production of a tape recording MTR in which the received waves have already been cross-correlated with the Vibroseis signals, makes it possible to produce a profile of the area being explored quickly at the computer center, without the delay that would ordinarily occur because of the need to perform the corss-correlation process at the center.

GENERAL REMARKS

While the invention has been described with particular reference to the use of general purpose programmable computers, it will be understood that many features of the system may be embodied in hard-wired form. Likewise, those parts of the system which have been described as utilizing hard-wired programs may be embodied in software programmed form.

For purposes of simplifying the explanation, language has been utilized which may sound like it is concerned with mental processes, but which, in fact, is concerned with physical processes. For example, the terms "information" and "data", particularly references made to storage and transfer and calculations thereof, refer specifically to information signals and data signals or other manifestations of information and data which are capable of physical manipulation. The signals in question are stored in the computers in binary form in magnetized cells, such cells usually being magnetized in one direction to represent a value zero, and in the opposite direction to represent a value one in the binary system. The terms "transfer of information (or data)" and similar expressions refer to the manipulation of those signals or manifestations.

Wherever in the description reference is made to an operation by a computer section or program, it is to be understood that the computer section is programmed either by a hard-wire process or a software process to provide means for performing the required operations. It is to be understood, of course, that the programs may be written in innumerably different ways to accomplish the various operations described.

In practice, the computers specifically referred to herein as XDS 1010 computers, have complex control panels on which many different switches are located and which often require the setting of many switches to perform a single switching operation. Often a single switching operation is accomplished by transforming the settings of the numerous switches on the panel into signals which operate on a decoder unit in a register or a memory bank to perform the required switching operation. For simplicity, such a combination of switches and associated parts are referred to herein simply as a switch.

The invention may be embodied in many other forms than those particularly referred to herein. For example, many other computers and other field data collecting systems may be employed. More particularly, by way of example, the DFS III field data collecting system, manufactured by Texas Instruments, Inc. may be employed in place of the XDS1010 data collecting system. Furthermore, the continuously movable, endless, magnetic memory units may be in the form of magnetic discs instead of in the form of magnetic drums.

The system may also be employed in a Dinoseis or weight-dropping operation. In this case, only the auxiliary computer COMA is employed. The Dinoseis and weight-dropping signals both involve transmission of pulses extending over only a few hundredths of a second, instead of being in the form of continuous wavetrains that extend over several seconds, and hence ordinarily do not require use of a cross-correlation process to produce easily interpreted eye-readable oscillographic records.

NORMAL PROCESSING - OVERVIEW

The general manner in which the two computers COMA and COMB interact with each other under the control of an operator during the making of a seismic survey can be understood by reference to the process flow chart shown in FIG. 18. In this figure, actions in the slave computer coma are represented along one horizontal bar A—A while actions in the master computer COMB are represented along a second horizontal bar B—B. The diagram brings out that various communications occur between the computer control interface represented by the dashed lines C—C. In this process diagram, time increases to the right as indicated by the arrow TT. Events appearing at points which are to the right of others, occur later than those others. Solid lines in the bars represent times during which various operations occur as designated by the names of the computer sections then operating, and dashed lines indicate times during which the designated computer is idle, waiting for a signal from the operator, or completion of certain operations in the other computer, or both.

The portion of the diagram marked ST1 at both the top and bottom of the diagram, refer to events occurring during the processing of the first setup. The portion of the diagram marked STL at both the top and bottom of the diagram, refer to events occurring during the processing of the last setup. The portion of the diagram marked STO at both the top and bottom of the diagram, refer to events occurring during the processing of the other or intervening setups. Operations in various setups are separated by heavy dashed lines.

The broad bands BBF, BBO, and BBL, represent the flow of data corresponding to many chirp signals into the computer system during the respective operating cycles ST1, STO, and STL.

The computer control interface includes logic means such as AND gates and other logic and electronic elements for causing various enabling and initiating and waiting and transfer actions to occur, all in accordance with methods well known to those skilled in the art.

In connection with the explanation of the processing, it is assumed that the computer system has been readied in every respect by loading of all needed computer programs into it, that the system has been connected to a geophone cable, and that all is ready for proceeding with the seismic survey along a line of exploration.

In this explanation, we will refer to two START bottoms or switches that are in the form of STEP buttons STA in computer COMA and STB in computer COMB. The operation of computer COMA will be explained by reference to certain computer sections, namely, the SWEP computer sections, the COMP computer section, and the TOUT computer section. The operation of computer COMB will be explained with reference to the PREP computer section, the DMUX computer section, the XCOR computer section, and the MUX computer section.

Initially, the STEP buttons STA and STB are pressed. This operation transfers both monitor sections MONA and MONB into the respective computer, thus acting as a start switch operation. Program switches ASO and BSO in computer COMA and COMB are then closed and the STEP buttons STA and STB are pressed again. The PREP program goes into operation immediately nd the operator is interrogated as explained above. The SWEP program waits for a signal from main computer COMB to transfer data from computer COMB to computer COMA. Appropriate information is stored on drum DRB. Upon completion of the operation of the PREP program, the VSWG and VTRN program are operated automatically and a chirp signal is generated and its Fouricr transform is produced, if commanded by the operator in his responses to the PREP program. Some of the information generated as a result of the responses to the PREP program are transferred to computer COMA where it is processed by the SWEP program and is stored on drum DRA.

At any time that STEP button STA is pressed as described above, the "wait" lights on the corresponding panel turn off and other "operating" or ready lights turn on.

Upon completion of the operation of the SWEP computer section, computer COMA comes to a halt and waits. The two computers are then ready for initiation of continuous automatic operation.

At this time, main computer COMB is restarted by transferring MONB to the section PMB of the static memory SMB. Then the STEP button STB is pressed again.

This second operation of the STEP button STB calls the DMUX program into the working memory unit WMB, where it normally resides until used as set forth below. If STEP button STB is pressed at this time or at some later time prior to the completion of the compositing operation, lights are energized on the control panel CPB indicating that computer COMB is waiting for transfer of information to it from computer COMA. Closure of the STEP button STA in computer COMA initiates the transmission, reception, and processing of chirp signals and the resultant seismic wave signals. The compositing occurs as described above and the composited result is stored on drum DRA. Upon completion of the compositing operation, computer COMA halts and automatically energizes lights on its panel CPA to indicate that it is waiting for a command from the operator. When the STEP button STA of computer COMA is pressed again (provided STEP botton STB had been pressed), computer COMA immediately performs two operations, namely, the transfer of composited data to the output system OTS and also the transfer of composited information to the master computer COMB for processing. If the STEP button STB had not previously been pressed, it must be pressed as well as STEP button STA in order to cause computer COMA to perform the two operations in question.

As the composited information is being transferred to computer COMB, it is operated upon by the first stage and then by the second stage of the DMUX computer section to perform the two-stage demultiplex operation previously described. The demultiplexed data is then subjected to cross-correlation with the chirp signal by the XCOR computer section. The resultant cross-correlated pulse-type signals are then multiplexed and stored on the drum DRB. Upon completion of the multiplexing of the correlated signals, the DMUX program is automatically read into the working memory WMB. The processing operations of computer COMB are then halted automatically and computer COMB stands idle until compositing is completed for the next setup and STEP button STA is operated again.

Normally, sets of seismic wave signals are received and processed by the data receiving system DRS and the slave computer COMA for a second setup while information previously composited by computer COMA for the first setup is being cross-correlated in computer COMB. Upon completion of the compositing operation for the second setup, computer COMA waits again for operation of the STEP button STA. When it is reoperated, the TOUT program is called into operation. This time it transfers correlated signals for the first setup and then composited signals for the second setup into the output system OPS. On completion of the transfer of the pulse-type data for setup 1 to the output system OPS, the TOUT program then proceeds automatically to transfer composited data for setup number 2 to the output system OPS. At the same time, the composited data is transferred by the TOUT computer section to computer COMB which then proceeds to process it automatically by operation of the DMUX computer section, the XCOR computer section and the MUX computer section as previously described, Again, upon completion of the operation of the TOUT program for setup number 2, computer COMA enters the wait mode and operation can be initiated for handling data for a third setup.

As soon as the information from drum DRA has been transferred through the TOUT program to computer COMB for processing, computer COMA halts processing and waits for further instructions. Thereafter, at any time, regardless of whether processing of that information has been completed in computer COMB, pressing of the STEP button STA on the slave computer COMA, reinitiates the operation of creating chirp signals and feeding resultant digital signals from the data receiving system DRS to the computer system COMS.

The processing of data for successive setups is continued indefinitely until the operator, for some reason, reaches the last setup and it has been composited in the computer coma. As before, upon closure of STEP button STA, correlated data from the previous setup and the composited data from the last setup are transferred to the output system OPS in sequence and the composited data is transferred to computer COMB. In this case, instead of merely pressing the STEP button STA to reinitiate the creation of a series of chirp signals, and their processing by the data receiving system DRS and computer COMA, the operator first sets a sense switch AS3 on computer COMA. The setting of this switch causes the TOUT program to operate in Mode 4. As a result, when demultiplexing, cross-correlating, and multiplexing has been completed in computer COMB for the last setup and the STEP button STA is then pressed, the multiplexed pulse-type trace information on drum DRB for the last setup is processed by the DMUX computer section and then the TOUT computer section transfers the pulse-type data to the output system OPS.

As explained earlier in the description, the two monitor program MONA and MONB reside permanently in the static memory units SMA and SMB. The monitor program MONB that resides in computer COMB operates automatically to construct the DMUX computer section in the working memory WMB when the STEP button STB is pressed after operation of the PREP and associated programs, and then to automatically construct the XCOR computer section in the working memory WMB after demultiplexing has been completed in the correlation computer COMB and to automatically construct the MUX program in the working memory WMB after the cross-correlation process has been completed, and then to automatically initiate the repetition of this process again by transferring the DMUX program to the working memory WMB. The DMUX program is provided with means for suspending operation until an appropriate signal is transmitted to it from computer COMA through the interface unit CCIF upon pressing of the STEP button STA after compositing has been completed for a setup.

The main monitor program MONB also serves to call the PREP program and also the VSWG program and the VTRM program if required by the responses to the PREP program. In addition, the main monitor program MONB calls other programs, such as FRAN, into operation as required by the setting of the program switches SWBO ... SWB8. It is to be noted, of course, that if the FRAN program is called at any time in the operation of the monitor program MONB, the operations required by the FRAN program are executed after the XCOR program has been executed but before the MUX program has been executed. After the FRAN program has been executed, the MUX program is reconstructed in the working memory unit WMB and automatic operation is resumed.

The monitor program MONA serves to construct the COMP and TOUT programs automatically in the working memory WMA of the compositor computer COMA alternately. When either is transferred to the working memory, it resides in a state of readiness to perform the inputting and compositing operations and the outputting operations upon pressing the STEP button STA as described above.

To aid in performing the foregoing operations, the computer control interface CCIF comprises two principal logic units LU1, including gates, inverters, latch units, and other conventional elements interconnected, as will be obvious to those skilled in the art, to effect the required interlocking actions of the computers and transfers of information between them.

One of these logic units, in effect, includes a gate unit which enables computer COMA for compositing by operation of the STEP switch STA for the first setup only if the operation of the PREP and SWEP programs have been completed; and for later setups only if the operation of the TOUT program has been completed. When computer COMA is so enabled, the COMB computer section is reconstructed in the working memory WMA and waits for pressing of the STEP switch STA.

The other of these logic units is, in effect, a gate unit which prepares computer COMA for outputting of information to the output system OPS by operation of STEP switch STA only if the compositing has been completed for the current setup and computer COMB has completed the operation of the MUX program and is waiting to operate the DMUX program.

In the foregoing explanation, we have assumed that the computer system COMS has been set in its automatic mode, where chirping commences automatically after a predetermined time interval after a previous chirp has been transmitted. If the computer system COMS has been set to operate in its manual mode, such automatic operation does not occur, but the STEP button STA is pressed each time a new chirp signal is to be transmitted for a particular setup.

Many details of a type which would be obviously supplied by one skilled in the art, have been omitted. For example, many of the precautions that would obviously be taken in order to assure accuracy and reliability of the computing processes, such as initializing values of bits in various cells have not been mentioned. Even the means for synchronizing numerous operations have not all been described in detail. Likewise, arrangements for causing operations to occur at predetermined times or in predetermined sequences, or at specified intervals have not been described. All of these and other details are of such a nature that they can be supplied by anyone skilled in the art of programming computers for use in creating or processing seismic surveying information.

The invention claimed is:

1. In a method of seismic surveying, the method of generating, receiving, and processing seismic wave signals that comprises:
   a. storing a seismic source wave signal of variable frequency in the form of a series of digital signals in integer-mode format;
   b. exciting the earth in accordance with said source signal to cause seismic wave signals of corresponding variable frequency to be generated in the earth over an extended period of time whereby such seismic waves travel downwardly into the earth and are deflected by subsurface formations;
   c. receiving seismic waves deflected by such subsurface formations at a spread of geophone stations;
   d. converting the seismic waves received at the respective geophone stations into a series of digital signals multiplexed in accordance with a second, or data receiver, floating-point format;
   e. converting said series of received digital signals into a set of series of digital signals multiplexed in a third, or compositing, floating-point format;
   f. repeating steps (b) to (e) for successive trains of received seismic waves that travel over approximately the same paths, thereby producing corresponding sets of digital signals multiplexed in said third, or compositing, floating-point format;
   g. compositing said sets of digital signals to produce a final set of composited signals multiplexed in said third, or compositing, format;
   h. reformatting said sets of multiplexed composite signals to produce a final set of said multiplexed signals in said second, or data receiver, floating-point format;
   i. also reformatting said set of multiplexed composite signals to store them in said first, or source signal, integer-mode format;
   j. cross-correlating said series of seismic source wave digital signals that were recorded in said first, or source signal, format with said set of composite signals after they have been reformatted in said first, or source signal, format while both said series of seismic source wave digital signals and said set of composited signals are in integer mode, to produce a set of cross-correlated signals; and
   k. reformatting said set of cross-correlated signals to produce a final set of multiplexed correlated signals in said second, or data receiver, floating-point format.

2. In a method of seismic surveying as set forth in claim 1 that comprises recording said multiplexed composited signals in said second, or composited, format in one area of a recording medium; and recording said set of reformatted cross-correlated signals that comprises recording said multiplexed correlated signals in said second, or composited, format in another area of said recording medium.

3. In a system for seismic surveying in which a vehicle carrying a digital computer system advances along a line of exploration: the combination, in said vehicle, of:
   seismic wave source means in said computer system for storing a chirp excitation signal therein in a first, integer-mode digital form;
   means controlled by said seismic wave source means exciting the earth in accordance with said chirp excitation signal to cause seismic waves of corresponding variable frequency to be generated in the earth over an extended period of time whereby such seismic waves travel downwardly into the earth and are deflected by subsurface formations;
   a seismic wave signal conversion means for converting trains of seismic waves received at each of a plurality of geophone stations into a series of digital signals multiplexed in accordance with a second, or input, floating-point-mode format;
   a compositor computer for compositing series of digital signals in a second, or compositing, floating-point-mode format;
   means for converting said input signals from said input format to said compositing format and feeding them in said third, or compositing, format to said compositor computer;
   a correlation computer for correlating series of digital signals while in integer mode format with said chirp-excitation signal while in integer-mode format to form correlated traces in integer-mode format;
   means for feeding said composited signals to said correlation computer, and for converting them from said second, or compositing, format to said first, or integer-mode, format;

an output system including a magnetic recorder;

means for reformatting said correlated traces to produce a set of correlated signals multiplexed in said second, or input, format; and means for feeding said reformatted composited signals and said correlated signals to said magnetic recorder for separately recording both types of signals.

4. In a system for seismic surveying as set forth in claim 3, further including:

a multiple trace oscillograph; and means for converting said recorded correlated traces to feed into said such multiple trace oscillograph to produce a visual multiple trace analog seismogram.

* * * * *